(12) United States Patent
McGhie et al.

(10) Patent No.: US 8,950,669 B1
(45) Date of Patent: *Feb. 10, 2015

(54) CONVERSION OF NON-NEGOTIABLE CREDITS TO ENTITY INDEPENDENT FUNDS

(71) Applicants: Sean I. McGhie, Boca Raton, FL (US); Brian K. Buchheit, Davie, FL (US)

(72) Inventors: Sean I. McGhie, Boca Raton, FL (US); Brian K. Buchheit, Davie, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/314,297

(22) Filed: Jun. 25, 2014

Related U.S. Application Data

(63) Continuation of application No. 13/969,936, filed on Aug. 19, 2013, now Pat. No. 8,794,518, and a continuation of application No. 13/969,896, filed on Aug. 19, 2013, now Pat. No. 8,783,563, and a (Continued)

(51) Int. Cl.
G06K 5/00 (2006.01)
G06Q 30/02 (2012.01)

(52) U.S. Cl.
CPC .................. *G06Q 30/0227* (2013.01)
USPC ........... 235/380; 235/375; 235/379; 235/487; 463/25

(58) Field of Classification Search
USPC ................. 235/380, 375, 379, 487, 489, 382; 705/14, 39; 463/25
See application file for complete search history.

(56) References Cited

U.S. PATENT DOCUMENTS

| | | | |
|---|---|---|---|
| 3,573,747 | A | 4/1971 | Adams et al. |
| 3,581,072 | A | 5/1971 | Nymeyer |
| 3,652,795 | A | 3/1972 | Wolf et al. |
| 3,918,716 | A | 11/1975 | Nonaka et al. |

(Continued)

FOREIGN PATENT DOCUMENTS

| | | |
|---|---|---|
| AU | 6484498 | 11/1998 |
| AU | 2497399 | 11/1999 |

(Continued)

OTHER PUBLICATIONS

"Government Agencies Can Procure Materials." Link-Up. Jan./Feb. 2000, vol. 17, Issue 1, p. 19.

(Continued)

*Primary Examiner* — Edwyn Labaze
(74) *Attorney, Agent, or Firm* — Patents on Demand P.A.; Brian K. Buchheit; Scott M. Garrett

(57) ABSTRACT

In one embodiment, an account is established for non-negotiable credits provided by an entity to one or more users. Interactions that earn a quantity of non-negotiable credits are detected. The quantity of non-negotiable credits from the interactions is added to the account. The non-negotiable credits have redemption restrictions imposed by the entity. In absence of a conversion operation that converts the non-negotiable credits to entity independent funds, a commerce partner does not accept the non-negotiable credits for goods/services that it provides. A quantity of the non-negotiable credits is subtracted from the account. The subtracted quantity of non-negotiable credits corresponds to a quantity of entity independent funds resulting from the conversion operation that converts the non-negotiable credits to a quantity of the entity independent funds in accordance with agreement terms mutually established by the commerce partner and the entity. The commerce partner is compensated by the entity.

20 Claims, 15 Drawing Sheets

Related U.S. Application Data continuation of application No. 13/969,873, filed on Aug. 19, 2013, now Pat. No. 8,763,901, and a continuation of application No. 14/034,492, filed on Sep. 23, 2013, now Pat. No. 8,833,650, and a continuation of application No. 14/024,921, filed on Sep. 12, 2013, now Pat. No. 8,807,427, and a continuation of application No. 14/024,936, filed on Sep. 12, 2013, now Pat. No. 8,789,752, and a continuation-in-part of application No. 11/420,255, filed on May 25, 2006, now Pat. No. 7,703,673.

(56) References Cited

U.S. PATENT DOCUMENTS

| | | |
|---|---|---|
| 4,087,660 A | 5/1978 | Sedley |
| 4,251,867 A | 2/1981 | Uchida et al. |
| 4,358,672 A | 11/1982 | Hyatt et al. |
| 4,412,287 A | 10/1983 | Braddock, III |
| 4,473,825 A | 9/1984 | Walton |
| 4,518,098 A | 5/1985 | Fleischer |
| 4,546,241 A | 10/1985 | Walton |
| 4,582,324 A | 4/1986 | Koza et al. |
| 4,607,155 A | 8/1986 | Nao et al. |
| 4,609,812 A | 9/1986 | Drexler |
| 4,621,814 A | 11/1986 | Stephan et al. |
| 4,634,848 A | 1/1987 | Shinohara et al. |
| 4,674,044 A | 6/1987 | Kalmus et al. |
| 4,677,552 A | 6/1987 | Sibley, Jr. |
| 4,689,742 A | 8/1987 | Troy et al. |
| 4,695,053 A | 9/1987 | Vazquez |
| 4,700,055 A | 10/1987 | Kashkashian, Jr. |
| 4,701,601 A | 10/1987 | Francini et al. |
| 4,736,094 A | 4/1988 | Yoshida |
| 4,760,527 A | 7/1988 | Sidley |
| 4,764,666 A | 8/1988 | Bergeron |
| 4,789,928 A | 12/1988 | Fujisaki |
| 4,799,156 A | 1/1989 | Shivit et al. |
| 4,812,628 A | 3/1989 | Boston et al. |
| 4,823,264 A | 4/1989 | Beming |
| 4,823,265 A | 4/1989 | Nelson |
| 4,833,607 A | 5/1989 | Dethloff et al. |
| 4,837,422 A | 6/1989 | Dethloff et al. |
| 4,864,516 A | 9/1989 | Gaither et al. |
| 4,877,947 A | 10/1989 | Mori |
| 4,882,473 A | 11/1989 | Bergeron |
| 4,903,201 A | 2/1990 | Wagner |
| 4,910,672 A | 3/1990 | Off et al. |
| 4,912,310 A | 3/1990 | Uemura et al. |
| 4,941,090 A | 7/1990 | McCarthy |
| 4,942,090 A | 7/1990 | Morin |
| 4,949,256 A | 8/1990 | Humble |
| 4,968,873 A | 11/1990 | Dethloff |
| 4,982,346 A | 1/1991 | Girouard et al. |
| 5,025,372 A | 6/1991 | Burton et al. |
| 5,038,022 A | 8/1991 | Lucero |
| 5,056,019 A | 10/1991 | Schultz et al. |
| 5,063,507 A | 11/1991 | Lindsey et al. |
| 5,076,433 A | 12/1991 | Howes |
| 5,077,665 A | 12/1991 | Silverman et al. |
| 5,080,364 A | 1/1992 | Seidman |
| 5,101,353 A | 3/1992 | Lupien |
| 5,105,184 A | 4/1992 | Pirani et al. |
| 5,117,355 A | 5/1992 | McCarthy |
| 5,128,752 A | 7/1992 | Von Kohorn |
| 5,135,224 A | 8/1992 | Yamamoto |
| 5,136,501 A | 8/1992 | Silverman et al. |
| 5,142,578 A | 8/1992 | Matyas et al. |
| 5,168,446 A | 12/1992 | Wiseman |
| 5,173,851 A | 12/1992 | Off et al. |
| 5,179,517 A | 1/1993 | Sarbin et al. |
| 5,200,889 A | 4/1993 | Mori |
| 5,201,010 A | 4/1993 | Deaton et al. |
| 5,202,826 A | 4/1993 | McCarthy |
| 5,205,200 A | 4/1993 | Wright |
| 5,233,514 A | 8/1993 | Ayyoubi et al. |
| 5,237,620 A | 8/1993 | Deaton et al. |
| 5,243,515 A | 9/1993 | Lee |
| 5,256,863 A | 10/1993 | Ferguson et al. |
| 5,258,908 A | 11/1993 | Hartheimer et al. |
| 5,265,874 A | 11/1993 | Dickinson |
| 5,276,311 A | 1/1994 | Hennige |
| 5,276,312 A | 1/1994 | McCarthy |
| 5,280,422 A | 1/1994 | Moe et al. |
| 5,287,268 A | 2/1994 | McCarthy |
| 5,287,269 A | 2/1994 | Dorrough et al. |
| 5,290,033 A | 3/1994 | Bittner et al. |
| 5,297,031 A | 3/1994 | Gutterman et al. |
| 5,297,032 A | 3/1994 | Trojan et al. |
| 5,305,196 A | 4/1994 | Deaton et al. |
| 5,305,200 A | 4/1994 | Hartheimer et al. |
| 5,325,297 A | 6/1994 | Bird et al. |
| 5,327,508 A | 7/1994 | Deaton et al. |
| 5,329,589 A | 7/1994 | Fraser et al. |
| 5,332,076 A | 7/1994 | Ziegert |
| 5,344,144 A | 9/1994 | Cannon |
| 5,353,218 A | 10/1994 | De Lapa et al. |
| 5,369,705 A | 11/1994 | Bird et al. |
| 5,371,345 A | 12/1994 | LeStrange et al. |
| 5,373,440 A | 12/1994 | Cohen et al. |
| 5,375,055 A | 12/1994 | Togher et al. |
| 5,380,991 A | 1/1995 | Valencia et al. |
| 5,382,779 A | 1/1995 | Gupta |
| 5,388,165 A | 2/1995 | Deaton et al. |
| 5,393,061 A | 2/1995 | Manship et al. |
| 5,394,324 A | 2/1995 | Clearwater |
| 5,397,125 A | 3/1995 | Adams |
| 5,398,932 A | 3/1995 | Eberhardt et al. |
| 5,401,946 A | 3/1995 | Weinblatt |
| 5,402,872 A | 4/1995 | Clurman |
| 5,418,949 A | 5/1995 | Suzuki |
| 5,424,524 A | 6/1995 | Ruppert et al. |
| 5,426,281 A | 6/1995 | Abecassis |
| 5,429,361 A | 7/1995 | Raven et al. |
| 5,430,644 A | 7/1995 | Deaton et al. |
| 5,434,394 A | 7/1995 | Roach et al. |
| 5,440,634 A | 8/1995 | Jones et al. |
| 5,442,782 A | 8/1995 | Malatesta et al. |
| 5,448,471 A | 9/1995 | Deaton et al. |
| 5,453,601 A | 9/1995 | Rosen |
| 5,455,407 A | 10/1995 | Rosen |
| 5,457,306 A | 10/1995 | Lucero |
| 5,467,269 A | 11/1995 | Flaten |
| 5,470,079 A | 11/1995 | LeStrange et al. |
| 5,471,669 A | 11/1995 | Lidman |
| 5,477,038 A | 12/1995 | Levine et al. |
| 5,483,444 A | 1/1996 | Heintzeman et al. |
| 5,485,510 A | 1/1996 | Colbert |
| 5,491,326 A | 2/1996 | Marceau et al. |
| 5,497,319 A | 3/1996 | Chong et al. |
| 5,502,636 A | 3/1996 | Clarke |
| 5,511,781 A | 4/1996 | Wood et al. |
| 5,513,102 A | 4/1996 | Auriemma |
| 5,529,361 A | 6/1996 | Bell |
| 5,535,276 A | 7/1996 | Ganesan |
| 5,535,407 A | 7/1996 | Yanagawa et al. |
| 5,537,314 A | 7/1996 | Kanter |
| 5,551,692 A | 9/1996 | Pettit et al. |
| 5,553,145 A | 9/1996 | Micali |
| 5,557,518 A | 9/1996 | Rosen |
| 5,557,728 A | 9/1996 | Garrett et al. |
| 5,559,312 A | 9/1996 | Lucero |
| 5,559,313 A | 9/1996 | Claus et al. |
| 5,564,546 A | 10/1996 | Molbak et al. |
| 5,564,700 A | 10/1996 | Celona |
| 5,578,808 A | 11/1996 | Taylor |
| 5,580,309 A | 12/1996 | Piechowiak |
| 5,586,936 A | 12/1996 | Bennett et al. |
| 5,590,038 A | 12/1996 | Pitroda |
| 5,592,560 A | 1/1997 | Deaton et al. |
| 5,596,994 A | 1/1997 | Bro |
| 5,598,557 A | 1/1997 | Doner et al. |
| 5,609,337 A | 3/1997 | Clapper, Jr. |
| 5,612,868 A | 3/1997 | Off et al. |

(56) References Cited

U.S. PATENT DOCUMENTS

| | | |
|---|---|---|
| 5,613,912 A | 3/1997 | Slater |
| 5,621,812 A | 4/1997 | Deaton et al. |
| 5,635,696 A | 6/1997 | Dabrowski |
| 5,638,457 A | 6/1997 | Deaton et al. |
| 5,640,569 A | 6/1997 | Miller et al. |
| 5,642,485 A | 6/1997 | Deaton et al. |
| 5,643,088 A | 7/1997 | Vaughn et al. |
| 5,644,723 A | 7/1997 | Deaton et al. |
| 5,649,114 A | 7/1997 | Deaton et al. |
| 5,649,115 A | 7/1997 | Schrader et al. |
| 5,649,118 A | 7/1997 | Carlisle et al. |
| 5,652,896 A | 7/1997 | Yamauchi et al. |
| 5,655,961 A | 8/1997 | Acres et al. |
| 5,657,389 A | 8/1997 | Houvener |
| 5,659,165 A | 8/1997 | Jennings et al. |
| 5,659,469 A | 8/1997 | Deaton et al. |
| 5,664,115 A | 9/1997 | Fraser |
| 5,668,591 A | 9/1997 | Shintani |
| 5,671,364 A | 9/1997 | Turk |
| 5,672,109 A | 9/1997 | Natanian |
| 5,673,322 A | 9/1997 | Pepe et al. |
| 5,674,128 A | 10/1997 | Holch et al. |
| 5,675,662 A | 10/1997 | Deaton et al. |
| 5,677,952 A | 10/1997 | Blakley et al. |
| 5,687,322 A | 11/1997 | Deaton et al. |
| 5,687,323 A | 11/1997 | Hodroff |
| 5,689,100 A | 11/1997 | Carrithers |
| 5,689,652 A | 11/1997 | Lupien et al. |
| 5,694,546 A | 12/1997 | Reisman |
| 5,697,611 A | 12/1997 | Kelly et al. |
| 5,706,457 A | 1/1998 | Dwyer et al. |
| 5,708,782 A | 1/1998 | Larson et al. |
| 5,710,886 A | 1/1998 | Christensen et al. |
| 5,710,889 A | 1/1998 | Clark et al. |
| 5,715,314 A | 2/1998 | Payne et al. |
| 5,715,399 A | 2/1998 | Bezos |
| 5,715,402 A | 2/1998 | Popolo |
| 5,717,989 A | 2/1998 | Tozzoli et al. |
| 5,722,418 A | 3/1998 | Bro |
| 5,724,524 A | 3/1998 | Hunt et al. |
| 5,725,428 A | 3/1998 | Achmuller |
| 5,727,165 A | 3/1998 | Ordish et al. |
| 5,729,594 A | 3/1998 | Klingman |
| 5,729,693 A | 3/1998 | Holda-Fleck |
| 5,734,838 A | 3/1998 | Robinson et al. |
| 5,741,183 A | 4/1998 | Acres |
| 5,742,845 A | 4/1998 | Wagner |
| 5,745,573 A | 4/1998 | Lipner et al. |
| 5,749,075 A | 5/1998 | Toader et al. |
| 5,754,655 A | 5/1998 | Hughes |
| 5,758,126 A | 5/1998 | Daniels et al. |
| 5,761,647 A | 6/1998 | Boushy |
| 5,761,648 A | 6/1998 | Golden et al. |
| 5,765,141 A | 6/1998 | Spector |
| 5,766,075 A | 6/1998 | Cook et al. |
| 5,769,716 A | 6/1998 | Saffari et al. |
| 5,770,533 A | 6/1998 | Franchi |
| 5,770,843 A | 6/1998 | Rose et al. |
| 5,771,291 A | 6/1998 | Newton et al. |
| 5,771,380 A | 6/1998 | Tanaka et al. |
| 5,774,553 A | 6/1998 | Rosen |
| 5,774,868 A | 6/1998 | Cragun et al. |
| 5,774,869 A | 6/1998 | Toader |
| 5,774,870 A | 6/1998 | Storey |
| 5,774,873 A | 6/1998 | Berent et al. |
| 5,775,870 A | 7/1998 | Hogan |
| 5,778,178 A | 7/1998 | Arunachalum |
| 5,778,213 A | 7/1998 | Shakib et al. |
| 5,778,367 A | 7/1998 | Wesinger, Jr. et al. |
| 5,779,242 A | 7/1998 | Kaufmann |
| 5,779,549 A | 7/1998 | Walker et al. |
| 5,794,210 A | 8/1998 | Goldhaber et al. |
| 5,794,219 A | 8/1998 | Brown |
| 5,794,230 A | 8/1998 | Horadan et al. |
| 5,799,285 A | 8/1998 | Klingman |
| 5,802,275 A | 9/1998 | Blonder |
| 5,803,500 A | 9/1998 | Mossberg |
| 5,806,043 A | 9/1998 | Toader |
| 5,806,044 A | 9/1998 | Powell |
| 5,806,045 A | 9/1998 | Biorge et al. |
| 5,809,482 A | 9/1998 | Strisower |
| 5,814,796 A | 9/1998 | Benson et al. |
| 5,816,918 A | 10/1998 | Kelly et al. |
| 5,818,914 A | 10/1998 | Fujisaki |
| 5,820,460 A | 10/1998 | Fulton |
| 5,822,230 A | 10/1998 | Kikinis et al. |
| 5,823,874 A | 10/1998 | Adams |
| 5,825,884 A | 10/1998 | Zdepski et al. |
| 5,826,244 A | 10/1998 | Huberman |
| 5,832,457 A | 11/1998 | O'Brien et al. |
| 5,832,458 A | 11/1998 | Jones |
| 5,833,536 A | 11/1998 | Davids et al. |
| 5,834,748 A | 11/1998 | Litman |
| 5,835,896 A | 11/1998 | Fisher et al. |
| 5,836,817 A | 11/1998 | Acres |
| 5,839,117 A | 11/1998 | Cameron et al. |
| 5,844,230 A | 12/1998 | Lalonde |
| 5,845,259 A | 12/1998 | West et al. |
| 5,845,266 A | 12/1998 | Lupien et al. |
| 5,846,265 A | 12/1998 | McGregor et al. |
| 5,848,399 A | 12/1998 | Burke |
| 5,850,442 A | 12/1998 | Muftic |
| 5,851,148 A | 12/1998 | Brune et al. |
| 5,855,007 A | 12/1998 | Jovicic et al. |
| 5,855,008 A | 12/1998 | Goldhaber et al. |
| D404,436 S | 1/1999 | McGahn et al. |
| 5,857,175 A | 1/1999 | Day et al. |
| 5,857,188 A | 1/1999 | Douglas |
| 5,857,201 A | 1/1999 | Wright et al. |
| 5,857,203 A | 1/1999 | Kauffman et al. |
| 5,864,822 A | 1/1999 | Baker, III |
| RE36,116 E | 2/1999 | McCarthy et al. |
| 5,870,722 A | 2/1999 | Albert et al. |
| 5,872,848 A | 2/1999 | Romney et al. |
| 5,873,069 A | 2/1999 | Reuhl et al. |
| 5,874,412 A | 2/1999 | Priebe et al. |
| 5,876,284 A | 3/1999 | Acres et al. |
| 5,882,261 A | 3/1999 | Adams |
| 5,882,262 A | 3/1999 | Ballhorn |
| 5,884,056 A | 3/1999 | Steele |
| 5,884,247 A | 3/1999 | Christy |
| 5,884,277 A | 3/1999 | Khosla |
| 5,890,138 A | 3/1999 | Godin et al. |
| 5,892,827 A | 4/1999 | Beach et al. |
| 5,892,900 A | 4/1999 | Ginter et al. |
| 5,892,905 A | 4/1999 | Brandt et al. |
| 5,897,621 A | 4/1999 | Boesch et al. |
| 5,897,622 A | 4/1999 | Blinn et al. |
| 5,898,570 A | 4/1999 | Koon |
| 5,898,838 A | 4/1999 | Wagner |
| 5,899,980 A | 5/1999 | Wilf et al. |
| 5,902,184 A | 5/1999 | Bennett |
| 5,902,983 A | 5/1999 | Crevelt et al. |
| 5,903,847 A | 5/1999 | Heiskari et al. |
| 5,903,874 A | 5/1999 | Leonard et al. |
| 5,903,880 A | 5/1999 | Biffar |
| 5,905,246 A | 5/1999 | Fajkowski |
| 5,905,908 A | 5/1999 | Wagner |
| 5,905,974 A | 5/1999 | Fraser et al. |
| 5,905,975 A | 5/1999 | Ausubel |
| 5,907,830 A | 5/1999 | Engel et al. |
| 5,907,831 A | 5/1999 | Lotvin et al. |
| 5,909,023 A | 6/1999 | Ono et al. |
| 5,909,486 A | 6/1999 | Walker et al. |
| 5,909,544 A | 6/1999 | Anderson et al. |
| 5,911,418 A | 6/1999 | Adams |
| 5,913,203 A | 6/1999 | Wong et al. |
| 5,913,210 A | 6/1999 | Call |
| 5,914,472 A | 6/1999 | Foladare et al. |
| 5,915,007 A | 6/1999 | Klapka |
| 5,915,019 A | 6/1999 | Ginter et al. |
| 5,915,243 A | 6/1999 | Smolen |
| 5,915,244 A | 6/1999 | Jack et al. |
| 5,917,168 A | 6/1999 | Nakamura et al. |

(56) References Cited

U.S. PATENT DOCUMENTS

| | | |
|---|---|---|
| 5,918,211 A | 6/1999 | Sloane |
| 5,918,213 A | 6/1999 | Bernard et al. |
| 5,918,214 A | 6/1999 | Perkowski |
| 5,919,091 A | 7/1999 | Bell et al. |
| 5,920,847 A | 7/1999 | Kolling et al. |
| 5,922,074 A | 7/1999 | Richard et al. |
| 5,923,016 A | 7/1999 | Fredregill et al. |
| 5,924,072 A | 7/1999 | Havens |
| 5,924,080 A | 7/1999 | Johnson |
| 5,933,811 A | 8/1999 | Angles et al. |
| 5,933,827 A | 8/1999 | Cole et al. |
| 5,935,000 A | 8/1999 | Sanchez, III |
| 5,937,066 A | 8/1999 | Gennaro et al. |
| 5,937,391 A | 8/1999 | Ikeda et al. |
| 5,937,394 A | 8/1999 | Wong et al. |
| 5,938,727 A | 8/1999 | Ikeda |
| 5,940,506 A | 8/1999 | Chang et al. |
| 5,941,771 A | 8/1999 | Haste, III |
| 5,941,772 A | 8/1999 | Paige |
| 5,943,241 A | 8/1999 | Nichols et al. |
| 5,944,790 A | 8/1999 | Levy |
| 5,945,653 A | 8/1999 | Walker et al. |
| 5,946,664 A | 8/1999 | Ebisawa |
| 5,947,820 A | 9/1999 | Morro et al. |
| 5,948,061 A | 9/1999 | Merriman et al. |
| 5,949,042 A | 9/1999 | Dietz, II et al. |
| 5,950,173 A | 9/1999 | Perkowski |
| 5,951,397 A | 9/1999 | Dickinson |
| 5,952,638 A | 9/1999 | Demers et al. |
| 5,953,005 A | 9/1999 | Liu |
| 5,955,961 A | 9/1999 | Wallerstein |
| 5,956,038 A | 9/1999 | Rekimoto |
| 5,956,695 A | 9/1999 | Carrithers et al. |
| 5,956,700 A | 9/1999 | Landry |
| 5,959,277 A | 9/1999 | Lucero |
| 5,966,685 A | 10/1999 | Flanagan et al. |
| 5,967,896 A | 10/1999 | Jorasch et al. |
| 5,969,318 A | 10/1999 | Mackenthun |
| 5,970,469 A | 10/1999 | Scroggie et al. |
| 5,970,470 A | 10/1999 | Walker |
| 5,971,277 A | 10/1999 | Cragun et al. |
| 5,974,135 A | 10/1999 | Breneman et al. |
| 5,974,398 A | 10/1999 | Hanson et al. |
| 5,974,412 A | 10/1999 | Hazlehurst et al. |
| 5,978,777 A | 11/1999 | Garnier |
| 5,979,757 A | 11/1999 | Tracy et al. |
| 5,980,385 A | 11/1999 | Clapper |
| 5,982,520 A | 11/1999 | Weiser et al. |
| 5,983,196 A | 11/1999 | Wendkos |
| 5,983,205 A | 11/1999 | Brams et al. |
| 5,984,191 A | 11/1999 | Chapin, Jr. |
| 5,987,500 A | 11/1999 | Arunachalum |
| 5,988,500 A | 11/1999 | Litman |
| 5,991,376 A | 11/1999 | Hennessy et al. |
| 5,991,406 A | 11/1999 | Lipner et al. |
| 5,991,736 A | 11/1999 | Ferguson et al. |
| 5,992,738 A | 11/1999 | Matsumoto et al. |
| 5,992,752 A | 11/1999 | Wilz, Sr. et al. |
| 5,993,316 A | 11/1999 | Coyle |
| 5,995,942 A | 11/1999 | Smith et al. |
| 5,996,997 A | 12/1999 | Kamille |
| 5,999,624 A | 12/1999 | Hopkins |
| 5,999,914 A | 12/1999 | Blinn et al. |
| 6,000,608 A | 12/1999 | Dorf |
| 6,002,771 A | 12/1999 | Nielsen |
| 6,003,013 A | 12/1999 | Boushy et al. |
| 6,007,426 A | 12/1999 | Kelly et al. |
| 6,009,177 A | 12/1999 | Sudia |
| 6,009,411 A | 12/1999 | Kepecs |
| 6,009,412 A | 12/1999 | Storey |
| 6,009,458 A | 12/1999 | Hawkins |
| 6,012,039 A | 1/2000 | Hoffman et al. |
| 6,012,045 A | 1/2000 | Barzilai et al. |
| 6,012,051 A | 1/2000 | Sammon, Jr. et al. |
| 6,012,636 A | 1/2000 | Smith |
| 6,014,594 A | 1/2000 | Heidel |
| 6,014,634 A | 1/2000 | Scroggie et al. |
| 6,014,635 A | 1/2000 | Harris et al. |
| 6,015,344 A | 1/2000 | Kelly et al. |
| 6,016,476 A | 1/2000 | Maes et al. |
| 6,018,695 A | 1/2000 | Ahrens et al. |
| 6,018,718 A | 1/2000 | Walker et al. |
| 6,018,724 A | 1/2000 | Arent |
| 6,018,742 A | 1/2000 | Herbert, III |
| 6,021,399 A | 2/2000 | Demers et al. |
| 6,024,286 A | 2/2000 | Bradley et al. |
| 6,024,640 A | 2/2000 | Walker et al. |
| 6,026,370 A | 2/2000 | Jermyn |
| 6,026,375 A | 2/2000 | Hall et al. |
| 6,026,377 A | 2/2000 | Burke |
| 6,029,015 A | 2/2000 | Ishiguro |
| 6,030,288 A | 2/2000 | Davis et al. |
| 6,032,133 A | 2/2000 | Hilt et al. |
| 6,032,136 A | 2/2000 | Brake, Jr. et al. |
| 6,032,955 A | 3/2000 | Luciano et al. |
| 6,035,280 A | 3/2000 | Christensen |
| 6,035,281 A | 3/2000 | Crosskey et al. |
| 6,036,601 A | 3/2000 | Heckel |
| 6,038,321 A | 3/2000 | Torigai et al. |
| 6,039,244 A | 3/2000 | Finsterwald |
| 6,039,648 A | 3/2000 | Guinn |
| 6,041,308 A | 3/2000 | Walker et al. |
| 6,041,309 A | 3/2000 | Laor |
| 6,044,360 A | 3/2000 | Piccialio |
| 6,047,264 A | 4/2000 | Fisher et al. |
| 6,047,269 A | 4/2000 | Biffar |
| 6,048,269 A | 4/2000 | Burns |
| 6,049,778 A | 4/2000 | Walker et al. |
| 6,049,779 A | 4/2000 | Berkson |
| 6,052,469 A | 4/2000 | Johnson et al. |
| 6,052,670 A | 4/2000 | Johnson |
| 6,055,573 A | 4/2000 | Gardenswartz et al. |
| 6,058,371 A | 5/2000 | Djian |
| 6,058,379 A | 5/2000 | Odom et al. |
| 6,058,482 A | 5/2000 | Liu |
| 6,061,448 A | 5/2000 | Smith et al. |
| 6,061,660 A | 5/2000 | Eggleston et al. |
| 6,062,980 A | 5/2000 | Luciano |
| 6,064,979 A | 5/2000 | Perkowski |
| 6,064,987 A | 5/2000 | Walker |
| 6,065,120 A | 5/2000 | Laursen et al. |
| 6,068,553 A | 5/2000 | Parker |
| 6,070,147 A | 5/2000 | Harms et al. |
| 6,072,468 A | 6/2000 | Hocker et al. |
| 6,072,870 A | 6/2000 | Nguyen et al. |
| 6,073,840 A | 6/2000 | Marion |
| 6,075,863 A | 6/2000 | Krishnan et al. |
| 6,075,971 A | 6/2000 | Williams et al. |
| 6,076,101 A | 6/2000 | Kamakura et al. |
| 6,078,898 A | 6/2000 | Davis et al. |
| 6,081,900 A | 6/2000 | Subramaniam et al. |
| 6,085,176 A | 7/2000 | Woolston |
| 6,085,320 A | 7/2000 | Kaliski, Jr. |
| 6,088,730 A | 7/2000 | Kato et al. |
| 6,089,982 A | 7/2000 | Holch et al. |
| 6,092,069 A | 7/2000 | Johnson et al. |
| 6,092,201 A | 7/2000 | Turnbull et al. |
| 6,094,486 A | 7/2000 | Marchant |
| 6,098,837 A | 8/2000 | Izawa |
| 6,101,483 A | 8/2000 | Petrovich et al. |
| 6,101,484 A | 8/2000 | Halbert et al. |
| 6,101,485 A | 8/2000 | Fortenberry et al. |
| 6,104,815 A | 8/2000 | Alcorn et al. |
| 6,105,001 A | 8/2000 | Masi et al. |
| 6,105,008 A | 8/2000 | Davis et al. |
| 6,105,865 A | 8/2000 | Hardesty |
| 6,110,041 A | 8/2000 | Walker et al. |
| 6,110,042 A | 8/2000 | Walker et al. |
| 6,113,098 A | 9/2000 | Adams |
| 6,113,495 A | 9/2000 | Walker et al. |
| 6,115,737 A | 9/2000 | Ely et al. |
| 6,119,137 A | 9/2000 | Smith et al. |
| 6,119,229 A | 9/2000 | Martinez et al. |
| 6,119,230 A | 9/2000 | Carter |

(56) References Cited

U.S. PATENT DOCUMENTS

| | | |
|---|---|---|
| 6,119,933 A | 9/2000 | Wong et al. |
| 6,124,947 A | 9/2000 | Sea |
| 6,126,542 A | 10/2000 | Fier |
| 6,128,599 A | 10/2000 | Walker et al. |
| 6,128,603 A | 10/2000 | Dent et al. |
| 6,129,274 A | 10/2000 | Suzuki |
| 6,131,810 A | 10/2000 | Weiss et al. |
| 6,134,318 A | 10/2000 | O'Neil |
| 6,134,533 A | 10/2000 | Shell |
| 6,134,548 A | 10/2000 | Gottsman et al. |
| 6,138,107 A | 10/2000 | Elgamal |
| 6,138,911 A | 10/2000 | Fredregill et al. |
| 6,139,431 A | 10/2000 | Walker et al. |
| 6,141,161 A | 10/2000 | Sato et al. |
| 6,141,653 A | 10/2000 | Conklin |
| 6,141,684 A | 10/2000 | McDonald et al. |
| 6,144,984 A | 11/2000 | DeBenedictis et al. |
| 6,145,739 A | 11/2000 | Bertina et al. |
| 6,148,405 A | 11/2000 | Liao et al. |
| 6,151,589 A | 11/2000 | Aggarwal et al. |
| 6,154,214 A | 11/2000 | Uyehara et al. |
| 6,161,082 A | 12/2000 | Goldberg et al. |
| 6,161,096 A | 12/2000 | Bell |
| 6,162,122 A | 12/2000 | Acres |
| 6,163,771 A | 12/2000 | Walker et al. |
| 6,164,533 A | 12/2000 | Barton |
| 6,165,071 A | 12/2000 | Weiss |
| 6,168,522 B1 | 1/2001 | Walker |
| 6,173,267 B1 | 1/2001 | Cairns |
| 6,178,407 B1 | 1/2001 | Lotvin et al. |
| 6,178,408 B1 | 1/2001 | Copple et al. |
| 6,182,894 B1 | 2/2001 | Hackett et al. |
| 6,183,362 B1 | 2/2001 | Boushy |
| 6,183,366 B1 | 2/2001 | Goldberg et al. |
| 6,185,541 B1 | 2/2001 | Scroggie et al. |
| 6,185,545 B1 | 2/2001 | Resnick et al. |
| 6,186,893 B1 | 2/2001 | Walker et al. |
| 6,186,894 B1 | 2/2001 | Mayeroff |
| 6,189,103 B1 | 2/2001 | Nevarez et al. |
| 6,189,787 B1 | 2/2001 | Dorf |
| 6,190,256 B1 | 2/2001 | Walker et al. |
| 6,192,407 B1 | 2/2001 | Smith et al. |
| 6,193,608 B1 | 2/2001 | Walker et al. |
| 6,195,644 B1 | 2/2001 | Bowie |
| 6,195,677 B1 | 2/2001 | Utsumi |
| 6,196,458 B1 | 3/2001 | Walker et al. |
| 6,199,099 B1 | 3/2001 | Gershman et al. |
| 6,202,051 B1 | 3/2001 | Woolston |
| 6,205,418 B1 | 3/2001 | Li et al. |
| 6,205,553 B1 | 3/2001 | Stoffel et al. |
| 6,212,556 B1 | 4/2001 | Arunachalum |
| 6,216,129 B1 | 4/2001 | Eldering |
| 6,222,914 B1 | 4/2001 | McMullin |
| 6,224,483 B1 | 5/2001 | Mayeroff |
| 6,227,972 B1 | 5/2001 | Walker et al. |
| 6,229,533 B1 | 5/2001 | Farmer |
| 6,231,442 B1 | 5/2001 | Mayeroff |
| 6,234,896 B1 | 5/2001 | Walker et al. |
| 6,236,978 B1 | 5/2001 | Tuzhilin |
| 6,237,145 B1 | 5/2001 | Narasimhan et al. |
| 6,243,688 B1 | 6/2001 | Kalina |
| 6,243,691 B1 | 6/2001 | Fisher et al. |
| 6,244,958 B1 | 6/2001 | Acres |
| 6,246,996 B1 | 6/2001 | Stein et al. |
| 6,249,773 B1 | 6/2001 | Allard et al. |
| 6,266,647 B1 | 7/2001 | Fernandez |
| 6,266,653 B1 | 7/2001 | Shiobara et al. |
| 6,267,671 B1 | 7/2001 | Hogan |
| 6,273,820 B1 | 8/2001 | Haste, III |
| 6,275,789 B1 | 8/2001 | Moser et al. |
| 6,280,326 B1 | 8/2001 | Saunders |
| 6,280,328 B1 | 8/2001 | Holch et al. |
| 6,282,507 B1 | 8/2001 | Horiguchi et al. |
| 6,289,261 B1 | 9/2001 | Hiedel |
| 6,289,322 B1 | 9/2001 | Kitchen et al. |
| 6,292,769 B1 | 9/2001 | Flanagan et al. |
| 6,292,786 B1 | 9/2001 | Deaton et al. |
| 6,293,462 B1 | 9/2001 | Gangi |
| 6,293,865 B1 | 9/2001 | Kelly et al. |
| 6,293,866 B1 | 9/2001 | Walker et al. |
| 6,293,867 B1 | 9/2001 | Heidel |
| 6,298,335 B1 | 10/2001 | Bernstein |
| 6,301,554 B1 | 10/2001 | Christy |
| 6,302,793 B1 | 10/2001 | Fertitta, III et al. |
| 6,306,035 B1 | 10/2001 | Kelly et al. |
| 6,311,976 B1 | 11/2001 | Yoseloff et al. |
| 6,312,333 B1 | 11/2001 | Acres |
| 6,315,665 B1 | 11/2001 | Faith |
| 6,317,727 B1 | 11/2001 | May |
| 6,319,125 B1 | 11/2001 | Acres |
| 6,321,208 B1 | 11/2001 | Barnett et al. |
| 6,321,210 B1 | 11/2001 | O'Brien et al. |
| 6,326,985 B1 | 12/2001 | Tazoe et al. |
| 6,327,573 B1 | 12/2001 | Walker et al. |
| 6,330,543 B1 | 12/2001 | Kepecs |
| 6,332,099 B1 | 12/2001 | Heidel |
| 6,332,126 B1 | 12/2001 | Peirce et al. |
| 6,332,128 B1 | 12/2001 | Nicholson |
| 6,332,157 B1 | 12/2001 | Mighdoli et al. |
| 6,336,009 B1 | 1/2002 | Suzumi et al. |
| 6,336,098 B1 | 1/2002 | Fortenberry et al. |
| 6,336,105 B1 | 1/2002 | Conklin et al. |
| 6,341,353 B1 | 1/2002 | Herman |
| 6,345,261 B1 | 2/2002 | Feidelson et al. |
| 6,352,175 B2 | 3/2002 | Izawa |
| 6,353,811 B1 | 3/2002 | Weissman |
| 6,354,492 B1 | 3/2002 | Powell et al. |
| 6,358,149 B1 | 3/2002 | Schneider et al. |
| 6,363,337 B1 | 3/2002 | Amith |
| 6,363,362 B1 | 3/2002 | Burfield et al. |
| 6,375,073 B1 | 4/2002 | Aebi et al. |
| 6,379,247 B1 | 4/2002 | Walker et al. |
| 6,389,427 B1 | 5/2002 | Faulkner |
| 6,394,907 B1 | 5/2002 | Rowe |
| 6,402,029 B1 | 6/2002 | Gangi |
| 6,408,281 B1 | 6/2002 | Shell et al. |
| 6,408,284 B1 | 6/2002 | Hilt et al. |
| 6,415,270 B1 | 7/2002 | Rackson et al. |
| 6,421,653 B1 | 7/2002 | May |
| 6,431,983 B2 | 8/2002 | Acres |
| 6,438,527 B1 | 8/2002 | Powar |
| 6,446,048 B1 | 9/2002 | Wells et al. |
| 6,450,407 B1 | 9/2002 | Freeman et al. |
| 6,452,498 B2 | 9/2002 | Stewart |
| 6,460,015 B1 | 10/2002 | Hetherington et al. |
| 6,460,020 B1 | 10/2002 | Pool et al. |
| 6,463,404 B1 | 10/2002 | Appleby |
| 6,473,729 B1 | 10/2002 | Gastaldo et al. |
| 6,476,830 B1 | 11/2002 | Farmer |
| 6,484,147 B1 | 11/2002 | Brizendine et al. |
| 6,484,940 B1 | 11/2002 | Dilday et al. |
| 6,486,768 B1 | 11/2002 | French et al. |
| 6,491,584 B2 | 12/2002 | Graham |
| 6,505,772 B1 | 1/2003 | Mollett et al. |
| 6,507,813 B2 | 1/2003 | Veditz et al. |
| 6,510,418 B1 | 1/2003 | Case et al. |
| 6,510,998 B1 | 1/2003 | Stanford et al. |
| 6,511,377 B1 | 1/2003 | Weiss |
| 6,522,889 B1 | 2/2003 | Aarnio |
| 6,523,012 B1 | 2/2003 | Glassman et al. |
| 6,532,448 B1 | 3/2003 | Higginson et al. |
| 6,533,664 B1 | 3/2003 | Crumby |
| 6,547,131 B1 | 4/2003 | Foodman |
| 6,549,912 B1 | 4/2003 | Chen |
| 6,554,705 B1 | 4/2003 | Cumbers |
| 6,571,241 B1 | 5/2003 | Nosohara |
| 6,572,471 B1 | 6/2003 | Bennett |
| 6,574,239 B1 | 6/2003 | Dowling et al. |
| 6,575,832 B1 | 6/2003 | Manfredi et al. |
| 6,578,012 B1 | 6/2003 | Storey |
| 6,578,015 B1 | 6/2003 | Haseltine et al. |
| 6,579,179 B2 | 6/2003 | Poole et al. |
| 6,593,640 B1 | 7/2003 | Kalnitsky et al. |
| 6,594,640 B1 | 7/2003 | Postrel |

(56) References Cited

U.S. PATENT DOCUMENTS

| | | |
|---|---|---|
| 6,598,026 B1 | 7/2003 | Ojha et al. |
| 6,601,040 B1 | 7/2003 | Kolls |
| 6,607,136 B1 | 8/2003 | Atsmon et al. |
| 6,607,441 B1 | 8/2003 | Acres |
| 6,609,150 B2 | 8/2003 | Lee et al. |
| 6,609,969 B1 | 8/2003 | Luciano |
| 6,609,970 B1 | 8/2003 | Luciano |
| 6,609,978 B1 | 8/2003 | Paulsen |
| 6,623,357 B2 | 9/2003 | Chowdhury |
| 6,629,081 B1 | 9/2003 | Cornelius et al. |
| 6,629,890 B2 | 10/2003 | Johnson |
| 6,631,358 B1 | 10/2003 | Ogilvie |
| 6,631,849 B2 | 10/2003 | Blossom |
| 6,645,077 B2 | 11/2003 | Rowe |
| 6,647,373 B1 | 11/2003 | Carlton-Foss |
| 6,648,755 B1 | 11/2003 | Luciano, Jr. |
| 6,656,050 B2 | 12/2003 | Busch |
| 6,685,559 B2 | 2/2004 | Luciano |
| 6,687,679 B1 | 2/2004 | Van Luchene et al. |
| 6,704,713 B1 | 3/2004 | Brett |
| 6,721,743 B1 | 4/2004 | Sakakibara |
| 6,732,161 B1 | 5/2004 | Hess et al. |
| 6,748,365 B1 | 6/2004 | Quinlan et al. |
| 6,748,367 B1 | 6/2004 | Lee |
| 6,771,291 B1 | 8/2004 | DiStenfano |
| 6,775,371 B2 | 8/2004 | Elsey et al. |
| 6,799,165 B1 | 9/2004 | Boesjes |
| 6,800,029 B2 | 10/2004 | Rowe |
| 6,813,609 B2 | 11/2004 | Wilson |
| 6,820,061 B2 | 11/2004 | Postrel |
| 6,824,066 B2 | 11/2004 | Weyant |
| 6,824,464 B2 | 11/2004 | Weil et al. |
| 6,826,594 B1 | 11/2004 | Pettersen |
| 6,829,586 B2 | 12/2004 | Postrel |
| 6,837,436 B2 | 1/2005 | Swartz et al. |
| 6,842,739 B2 | 1/2005 | Postrel |
| 6,843,720 B2 | 1/2005 | Luciano |
| 6,846,238 B2 | 1/2005 | Wells |
| 6,852,031 B1 | 2/2005 | Rowe |
| 6,856,976 B2 | 2/2005 | Bible et al. |
| 6,857,022 B1 | 2/2005 | Scanlan |
| 6,857,961 B2 | 2/2005 | Soltys et al. |
| 6,865,547 B1 | 3/2005 | Brake et al. |
| 6,866,586 B2 | 3/2005 | Oberberger |
| 6,876,979 B2 | 4/2005 | Ling |
| 6,892,938 B2 | 5/2005 | Solomon |
| 6,895,386 B1 | 5/2005 | Bachman et al. |
| 6,898,570 B1 | 5/2005 | Tedesco et al. |
| 6,915,271 B1 | 7/2005 | Meyer et al. |
| 6,920,611 B1 | 7/2005 | Spaeth et al. |
| 6,929,550 B2 | 8/2005 | Hisada |
| 6,931,538 B1 | 8/2005 | Sawaguchi |
| 6,947,898 B2 | 9/2005 | Postrel |
| 6,951,302 B2 | 10/2005 | Potts |
| 6,985,876 B1 | 1/2006 | Lee |
| 6,997,807 B2 | 2/2006 | Weiss |
| 7,003,496 B2 | 2/2006 | Ishii |
| 7,013,357 B2 | 3/2006 | Murdock et al. |
| 7,021,531 B2 | 4/2006 | Myttenaere |
| 7,025,674 B2 | 4/2006 | Adams et al. |
| 7,032,817 B2 | 4/2006 | Blank |
| 7,043,752 B2 | 5/2006 | Royer et al. |
| 7,072,864 B2 | 7/2006 | Brake, Jr. et al. |
| 7,076,453 B2 | 7/2006 | Jammes et al. |
| 7,096,190 B2 | 8/2006 | Postrel |
| 7,124,109 B2 | 10/2006 | Sakamoto et al. |
| 7,127,236 B2 | 10/2006 | Khan et al. |
| 7,127,414 B2 | 10/2006 | Awadallah et al. |
| 7,128,652 B1 | 10/2006 | Lavoie |
| 7,130,828 B2 | 10/2006 | Phillips et al. |
| 7,134,087 B2 | 11/2006 | Bushold et al. |
| 7,134,959 B2 | 11/2006 | Penrice |
| 7,137,883 B1 | 11/2006 | Falciglia |
| 7,146,342 B1 | 12/2006 | Angelin |
| 7,152,042 B1 | 12/2006 | Arkes |
| 7,154,481 B2 | 12/2006 | Cross et al. |
| 7,156,738 B2 | 1/2007 | Rowe |
| 7,163,145 B2 | 1/2007 | Cohagan et al. |
| 7,168,089 B2 | 1/2007 | Nguyen |
| 7,174,029 B2 | 2/2007 | Agostinelli et al. |
| 7,174,315 B2 | 2/2007 | Phillips et al. |
| 7,174,563 B2 | 2/2007 | Brownlie et al. |
| 7,187,947 B1 | 3/2007 | White et al. |
| 7,200,571 B1 | 4/2007 | Jenniges et al. |
| 7,201,660 B2 | 4/2007 | Kiely et al. |
| 7,206,768 B1 | 4/2007 | deGroeve et al. |
| 7,209,733 B2 | 4/2007 | Ortiz et al. |
| 7,212,279 B1 | 5/2007 | Feng |
| 7,239,226 B2 | 7/2007 | Berardi et al. |
| 7,249,139 B2 | 7/2007 | Chuah |
| 7,249,197 B1 | 7/2007 | Roestenburg et al. |
| 7,289,970 B1 | 10/2007 | Siegel |
| 7,290,061 B2 | 10/2007 | Lentini et al. |
| 7,291,064 B2 | 11/2007 | Yamada |
| 7,296,282 B1 | 11/2007 | Koplar et al. |
| 7,298,226 B2 | 11/2007 | Shanbhag et al. |
| 7,300,351 B2 | 11/2007 | Thomas |
| 7,315,823 B2 | 1/2008 | Brondrup |
| 7,321,901 B1 | 1/2008 | Blinn et al. |
| 7,329,185 B2 | 2/2008 | Conover et al. |
| 7,329,187 B1 | 2/2008 | Holch et al. |
| 7,341,518 B2 | 3/2008 | Muskin |
| 7,349,867 B2 | 3/2008 | Rollins et al. |
| 7,360,693 B1 | 4/2008 | Sullivan |
| 7,360,699 B2 | 4/2008 | Cohagan et al. |
| 7,376,538 B1 | 5/2008 | Eatough |
| 7,387,571 B2 | 6/2008 | Walker |
| 7,390,264 B2 | 6/2008 | Walker |
| 7,398,225 B2 | 7/2008 | Voltmer et al. |
| 7,398,226 B2 | 7/2008 | Haines et al. |
| 7,410,422 B2 | 8/2008 | Fine |
| 7,424,411 B2 | 9/2008 | Ito |
| 7,424,617 B2 | 9/2008 | Boyd et al. |
| 7,428,498 B2 | 9/2008 | Voltmer et al. |
| 7,430,522 B2 | 9/2008 | Nakajima |
| 7,455,586 B2 | 11/2008 | Nguyen |
| 7,461,022 B1 | 12/2008 | Churchill et al. |
| 7,467,096 B2 | 12/2008 | Antonucci et al. |
| 7,496,524 B2 | 2/2009 | Voltmer et al. |
| 7,503,487 B2 | 3/2009 | Cohagan et al. |
| 7,562,810 B2 | 7/2009 | Rao et al. |
| 7,593,866 B2 | 9/2009 | Grove et al. |
| 7,599,881 B2 | 10/2009 | Likourezos et al. |
| 7,606,730 B2 | 10/2009 | Antonucci et al. |
| 7,610,244 B2 | 10/2009 | Likourezos et al. |
| 7,613,628 B2 | 11/2009 | Ariff et al. |
| 7,613,629 B2 | 11/2009 | Antonucci et al. |
| 7,618,324 B2 | 11/2009 | Gatto et al. |
| 7,627,528 B2 | 12/2009 | Likourezos et al. |
| 7,636,674 B2 | 12/2009 | Francis |
| 7,636,874 B2 | 12/2009 | Gutbrod et al. |
| 7,641,547 B2 | 1/2010 | Walker et al. |
| 7,677,968 B2 | 3/2010 | Schultz et al. |
| 7,680,688 B2 | 3/2010 | Hessburg et al. |
| 7,682,245 B2 | 3/2010 | Nguyen |
| 7,686,218 B2 | 3/2010 | Hessburg et al. |
| 7,690,998 B2 | 4/2010 | Okada |
| 7,698,185 B2 | 4/2010 | Hofer |
| 7,703,673 B2 | 4/2010 | Buchheit et al. |
| 7,716,085 B2 | 5/2010 | Stier |
| 7,729,950 B2 | 6/2010 | Mendizabal et al. |
| 7,747,463 B1 | 6/2010 | Phillips et al. |
| 7,753,781 B2 | 7/2010 | Storch |
| 7,762,886 B2 | 7/2010 | Pfennighausen et al. |
| 7,765,124 B2 | 7/2010 | Postrel |
| 7,771,278 B1 | 8/2010 | Muskin |
| 7,775,872 B2 | 8/2010 | Bleich et al. |
| 7,788,160 B2 | 8/2010 | Srinivasamurthy |
| 7,813,955 B2 | 10/2010 | Ariff et al. |
| 7,815,506 B2 | 10/2010 | Franklin et al. |
| 7,827,056 B2 | 11/2010 | Walker et al. |
| 7,827,057 B1 | 11/2010 | Walker et al. |
| 7,828,206 B2 | 11/2010 | Hessburg et al. |
| 7,828,652 B2 | 11/2010 | Nguyen |

(56) References Cited

U.S. PATENT DOCUMENTS

| | | |
|---|---|---|
| 7,835,977 B2 | 11/2010 | Singh et al. |
| 7,853,486 B2 | 12/2010 | Grove et al. |
| 7,856,376 B2 | 12/2010 | Storey |
| 7,856,377 B2 | 12/2010 | Cohagan et al. |
| 7,860,749 B2 | 12/2010 | Subramanian |
| 7,867,079 B2 | 1/2011 | Govender et al. |
| 7,867,081 B2 | 1/2011 | Schneider et al. |
| 7,870,058 B2 | 1/2011 | Maltzman |
| 7,873,562 B2 | 1/2011 | Maltzman |
| 7,877,313 B2 | 1/2011 | Singh |
| 7,886,011 B2 | 2/2011 | Buchheit |
| 7,895,115 B2 | 2/2011 | Bayyapu et al. |
| 7,895,118 B2 | 2/2011 | Glodjo et al. |
| 7,921,052 B2 | 4/2011 | Dabney et al. |
| 7,925,533 B2 | 4/2011 | Shaw et al. |
| 7,950,996 B2 | 5/2011 | Nguyen |
| 7,963,843 B2 | 6/2011 | Martin et al. |
| 7,970,689 B2 | 6/2011 | Glodjo |
| 7,980,466 B2 | 7/2011 | Lee et al. |
| 7,988,553 B2 | 8/2011 | Kastner et al. |
| 7,993,198 B2 | 8/2011 | Walker et al. |
| 7,993,199 B2 | 8/2011 | Iddings et al. |
| 7,996,262 B2 | 8/2011 | Urban |
| 7,996,486 B2 | 8/2011 | Lambert |
| 8,001,007 B2 | 8/2011 | Grove et al. |
| 8,005,714 B2 | 8/2011 | Shaw et al. |
| 8,005,719 B2 | 8/2011 | Grove et al. |
| 8,012,009 B2 | 9/2011 | Iddings et al. |
| 8,015,103 B2 | 9/2011 | Watt, II et al. |
| 8,019,679 B2 | 9/2011 | Bennett et al. |
| 8,020,181 B2 | 9/2011 | Koplar et al. |
| 8,024,220 B2 | 9/2011 | Ariff et al. |
| 8,046,256 B2 | 10/2011 | Chien et al. |
| 8,050,968 B2 | 11/2011 | Antonucci et al. |
| 8,052,518 B1 | 11/2011 | Kelly et al. |
| 8,062,116 B2 | 11/2011 | Lutnick et al. |
| 8,065,182 B2 | 11/2011 | Voltmer et al. |
| 8,075,394 B2 | 12/2011 | Okada et al. |
| 8,079,905 B2 | 12/2011 | Nguyen |
| 8,095,428 B2 | 1/2012 | Penagulur et al. |
| 8,095,449 B2 | 1/2012 | Cui et al. |
| 8,100,758 B2 | 1/2012 | Walker et al. |
| 8,112,303 B2 | 2/2012 | Eglen et al. |
| 8,123,127 B2 | 2/2012 | McGhie et al. |
| 8,125,216 B2 | 2/2012 | Thomas et al. |
| 8,126,799 B2 | 2/2012 | Kellam et al. |
| 8,135,644 B2 | 3/2012 | Rowe |
| 8,137,181 B2 | 3/2012 | Bleich et al. |
| 8,160,933 B2 | 4/2012 | Nguyen et al. |
| 8,162,209 B2 | 4/2012 | Buchheit et al. |
| 8,180,671 B2 | 5/2012 | Cohagan et al. |
| 8,181,863 B1 | 5/2012 | McGhie et al. |
| 8,181,864 B1 | 5/2012 | McGhie et al. |
| 8,182,333 B2 | 5/2012 | Pacey |
| 8,182,340 B2 | 5/2012 | Korp |
| 8,182,344 B2 | 5/2012 | Bleich et al. |
| 8,186,583 B1 | 5/2012 | McGhie et al. |
| 8,199,742 B1 | 6/2012 | Croak et al. |
| 8,200,547 B2 | 6/2012 | Daman et al. |
| 8,200,553 B1 | 6/2012 | Hermreck et al. |
| 8,201,734 B1 | 6/2012 | McGhie et al. |
| 8,214,264 B2 | 7/2012 | Kasavin et al. |
| 8,234,162 B2 | 7/2012 | Lavin et al. |
| 8,234,163 B2 | 7/2012 | Shaw et al. |
| 8,234,164 B2 | 7/2012 | Walker et al. |
| 8,234,379 B2 | 7/2012 | Young et al. |
| 8,239,258 B2 | 8/2012 | Urban |
| 8,239,260 B2 | 8/2012 | Lavin et al. |
| 8,239,280 B1 | 8/2012 | Feinberg et al. |
| 8,239,487 B1 | 8/2012 | Hoffman et al. |
| 8,245,925 B1 | 8/2012 | McGhie et al. |
| 8,265,993 B2 | 9/2012 | Chien et al. |
| 8,267,315 B1 | 9/2012 | McGhie et al. |
| 8,282,490 B2 | 10/2012 | Arezina et al. |
| 8,292,741 B2 | 10/2012 | Burman et al. |
| 8,297,502 B1 | 10/2012 | McGhie et al. |
| 8,298,074 B2 | 10/2012 | Gibase et al. |
| 8,313,023 B1 | 11/2012 | McGhie et al. |
| 8,332,290 B1 | 12/2012 | Venturo et al. |
| 8,342,399 B1 | 1/2013 | McGhie et al. |
| 8,352,370 B1 | 1/2013 | White et al. |
| 8,360,838 B2 | 1/2013 | Nguyen |
| 8,364,556 B2 | 1/2013 | Nguyen et al. |
| 8,370,212 B2 | 2/2013 | Asher et al. |
| 8,376,224 B2 | 2/2013 | McGhie et al. |
| 8,380,849 B2 | 2/2013 | Lambert |
| 8,386,330 B1 | 2/2013 | Kulavade et al. |
| 8,407,083 B2 | 3/2013 | Bortolin et al. |
| 8,407,089 B2 | 3/2013 | Trively |
| 8,423,401 B2 | 4/2013 | Antonucci et al. |
| 8,429,024 B2 | 4/2013 | Hermreck et al. |
| 8,433,607 B2 | 4/2013 | MacLean et al. |
| 8,433,609 B2 | 4/2013 | Abhyanker et al. |
| 8,452,645 B2 | 5/2013 | Steinkamp et al. |
| 8,452,687 B2 | 5/2013 | Rowe |
| 8,458,048 B2 | 6/2013 | Arkes |
| 8,478,657 B2 | 7/2013 | Lee |
| 8,484,186 B1 | 7/2013 | Kapczynski et al. |
| 8,489,449 B2 | 7/2013 | Teicher |
| 8,668,146 B1 | 3/2014 | McGhie et al. |
| 8,684,265 B1 | 4/2014 | McGhie et al. |
| 2001/0007099 A1 | 7/2001 | Rau et al. |
| 2001/0009005 A1 | 7/2001 | Godin et al. |
| 2001/0012219 A1 | 8/2001 | Lee et al. |
| 2001/0023407 A1 | 9/2001 | Liyanearachchi et al. |
| 2001/0027436 A1 | 10/2001 | Tenembaum |
| 2001/0029455 A1 | 10/2001 | Chin et al. |
| 2001/0032137 A1 | 10/2001 | Bennett et al. |
| 2001/0032164 A1 | 10/2001 | Kim |
| 2001/0032182 A1 | 10/2001 | Kumar et al. |
| 2001/0032183 A1 | 10/2001 | Landry |
| 2001/0032878 A1 | 10/2001 | Tsiounis et al. |
| 2001/0034259 A1 | 10/2001 | Luciano et al. |
| 2001/0034649 A1 | 10/2001 | Acres |
| 2001/0034653 A1 | 10/2001 | Yamamoto |
| 2001/0034663 A1 | 10/2001 | Teveler et al. |
| 2001/0034720 A1 | 10/2001 | Armes |
| 2001/0037295 A1 | 11/2001 | Olsen |
| 2001/0039531 A1 | 11/2001 | Aoki |
| 2001/0039644 A1 | 11/2001 | Le Coz |
| 2001/0041610 A1 | 11/2001 | Luciano et al. |
| 2001/0044337 A1 | 11/2001 | Rowe |
| 2001/0046891 A1 | 11/2001 | Acres |
| 2001/0047308 A1 | 11/2001 | Kaminsky |
| 2001/0047342 A1 | 11/2001 | Cuervo |
| 2001/0049628 A1 | 12/2001 | Icho |
| 2001/0049647 A1 | 12/2001 | Sheehan et al. |
| 2001/0054003 A1 | 12/2001 | Chien et al. |
| 2001/0054006 A1 | 12/2001 | Lee et al. |
| 2001/0054010 A1 | 12/2001 | Bernabeo et al. |
| 2002/0002075 A1 | 1/2002 | Rowe |
| 2002/0002532 A1 | 1/2002 | Tso |
| 2002/0002538 A1 | 1/2002 | Ling |
| 2002/0010025 A1 | 1/2002 | Kelly et al. |
| 2002/0013728 A1 | 1/2002 | Wilkman |
| 2002/0013767 A1 | 1/2002 | Katz |
| 2002/0013774 A1 | 1/2002 | Morimoto |
| 2002/0016734 A1 | 2/2002 | McGill et al. |
| 2002/0020965 A1 | 2/2002 | Potter |
| 2002/0022743 A1 | 2/2002 | Jamieson et al. |
| 2002/0026348 A1 | 2/2002 | Fowler et al. |
| 2002/0026423 A1 | 2/2002 | Maritzen et al. |
| 2002/0029339 A1 | 3/2002 | Rowe |
| 2002/0038282 A1 | 3/2002 | Montgomery |
| 2002/0039923 A1 | 4/2002 | Cannon et al. |
| 2002/0040344 A1 | 4/2002 | Preiser et al. |
| 2002/0041556 A1 | 4/2002 | Tsukamoto |
| 2002/0042835 A1 | 4/2002 | Pepin et al. |
| 2002/0045476 A1 | 4/2002 | Poole |
| 2002/0046110 A1 | 4/2002 | Gallagher |
| 2002/0046137 A1 | 4/2002 | Odom et al. |
| 2002/0046157 A1 | 4/2002 | Solomon |
| 2002/0049631 A1 | 4/2002 | Williams |
| 2002/0049664 A1 | 4/2002 | Hoffman et al. |

(56) References Cited

U.S. PATENT DOCUMENTS

| | | |
|---|---|---|
| 2002/0052940 A1 | 5/2002 | Myers et al. |
| 2002/0055874 A1 | 5/2002 | Cohen |
| 2002/0056044 A1 | 5/2002 | Andersson |
| 2002/0059103 A1 | 5/2002 | Anderson et al. |
| 2002/0062253 A1 | 5/2002 | Dosh et al. |
| 2002/0065126 A1 | 5/2002 | Miller et al. |
| 2002/0068624 A1 | 6/2002 | Ellis |
| 2002/0069109 A1 | 6/2002 | Wendkos |
| 2002/0069134 A1 | 6/2002 | Solomon |
| 2002/0069150 A1 | 6/2002 | Ni |
| 2002/0069184 A1 | 6/2002 | Tilly et al. |
| 2002/0072412 A1 | 6/2002 | Young |
| 2002/0073111 A1 | 6/2002 | Heyliger |
| 2002/0075844 A1 | 6/2002 | Hagen |
| 2002/0077173 A1 | 6/2002 | Luciano et al. |
| 2002/0077890 A1 | 6/2002 | Forsythe et al. |
| 2002/0077978 A1 | 6/2002 | O'Leary et al. |
| 2002/0082918 A1 | 6/2002 | Warwick |
| 2002/0082920 A1 | 6/2002 | Austin |
| 2002/0082953 A1 | 6/2002 | Batham et al. |
| 2002/0082977 A1 | 6/2002 | Hammond et al. |
| 2002/0082990 A1 | 6/2002 | Jones |
| 2002/0086733 A1 | 7/2002 | Wang |
| 2002/0087468 A1 | 7/2002 | Ganesan et al. |
| 2002/0091580 A1 | 7/2002 | Wang |
| 2002/0091593 A1 | 7/2002 | Fowler |
| 2002/0095365 A1 | 7/2002 | Slavin et al. |
| 2002/0099562 A1 | 7/2002 | Bruce et al. |
| 2002/0099656 A1 | 7/2002 | Pho |
| 2002/0107072 A1 | 8/2002 | Giobbi |
| 2002/0107733 A1 | 8/2002 | Liu et al. |
| 2002/0111210 A1 | 8/2002 | Luciano, Jr. |
| 2002/0111889 A1 | 8/2002 | Buxton et al. |
| 2002/0111907 A1 | 8/2002 | Ling |
| 2002/0111919 A1 | 8/2002 | Weller et al. |
| 2002/0112174 A1 | 8/2002 | Moratti et al. |
| 2002/0116257 A1 | 8/2002 | Helbig |
| 2002/0120513 A1 | 8/2002 | Webb et al. |
| 2002/0120548 A1 | 8/2002 | Etkin |
| 2002/0120554 A1 | 8/2002 | Vega |
| 2002/0123949 A1 | 9/2002 | VanLeeuwen |
| 2002/0123959 A1 | 9/2002 | Mozley et al. |
| 2002/0131565 A1 | 9/2002 | Scheuring et al. |
| 2002/0143612 A1 | 10/2002 | Barik et al. |
| 2002/0143614 A1 | 10/2002 | Higbee Clarkin et al. |
| 2002/0146018 A1 | 10/2002 | Kailamaki et al. |
| 2002/0147047 A1 | 10/2002 | Letovsky |
| 2002/0147655 A1 | 10/2002 | Say |
| 2002/0151359 A1 | 10/2002 | Rowe |
| 2002/0152116 A1 | 10/2002 | Yan |
| 2002/0160838 A1 | 10/2002 | Kim |
| 2002/0161630 A1 | 10/2002 | Kern et al. |
| 2002/0169021 A1 | 11/2002 | Urie |
| 2002/0169660 A1 | 11/2002 | Taylor et al. |
| 2002/0174031 A1 | 11/2002 | Weiss |
| 2002/0174050 A1 | 11/2002 | Eynard et al. |
| 2002/0177479 A1 | 11/2002 | Walker |
| 2002/0194069 A1 | 12/2002 | Thakur et al. |
| 2002/0198043 A1 | 12/2002 | Chowdhry |
| 2003/0003996 A1 | 1/2003 | Nguyen |
| 2003/0004802 A1 | 1/2003 | Callegari |
| 2003/0004808 A1 | 1/2003 | Elhaossine et al. |
| 2003/0004809 A1 | 1/2003 | Palcic et al. |
| 2003/0004871 A1 | 1/2003 | Rowe |
| 2003/0008707 A1 | 1/2003 | Walker et al. |
| 2003/0009379 A1 | 1/2003 | Narasimhan et al. |
| 2003/0013438 A1 | 1/2003 | Darby |
| 2003/0014350 A1 | 1/2003 | Duell et al. |
| 2003/0018523 A1 | 1/2003 | Rappaport et al. |
| 2003/0018885 A1 | 1/2003 | Landsman et al. |
| 2003/0022719 A1 | 1/2003 | Donald et al. |
| 2003/0030964 A1 | 2/2003 | Asao et al. |
| 2003/0032474 A1 | 2/2003 | Kaminkow |
| 2003/0033534 A1 | 2/2003 | Rand |
| 2003/0036425 A1 | 2/2003 | Kaminkow et al. |
| 2003/0040964 A1 | 2/2003 | Lacek |
| 2003/0045353 A1 | 3/2003 | Paulsen |
| 2003/0050831 A1 | 3/2003 | Klayh |
| 2003/0050861 A1 | 3/2003 | Martin et al. |
| 2003/0055722 A1 | 3/2003 | Perreault et al. |
| 2003/0055780 A1 | 3/2003 | Hansen et al. |
| 2003/0060264 A1 | 3/2003 | Chilton |
| 2003/0061097 A1 | 3/2003 | Walker |
| 2003/0062242 A1 | 4/2003 | Hallowell et al. |
| 2003/0069787 A1 | 4/2003 | Tendon et al. |
| 2003/0069842 A1 | 4/2003 | Kight et al. |
| 2003/0074311 A1 | 4/2003 | Saylors et al. |
| 2003/0078094 A1 | 4/2003 | Gatto |
| 2003/0083943 A1 | 5/2003 | Adams et al. |
| 2003/0083952 A1 | 5/2003 | Simpson et al. |
| 2003/0087650 A1 | 5/2003 | Aarnio |
| 2003/0087692 A1 | 5/2003 | Weiss |
| 2003/0101131 A1 | 5/2003 | Warren et al. |
| 2003/0104862 A1 | 6/2003 | Acres |
| 2003/0104865 A1 | 6/2003 | Itkis |
| 2003/0105705 A1 | 6/2003 | Eyre |
| 2003/0106769 A1 | 6/2003 | Weiss |
| 2003/0110047 A1 | 6/2003 | Santosuosso et al. |
| 2003/0115456 A1 | 6/2003 | Kapoor |
| 2003/0126013 A1 | 7/2003 | Shand |
| 2003/0130927 A1 | 7/2003 | Beck et al. |
| 2003/0130948 A1 | 7/2003 | Algiene et al. |
| 2003/0139975 A1 | 7/2003 | Perkowski |
| 2003/0148807 A1 | 8/2003 | Acres |
| 2003/0149619 A1 | 8/2003 | Stanley et al. |
| 2003/0163425 A1 | 8/2003 | Cannon, Jr. |
| 2003/0167213 A1 | 9/2003 | Jammes et al. |
| 2003/0182218 A1 | 9/2003 | Blagg |
| 2003/0186747 A1 | 10/2003 | Nguyen |
| 2003/0187762 A1 | 10/2003 | Coyle |
| 2003/0200142 A1 | 10/2003 | Hicks et al. |
| 2003/0200144 A1 | 10/2003 | Antonucci et al. |
| 2003/0208445 A1 | 11/2003 | Compiano |
| 2003/0211883 A1 | 11/2003 | Potts |
| 2003/0216960 A1 | 11/2003 | Postrel |
| 2003/0216967 A1 | 11/2003 | Williams |
| 2003/0217002 A1 | 11/2003 | Enborg |
| 2003/0228902 A1 | 12/2003 | Walker |
| 2003/0229584 A1 | 12/2003 | Brown |
| 2003/0236704 A1 | 12/2003 | Antonucci |
| 2003/0236749 A1 | 12/2003 | Shergalis |
| 2004/0002369 A1 | 1/2004 | Walker et al. |
| 2004/0006531 A1 | 1/2004 | Kwan |
| 2004/0015438 A1 | 1/2004 | Compiano et al. |
| 2004/0019522 A1 | 1/2004 | Bortolin |
| 2004/0019560 A1 | 1/2004 | Evans et al. |
| 2004/0035923 A1 | 2/2004 | Kahr |
| 2004/0039644 A1 | 2/2004 | Postrel |
| 2004/0039692 A1 | 2/2004 | Shields et al. |
| 2004/0043806 A1 | 3/2004 | Kirby |
| 2004/0048658 A1 | 3/2004 | Sanders |
| 2004/0049423 A1 | 3/2004 | Kawashima et al. |
| 2004/0049439 A1 | 3/2004 | Johnston et al. |
| 2004/0053693 A1 | 3/2004 | An |
| 2004/0068438 A1 | 4/2004 | Mitchell |
| 2004/0078273 A1 | 4/2004 | Loeb et al. |
| 2004/0097287 A1 | 5/2004 | Postrel |
| 2004/0098317 A1 | 5/2004 | Postrel |
| 2004/0107140 A1 | 6/2004 | Postrel |
| 2004/0111346 A1 | 6/2004 | Mcbeath |
| 2004/0111366 A1 | 6/2004 | Schneider |
| 2004/0122736 A1 | 6/2004 | Bressler et al. |
| 2004/0128197 A1 | 7/2004 | Barn |
| 2004/0143500 A1 | 7/2004 | Lopez |
| 2004/0143501 A1 | 7/2004 | Lopez |
| 2004/0158492 A1 | 8/2004 | Lopez |
| 2004/0173673 A1 | 9/2004 | Potts |
| 2004/0186773 A1 | 9/2004 | George et al. |
| 2004/0199421 A1 | 10/2004 | Kurie et al. |
| 2004/0204990 A1 | 10/2004 | Lee et al. |
| 2004/0204991 A1 | 10/2004 | Monahan et al. |
| 2004/0215505 A1 | 10/2004 | Sullivan |
| 2004/0220854 A1 | 11/2004 | Postrel |
| 2004/0229671 A1 | 11/2004 | Stronach |

(56) References Cited

U.S. PATENT DOCUMENTS

| | | |
|---|---|---|
| 2004/0262381 A1 | 12/2004 | Mesaros |
| 2005/0000280 A1 | 1/2005 | Foster et al. |
| 2005/0015332 A1 | 1/2005 | Chen |
| 2005/0021399 A1 | 1/2005 | Postrel |
| 2005/0021400 A1 | 1/2005 | Postrel |
| 2005/0021401 A1 | 1/2005 | Postrel |
| 2005/0021457 A1 | 1/2005 | Johnson et al. |
| 2005/0043082 A1 | 2/2005 | Peterson |
| 2005/0043992 A1 | 2/2005 | Cohagan et al. |
| 2005/0060225 A1 | 3/2005 | Postrel |
| 2005/0060455 A1 | 3/2005 | Murdock et al. |
| 2005/0071228 A1 | 3/2005 | Bortolin et al. |
| 2005/0080727 A1 | 4/2005 | Postrel |
| 2005/0080728 A1 | 4/2005 | Sobek |
| 2005/0080748 A1 | 4/2005 | Belobaba et al. |
| 2005/0096124 A1 | 5/2005 | Stronach |
| 2005/0102151 A1 | 5/2005 | Fuwa et al. |
| 2005/0107155 A1 | 5/2005 | Potts et al. |
| 2005/0137015 A1 | 6/2005 | Rogers |
| 2005/0143174 A1 | 6/2005 | Goldman et al. |
| 2005/0149394 A1 | 7/2005 | Postrel |
| 2005/0177428 A1 | 8/2005 | Ganz |
| 2005/0177503 A1 | 8/2005 | Thomas |
| 2005/0177519 A1 | 8/2005 | Block |
| 2005/0182693 A1 | 8/2005 | Alivandi |
| 2005/0192864 A1 | 9/2005 | Ganz |
| 2005/0197904 A1 | 9/2005 | Baron et al. |
| 2005/0240392 A1 | 10/2005 | Munro et al. |
| 2005/0240472 A1 | 10/2005 | Postrel |
| 2005/0250415 A1 | 11/2005 | Barthold |
| 2005/0261056 A1 | 11/2005 | Smolucha |
| 2005/0267800 A1 | 12/2005 | Tietzen et al. |
| 2005/0284930 A1 | 12/2005 | Hefner et al. |
| 2005/0288998 A1 | 12/2005 | Venkiteswaran et al. |
| 2006/0004629 A1 | 1/2006 | Neemann et al. |
| 2006/0010033 A1 | 1/2006 | Thomas |
| 2006/0015404 A1 | 1/2006 | Tran |
| 2006/0020511 A1 | 1/2006 | Postrel |
| 2006/0035692 A1 | 2/2006 | Kirby |
| 2006/0046827 A1 | 3/2006 | Saffari et al. |
| 2006/0052150 A1 | 3/2006 | Hedrick et al. |
| 2006/0063580 A1 | 3/2006 | Nguyen |
| 2006/0063587 A1 | 3/2006 | Manzo |
| 2006/0079150 A1 | 4/2006 | Filoseta |
| 2006/0089874 A1 | 4/2006 | George et al. |
| 2006/0100018 A1 | 5/2006 | Ganz |
| 2006/0136301 A1 | 6/2006 | Grovit |
| 2006/0148559 A1 | 7/2006 | Jordan |
| 2006/0148566 A1 | 7/2006 | Lakshminarasimha |
| 2006/0178217 A1 | 8/2006 | Jung |
| 2006/0178899 A1 | 8/2006 | Jung |
| 2006/0178964 A1 | 8/2006 | Jung |
| 2006/0178965 A1 | 8/2006 | Jung |
| 2006/0178966 A1 | 8/2006 | Jung |
| 2006/0178967 A1 | 8/2006 | Jung |
| 2006/0178968 A1 | 8/2006 | Jung |
| 2006/0178970 A1 | 8/2006 | Jung |
| 2006/0178972 A1 | 8/2006 | Jung |
| 2006/0178975 A1 | 8/2006 | Jung |
| 2006/0178985 A1 | 8/2006 | Jung |
| 2006/0195331 A1 | 8/2006 | Cluts et al. |
| 2006/0195376 A1 | 8/2006 | Jung |
| 2006/0195377 A1 | 8/2006 | Jung |
| 2006/0195378 A1 | 8/2006 | Jung |
| 2006/0195394 A1 | 8/2006 | Jung |
| 2006/0205481 A1 | 9/2006 | Dominellil |
| 2006/0224505 A1 | 10/2006 | Jung |
| 2006/0229976 A1 | 10/2006 | Jung |
| 2006/0248007 A1 | 11/2006 | Frieden et al. |
| 2006/0253321 A1 | 11/2006 | Heywood |
| 2006/0253329 A1 | 11/2006 | Ariff et al. |
| 2006/0259326 A1 | 11/2006 | Ambekar et al. |
| 2006/0259364 A1 | 11/2006 | Bressler et al. |
| 2006/0277103 A1 | 12/2006 | Fujita et al. |
| 2006/0281541 A1 | 12/2006 | Nguyen et al. |
| 2006/0287898 A1 | 12/2006 | Murashita et al. |
| 2007/0038515 A1 | 2/2007 | Postrel |
| 2007/0055440 A1 | 3/2007 | Denker et al. |
| 2007/0073582 A1 | 3/2007 | Jung |
| 2007/0078719 A1 | 4/2007 | Filak et al. |
| 2007/0087822 A1 | 4/2007 | Van Luchene |
| 2007/0112631 A1 | 5/2007 | Voltmer et al. |
| 2007/0112632 A1 | 5/2007 | Voltmer et al. |
| 2007/0112643 A1 | 5/2007 | Veres et al. |
| 2007/0118461 A1 | 5/2007 | Arkes et al. |
| 2007/0124204 A1 | 5/2007 | Boer et al. |
| 2007/0129955 A1 | 6/2007 | Dalmia et al. |
| 2007/0143155 A1 | 6/2007 | Whitsett et al. |
| 2007/0167218 A1 | 7/2007 | Rothschild |
| 2007/0168266 A1 | 7/2007 | Questembert |
| 2007/0179839 A1 | 8/2007 | Neemann et al. |
| 2007/0179844 A1 | 8/2007 | Brannon et al. |
| 2007/0179850 A1 | 8/2007 | Ganjon et al. |
| 2007/0192187 A1 | 8/2007 | Becker et al. |
| 2007/0198335 A1 | 8/2007 | Edwards et al. |
| 2007/0219869 A1 | 9/2007 | Ariff et al. |
| 2007/0219924 A1 | 9/2007 | Shea et al. |
| 2007/0226074 A1 | 9/2007 | Ariff et al. |
| 2007/0239523 A1 | 10/2007 | Yi |
| 2007/0259709 A1 | 11/2007 | Kelly et al. |
| 2007/0265920 A1 | 11/2007 | Bistriceanu et al. |
| 2007/0276730 A1 | 11/2007 | Ahmed et al. |
| 2008/0021784 A1 | 1/2008 | Hessburg et al. |
| 2008/0021785 A1 | 1/2008 | Hessburg et al. |
| 2008/0040239 A1 | 2/2008 | Jacobi et al. |
| 2008/0077498 A1 | 3/2008 | Ariff et al. |
| 2008/0077499 A1 | 3/2008 | Ariff et al. |
| 2008/0086759 A1 | 4/2008 | Colson |
| 2008/0091482 A1 | 4/2008 | Whitsett et al. |
| 2008/0120219 A1 | 5/2008 | Chen |
| 2008/0147479 A1 | 6/2008 | Johnson |
| 2008/0182661 A1 | 7/2008 | Korp |
| 2008/0188308 A1 | 8/2008 | Shepherd et al. |
| 2008/0201224 A1 | 8/2008 | Owens et al. |
| 2008/0224822 A1 | 9/2008 | Alderucci et al. |
| 2008/0254893 A1 | 10/2008 | Larsen et al. |
| 2008/0274796 A1 | 11/2008 | Lube |
| 2008/0300990 A1 | 12/2008 | Guiton |
| 2008/0306826 A1 | 12/2008 | Kramer et al. |
| 2009/0023490 A1 | 1/2009 | Moshal et al. |
| 2009/0024483 A1 | 1/2009 | Urban |
| 2009/0063261 A1 | 3/2009 | Scribner et al. |
| 2009/0094118 A1 | 4/2009 | Antonucci et al. |
| 2009/0106112 A1 | 4/2009 | Dalmia et al. |
| 2009/0124384 A1 | 5/2009 | Smith et al. |
| 2009/0125402 A1 | 5/2009 | Voltmer et al. |
| 2009/0131143 A1 | 5/2009 | Kelly et al. |
| 2009/0156310 A1 | 6/2009 | Fargo |
| 2009/0171988 A1 | 7/2009 | Kikin-Gil |
| 2009/0177541 A1 | 7/2009 | Johnson, Jr. et al. |
| 2009/0177594 A1 | 7/2009 | Williams |
| 2009/0191525 A1 | 7/2009 | Shepherd |
| 2009/0192890 A1 | 7/2009 | Steinkamp et al. |
| 2009/0216633 A1 | 8/2009 | Whitsett et al. |
| 2009/0276292 A1 | 11/2009 | Inselberg |
| 2009/0287570 A1 | 11/2009 | Adamousky et al. |
| 2009/0292599 A1 | 11/2009 | Angelos et al. |
| 2009/0299845 A1 | 12/2009 | Antonucci et al. |
| 2009/0319371 A1 | 12/2009 | Young |
| 2010/0018046 A1 | 1/2010 | Pollabauer |
| 2010/0030578 A1 | 2/2010 | Raouf et al. |
| 2010/0057550 A1 | 3/2010 | Nguyen |
| 2010/0057551 A1 | 3/2010 | Blaisdell |
| 2010/0069147 A1 | 3/2010 | Parhum |
| 2010/0076862 A1 | 3/2010 | Lefkowitz |
| 2010/0078475 A1 | 4/2010 | Lin et al. |
| 2010/0082481 A1 | 4/2010 | Lin et al. |
| 2010/0088174 A1 | 4/2010 | Cohagan et al. |
| 2010/0099485 A1 | 4/2010 | Sommer et al. |
| 2010/0106583 A1 | 4/2010 | Etheredge et al. |
| 2010/0131369 A1 | 5/2010 | Doan et al. |
| 2010/0138344 A1 | 6/2010 | Wong et al. |
| 2010/0169188 A1 | 7/2010 | Buchheit et al. |
| 2010/0174600 A1 | 7/2010 | Walker et al. |

(56) References Cited

U.S. PATENT DOCUMENTS

| | | |
|---|---|---|
| 2010/0211469 A1 | 8/2010 | Salmon et al. |
| 2010/0227675 A1 | 9/2010 | Luxton et al. |
| 2010/0248823 A1 | 9/2010 | Smith |
| 2010/0250290 A1 | 9/2010 | Lefkowitz et al. |
| 2010/0260426 A1 | 10/2010 | Huang et al. |
| 2011/0010205 A1 | 1/2011 | Richards |
| 2011/0015955 A1 | 1/2011 | Hessburg et al. |
| 2011/0035269 A1 | 2/2011 | Cohagan et al. |
| 2011/0119120 A1 | 5/2011 | Kern et al. |
| 2011/0124390 A1 | 5/2011 | Wilen |
| 2011/0137806 A1 | 6/2011 | Spence, III |
| 2011/0145047 A1 | 6/2011 | Chetty et al. |
| 2011/0145087 A1 | 6/2011 | Daman et al. |
| 2011/0151976 A1 | 6/2011 | Holloway |
| 2011/0166922 A1 | 7/2011 | Fuerstenberg |
| 2011/0183749 A1 | 7/2011 | Allen |
| 2011/0202395 A1 | 8/2011 | Swan et al. |
| 2011/0202400 A1 | 8/2011 | Bedard et al. |
| 2011/0207525 A1 | 8/2011 | Allen |
| 2011/0238503 A1 | 9/2011 | Naini |
| 2011/0256924 A1 | 10/2011 | McGhie et al. |
| 2011/0264474 A1 | 10/2011 | Lefkowitz |
| 2011/0269533 A1 | 11/2011 | Kelly et al. |
| 2011/0270657 A1 | 11/2011 | Urban |
| 2011/0275432 A1 | 11/2011 | Lutnick et al. |
| 2011/0295693 A1 | 12/2011 | Clavin et al. |
| 2011/0302020 A1 | 12/2011 | Ariff et al. |
| 2012/0016730 A1 | 1/2012 | Antonucci et al. |
| 2012/0026534 A1 | 2/2012 | Uruma |
| 2012/0030000 A1 | 2/2012 | Hanini et al. |
| 2012/0035998 A1 | 2/2012 | Balagopal et al. |
| 2012/0041810 A1 | 2/2012 | Hofer |
| 2012/0041813 A1 | 2/2012 | Ariff et al. |
| 2012/0046960 A1 | 2/2012 | Salta |
| 2012/0078704 A1 | 3/2012 | Spence, III |
| 2012/0165093 A1 | 6/2012 | Takehiro |
| 2012/0191525 A1 | 7/2012 | Singh et al. |
| 2012/0221399 A1 | 8/2012 | Aloni et al. |
| 2012/0226535 A1 | 9/2012 | Subbarao et al. |
| 2012/0239520 A1 | 9/2012 | Lee |
| 2012/0271690 A1 | 10/2012 | Urban |
| 2012/0290368 A1 | 11/2012 | Im |
| 2012/0296763 A1 | 11/2012 | Lee |
| 2012/0310725 A1 | 12/2012 | Chien et al. |
| 2013/0019258 A1 | 1/2013 | Bhatia et al. |
| 2013/0103484 A1 | 4/2013 | McLaughlin |
| 2013/0124286 A1 | 5/2013 | Chen |
| 2013/0185131 A1 | 7/2013 | Sinha et al. |

FOREIGN PATENT DOCUMENTS

| | | |
|---|---|---|
| AU | 2497499 | 11/1999 |
| AU | 2497599 | 11/1999 |
| AU | 199924973 | 11/1999 |
| AU | 199924974 | 11/1999 |
| AU | 199924975 | 11/1999 |
| AU | 3018500 | 11/2000 |
| AU | 200030185 | 11/2000 |
| AU | 2003200145 | 8/2003 |
| AU | 2002368184 | 3/2004 |
| AU | 2004250640 | 12/2004 |
| CA | 24060001 | 10/2001 |
| CN | 101159078 | 3/2013 |
| EP | 0251619 | 1/1988 |
| EP | 0254812 | 2/1988 |
| EP | 0308224 | 3/1989 |
| EP | 0525363 | 2/1993 |
| EP | 0542298 | 5/1993 |
| EP | 0590861 | 4/1994 |
| EP | 0949596 | 10/1999 |
| EP | 1014320 | 6/2000 |
| EP | 1107196 | 6/2001 |
| EP | 1141876 | 10/2001 |
| EP | 1351180 | 10/2003 |
| EP | 1399897 | 3/2004 |
| EP | 1494183 | 9/2005 |
| EP | 1330729 | 11/2005 |
| EP | 1598762 | 11/2005 |
| EP | 1746550 | 1/2007 |
| EP | 1750817 | 2/2007 |
| EP | 1787250 | 5/2007 |
| EP | 1879143 | 2/2009 |
| EP | 2533190 | 1/2013 |
| GB | 22615779 | 5/1993 |
| GB | 2301919 | 12/1996 |
| GB | 2319381 | 5/1998 |
| GB | 2296413 | 6/1999 |
| GB | 2333879 | 8/1999 |
| GB | 2380687 | 4/2003 |
| JP | 8235276 | 9/1996 |
| JP | 2000322490 | 11/2000 |
| JP | 2001000469 | 1/2001 |
| JP | 01338179 | 12/2001 |
| JP | 01357248 | 12/2001 |
| JP | 02092390 | 3/2002 |
| JP | 02109286 | 4/2002 |
| JP | 02207898 | 7/2002 |
| JP | 03132224 | 5/2003 |
| JP | 04094643 | 3/2004 |
| WO | WO-9116691 | 10/1991 |
| WO | 9215174 | 9/1992 |
| WO | WO-9323817 | 11/1993 |
| WO | WO-9416781 | 8/1994 |
| WO | 9503570 | 2/1995 |
| WO | WO-9512169 | 5/1995 |
| WO | WO-9517711 | 6/1995 |
| WO | WO-9633568 | 10/1996 |
| WO | WO-9636024 | 11/1996 |
| WO | WO-9641315 | 12/1996 |
| WO | WO-9704411 | 2/1997 |
| WO | WO-9713228 | 4/1997 |
| WO | WO-9743727 | 11/1997 |
| WO | WO-9748078 | 12/1997 |
| WO | WO-9809447 | 3/1998 |
| WO | 9910061 | 3/1999 |
| WO | WO-9926176 | 5/1999 |
| WO | WO-9930256 | 6/1999 |
| WO | WO-9952051 | 10/1999 |
| WO | WO-9960503 | 11/1999 |
| WO | 0014665 | 3/2000 |
| WO | 0031658 | 6/2000 |
| WO | 0033159 | 6/2000 |
| WO | 0033222 | 6/2000 |
| WO | 0038088 | 6/2000 |
| WO | 0017794 | 8/2000 |
| WO | 0058862 | 10/2000 |
| WO | 0062231 | 10/2000 |
| WO | 0079461 | 12/2000 |
| WO | 0101282 | 1/2001 |
| WO | 0115031 | 3/2001 |
| WO | 0116815 | 3/2001 |
| WO | 0129750 | 4/2001 |
| WO | 0137171 | 5/2001 |
| WO | 0139059 | 5/2001 |
| WO | 0152078 | 7/2001 |
| WO | 0152135 | 7/2001 |
| WO | 0153929 | 7/2001 |
| WO | 0157617 | 8/2001 |
| WO | 0164306 | 9/2001 |
| WO | 0171579 | 9/2001 |
| WO | 0171580 | 9/2001 |
| WO | 0104823 | 10/2001 |
| WO | 0173665 | 10/2001 |
| WO | 0179966 | 10/2001 |
| WO | 0180111 | 10/2001 |
| WO | 0182115 | 11/2001 |
| WO | 0205179 | 1/2002 |
| WO | 0231737 | 4/2002 |
| WO | 0241556 | 5/2002 |
| WO | 0248828 | 6/2002 |
| WO | 02058020 | 7/2002 |
| WO | 02063410 | 8/2002 |
| WO | 02069101 | 9/2002 |

(56) References Cited

FOREIGN PATENT DOCUMENTS

| | | |
|---|---|---|
| WO | 02077884 | 10/2002 |
| WO | 02079925 | 12/2002 |
| WO | 02097582 | 12/2002 |
| WO | 03025867 | 3/2003 |
| WO | 03038560 | 5/2003 |
| WO | 03083730 | 10/2003 |
| WO | 03098495 | 11/2003 |
| WO | 03102843 | 12/2003 |
| WO | 2004012111 | 2/2004 |
| WO | 2004019257 | 3/2004 |
| WO | 2004079506 | 9/2004 |
| WO | 2004090666 | 10/2004 |
| WO | 2004090666 A2 | 10/2004 |
| WO | 2004090666 A3 | 10/2004 |
| WO | 2004092849 A2 | 10/2004 |
| WO | 2004092894 | 10/2004 |
| WO | 2004095194 | 11/2004 |
| WO | 2004104950 | 12/2004 |
| WO | 2005003903 | 1/2005 |
| WO | 2005006113 | 1/2005 |
| WO | 2005059683 | 6/2005 |
| WO | 2005067431 | 7/2005 |
| WO | 2005073887 | 8/2005 |
| WO | 2005079422 | 9/2005 |
| WO | 2005082480 | 9/2005 |
| WO | 2005086899 | 9/2005 |
| WO | 2005096899 | 10/2005 |
| WO | 2006019359 | 2/2006 |
| WO | 2006019368 | 2/2006 |
| WO | 2006020413 | 2/2006 |
| WO | 2006022593 | 3/2006 |
| WO | 2006026203 | 3/2006 |
| WO | 2006043330 | 4/2006 |
| WO | 2006062925 | 6/2006 |
| WO | 2007106745 | 9/2007 |
| WO | 2007067712 | 11/2007 |
| WO | 2006138595 | 6/2008 |
| WO | 2008045650 | 10/2008 |
| WO | 2008147943 | 12/2008 |
| WO | 2009070889 | 6/2009 |
| WO | 2009094395 | 7/2009 |
| WO | 2009126452 | 10/2009 |
| WO | 2010019303 | 2/2010 |
| WO | 2011046469 | 4/2011 |
| WO | 2011026120 | 6/2011 |
| WO | 2012051455 | 4/2012 |
| WO | 2012162634 | 11/2012 |
| WO | 2013067035 | 5/2013 |

OTHER PUBLICATIONS

"AT&T Offers Ideas for Last-Minute Gifts and Stocking Stuffers." Business Wire. Dec. 1, 1994.
"Continental Airlines Offers Grammy Awards Tickets at the OnePass Online Auction." PR Newswire. Jan. 23.
"Personal Optimized Decision/Transaction Program"; IBM Technical Disclosure Bulletin. TDB v38 n1, Jan. 1995, p. 83-84.
"How to Earn and Redeem Miles on Continental Airlines"; OnePass Program Guide. May 2002.
"Web Beacon", <http://www.webopedia.com/TERM/W/Web-beacon.html>. Aug. 21, 2003.
Asbrand, Deborah. "Taking Stock in Tradingexchanges"; EDN Network; Apr. 1, 2000. <http://www.edn.com/electronics-news/4360134/Taking-stock-in-tradingexchanges>.
Dalton, Gregory. "Going, Going, Gone!: E-commerce is leading to an anything-goes environment of online bidding and dynamic pricing" <http://www.dbliss.net/900%20-%20GENERAL/Articles/e-commerce_bidding.txt>.
Edwards, Morris. "New B2B Player Spreads Benefits of E-commerce"; Communications News; Jan. 1, 2001 <http://www.thefreelibrary.com?/_/print/PrintArticle.aspx?id=71060774>.
Fisher, Dennis. "More Goods on the Block"; eWeek; Dec. 18, 2000. <http://www.eweek.com/c/a/Web-Services-Web-20-and-SOA/More-Goods-on-the-Block>.
Franse, Karen. "Distribution Briefs"; CRN; Mar. 22, 2002. <http://www.crn.com/news/channel-programs/18818846/distribution-briefs.htm>.
Furger, Roberta. "Working the Web Bazaar"; Computerworld; Mar. 20, 2000. <http://www.computerworld.com.au/article/103901/working_web_bazarr>.
Kumar, Manoj. "Sales Promotions on the Internet". IBM Research Division, T.J. Watson Research Center, Yorktown Heights, NY 10598. 3rd USENIX Workshop on Electronic Commerce. Aug. 31-Sep. 3, 1998.
Lindsay, Jeff. "The Historic Use of Computerized Tools for Marketing and Market Research: A Brief Survey". Kimberly-Clark Corporation. Dec. 27, 2001. <http://www.jefflindsay.com/market-research.shtml>.
Hello Direct Store Joins eBay Network of Merchants; Customers Bid for Savings on Premier Headsets, Conferencing Equipment, and Other Name-Brand Telephony and Communications Products; PR Newswire; May 23, 2002.
Ohlson, Kathleen. "Looking Behind, Beyond B2B Marketplace Woes"; Network World Fusion; Jun. 11, 2001. <http://www.networkworld.com/archive/2001/119669_06-11-2001.html>.
Patel, Jeetu. "New Platform Options Fuel E-Commerce"; Information Week Online. Mar. 27, 2000. <http://www.informationweek.com/779/ecommerce.htm>.
Pressler, Margaret, "Sells on eBay; Housewife finds herself head of multinational software firm", Washing Post, Proquest # 44484325, Sep. 5, 1999.
Preist, Chris; Adaptive Agents in a Persistent Shout Double Auction; HP Laboratories Bristol, HPL-2003-242; Dec. 4, 2003.
Warbelow, A. et al., "Aucnet: TV Auction Network System", Source: Harvard Business School; 16 pages. Publication Date: Jul. 19, 1989. Prod. #: 190001-PDF-ENG.
Yahoo! Launches Three New European Auctions Services; Yahoo! Italy, Yahoo! Spain and Yahoo! Sweden Unveil New Local Auctions; Santa Clara, Calif.—Sep. 23, 1999.
Grubbs, L. "Top 5 auction utilities", PC World.com, San Francisco, CA (Dec. 4, 2000).
M2 Presswire, "United Technologies; UTC's Carrier Corp. teams with FreeMarkets to create largest Asian-based B2B online auction market to date; UTC Division identifies average annal savings of more than 16 percent on electirc motors through Free Markets B2B eMarketpla", M2 Presswire, (Mar. 21, 2000.
Jodi Mardesich; Onsale Takes Auction Gavel Electronic; Site Offers Clearance for End-Of-Life Products. (Onsale Internet Auction Site) (Company Business and Market; Jul. 8, 1996.
Kevin Merrill; GE Capital to Extend Integrator Buying Spree. (GE Capital Technology Management Services to Acquire Compunet Computer AG); Jul. 8, 1996.
Valerie Block; Going going, virtually gone; Crain's New York Business; May 18, 2008.
Mitsubishi Venture, Wells Fargo Partner to Offer Multi-Currency E-Commerce Storefront; Santa Clara, Calif., and San Francisco, Mar. 1 /PRNewswire/.
Peerflix Trading Platform Manages Over One Million DVD Records; Legal Peer to Peer Platform Grows to Over One Million Combined DVDs Available and Requested for Trade Enabling Several Members to Swap Over One Thousand DVDs Each; BusinessWire; Jun. 8, 2006.
PSINet Teams with WorldPay Ltd. to Launch the World's First Secure Multi-Currency Solution for International Electronic Commerce; PRNewswire; Oct. 6, 1997.
Brown, Janelle; "What does it take to make a buck off of Usenet?" http://www.salon.com/1999/05124/deja/ May 24, 1999.
Yahoo! Regional: Countries: Afghanistan; http://www.web.archive.org/web/20060923045804/http://dir.yahoo.com/Regional/countries/afghanistan; Jun. 16, 1997.
Yahoo! Regional: Countries: Sweden; http://www.web.archive.org/web/19970616194441/www.yahoo.com/Regional/countries/sweden; Jun. 16, 1997.
Yahoo! Auctions Celebrates One-Year Anniversary; As Online Auction Usage Continues to Grow, Yahoo! is Quickly Becoming the World Marketplace of the New Millenium; Sep. 14, 1999.

(56) References Cited

OTHER PUBLICATIONS

"U.S. Appl. No. 09/734,044 Final Office Action mailed Jan. 4, 2008, 15 pgs".
"U.S. Appl. No. 09/734,044, Response filed Oct. 18, 2007 to Non-Final Office Action mailed Sep. 13, 2007, 17 pgs."
"U.S. Appl. No. 09/734,044, Response filed Mar. 4, 2008 to Final Office Action mailed Jan. 4, 2008, 15 pgs".
"U.S. Appl. No. 09/734,044 Advisory Action Mailed May 2, 2008, 3 pgs".
"U.S. Appl. No. 09/602,110, Final Office Action mailed Mar. 8, 2006, 11 pgs".
"U.S. Appl. No. 09/602,110, Final Office Action mailed Nov. 21, 2005, 11 pgs".
"U.S. Appl. No. 09/602,110, Non Final Office Action mailed Jan. 21, 2004, 13 pgs".
"U.S. Appl. No. 09/602,110, Response filed Jan. 3, 2005 to Final Office Action mailed Sep. 2, 2004, 16 pgs".
"U.S. Appl. No. 09/602,110, Response filed Jan. 23, 2006 to Final Office Action mailed Nov. 21, 2005, 15 pgs".
"U.S. Appl. No. 09/602,110, Response filed May 8, 2006 to Final Office Action mailed Mar. 8, 2006, 17 pgs".
U.S. Appl. No. 09/602,110 Advisory Action mailed May 26, 2006, 3 pgs.
"U.S. Appl. No. 09/602,110 Final Office Action mailed Sep. 2, 2004, 13 pgs".
"U.S. Appl. No. 09/602,110 Response filed Aug. 4, 2005 to Non Final Office Action mailed Apr. 5, 2005, 19 pgs".
Edwards, Mark J. "Your Web Browser is Bugged"; Windows IT Pro; Jul. 12, 2000. <http://www.windowsitpro.com/print/security/your-web-browse-bugged>.
Hoeschen, Brad; Brookfield Square hopes mall card strikes a chord. (Brookfield Square Shopping Center; credit card); The Business Journal; Sep. 12, 1997.
Ivanov et al; Design aesthetics leading to m-loyalty in mobile commerce; Emerald; Information & Management; Dec. 2006; vol. 43; Issue 8; pp. 950-963.
Jayaram et al; Arbitrage, cointegration, and the joint dynamics of prices across discrete commodity futures auctions; The University of Scranton; Sep. 7, 1999.
What is MilePoint?; Wayback machine; Aug. 1, 2001.
Patch, K. Sled, Internic Debut Internet Services; PC Week, 1994.
Phillips offers customers financing through citicorp. (Phillips Medical Systems North America, Citicorp North America Inc.); Health Industry Today; Jun. 1, 1991.
Points.com; "Stuff it"; Dec. 10, 2005; wayback machine.
Rent from NetFlix.com. Buy from Amazon.com; WaybackMachine; Nov. 5, 1999.
Edmund Sanders; Here's the Deal on Playing Card Games; Chicago Tribune; Business; Aug. 18, 1997.
Service helps hospitals shop online; Link-Up; Jun. 2000, vol. 17, Issue 3, p. 14.
Sinclair Stewart; To Mail or Not to Mail?; Strategy bold vision brand new ideas; Oct. 12, 1998.
Sarah Stambler; Marketing with Technology News; An Emerging Digital Trend: Living in the age of electronic proxy; Dec. 1998; vol. 8, issue 4.
Tecmark's Channel Loyalty Marketing programs engage and reward the people who are selling your products; http://tecmarkloyalty.com/loyaltyservices/channel/; Aug. 14, 2012.
WellsPark Group Launches "V.I.P. Rewards"; the Most Comprehensive Relationship Marketing Program Ever Created by a Mall Developer; Business Wire; May 19, 1998.
Renee Wijnen; CUC-HFS merger expected to yield an additional 2 million club members; Direct Marketing News; Jan. 26, 1998.
Amazon.com and Netflix.com Establish Promotional Relationship for the Sale and Rental of DVD Titles Business Wire Dec. 4, 1998, 3 pp.
Block, Valerie. "GM turns up the heat with plan to cross-sell some financial products." Nov. 18, 1994, http://www.americanbanker.com/issues/159_150/-49630-1.html?zkPrintable=true.
Beneficial, Casual Male Team Up on Card, American Banker. May 4, 1998. http://www.americanbanker.com.
Bloom, Jennifer Kingson. "Wal-Mart on Retail Road Less Traveled: Cobranding," The American Banker Sep. 11, 1998, 3 pp.
Elkin, Tobi "Promotions: Mastercard Wins Coveted On-Pack Real Estate in Tie-in with Microsoft" Brandweek Sep. 14, 1998, 1 page.
Microsoft and First USA Announces $90 Million Online Advertising Alliance EDP Weekly's IT Monitor Nov. 2, 1998, 2 pp.
Feldman, Amy "Paying with Plastic Not Such a Smart Idea", New York Daily News Nov. 4, 1998, 2 pp.
Cowell, Alan "America's Turn to Colonize; Creditcard Issuers Invade Britain, with U.S. Firepower", The New York Times Nov. 12, 1998, 5 pp.
Armstrong, Larry, "The Free-PC Game: Lure 'Em in and Lock 'Em Up," Business Week, Information Technology, Jul. 19, 1999, 1 pg.
Shoppers Charge Accounts Co. to Administer Private Label Credit Card for Lew Magram LTD; Program Marks SCA,s Entry into Retail Catalog/Mail Order Industry PR Newswire Jun. 29, 1998, 6 pp.
Non Final Rejection dated Mar. 6, 2012; U.S. Appl. No. 13/359,120; pp. 1-7.
Souccar, Miriam K. "Epidemic of Rate Shopping Spurs a Search for remedies," Jan. 7, 1999, Copyright 1999 American Banker, Inc.
Jay Jacobs Inc. Introduces Private Label Credit Card, Business Wire May 18, 1998, 1 page.
Meece, Mickey "Big Finance Companies May Want Piece of Limited's Private-Label Card Program", The American Banker Apr. 12, 1995, 2 pp.
Points Earn Little Credit as Cardholders Fail to Cash in Birmingham Post May 9, 1998, 2 pp.
Notice of Allowance; U.S. Appl. No. 13/359,120; Mailing Date Apr. 18, 2012.
Wald, Matthew L. "Spending It; Untying Cellular Phones From Those Annual Contracts" The New York Times Mar. 15, 1998, 2 pp.
Sanders, Edmund "Tricky Business; The Magic of Rebate Cards can Quickly Disappear", Chicago Tribune Aug. 18, 1997, 3 pp.
Simon, Ruth "Make Sure Your Rebate Card Still Delivers the Goods", Money Aug. 1997, 2 pp.
Selasky, Susan "Easy-To-Swallow Savings; Diner Credit Cards Serve Wide menu of Discounts", Pittsburgh Post-Gazette Dec. 5, 1996, 3 pp.
Chemical Bank and AT&T Smart Cards form Strategic Alliance, www.att.com/press/1193/931117.blb.html, 3 pp.
Kristof, Kathy "Card Sharks are in Season; be Wary of Discounts and Rebates as You Shop Around for Good Credit Deals", Chicago Tribune, Nov. 23, 1993, 2 pp.
Wessel, Harry "Rewarding Experience?; Credit Cards Offering Bonuses Not for Everyone", Chicago Poet-Gazette Dec. 5, 1996, 3 pp.
Ross, Chuck et al., "Coke Card promotion set for '98", (http //adage com/news.sub.--and.sub.--features/features/19971117/article3 html), Copyright Nov. 1997, 2 pp.
Singletary, Michelle, "Electronic World, Unchecked Problem?", The Washington Post, Mar. 4, 1997, Section: Financial, p. C01, 4 pp.
Cox, Beth, "Visa, Travelweb Enter Online Marketing Partnership," Internetnews.com, Jan. 21, 1999, 1 pg.
Tedesco, Richard. "Pactel Pushes Net Access." Broadcasting & Cable. Jun. 3, 1996, pp. 64-65.
Colman, Price. "Cross-marketing Cuts Cable Bills." Broadcasting & Cable. Jul. 15, 1996, p. 44, 2 pp.
O'Brien, Timothy L., "The Market: Market Place—Taking the Danger out of Danger out of Risk; Chase says Models Helped it avoid Financial Minefields," The New York Times Business/Financial Desk, Jan. 20, 1999 Section C. col. 2 at p. 1, 4 pp.
Let's Play the Cash Register Receipts Lottery, The New York Times, Dec. 25, 1990, Section: Section 1, p. 30, col. 4, Editorial Desk, 1 pg.
Dennis, Sylvia. "Visa Gets ready for Interactive Set-Top Boxes," Newsbytes, Dec. 14, 1998, 2 pp.
Winn-Dixie/The Salvation Army Report Contributions for War Against Hunger, PR Newswire, Jun. 10, 1993, Section: Financial News, 1 pg.
Armstrong, Larry. "Coupon Clippers, save Your Scissors," Vons Supermarkets are Revolutionizing the Delivery of Discounts. Business week, Jun. 20, 1994, No. 3377 at p. 164, 2 pp.

(56) References Cited

OTHER PUBLICATIONS

Brochure: "MyPoints (R)", MotivationNet, Inc. (TM), Homepage: www.mypoints.com, Copyright: Apr. 1998, 29 pp.
Bonnici, Joseph et al., "Consumer issues in coupon usage: An exploratory analysis", Journal of Applied Business Research, winter 1996/1997, vol. 13, No. 1, pp. 31-40, ISSNn: 0892-7626, CODEN: JPBEBK, 11 pp.
Non Final Rejection dated Mar. 12, 2012; U.S. Appl. No. 13/359,104; pp. 1-8.
Iverson, Mark. "DataCard Partners With CSI to Offer Card-Based Loyalty Solution to Merchants." Jul. 9, 1998; http://www.thefreelibrary.com/_/print/PrintArticle.aspx?id=20883274.
Cardbriefs: Stored-Value Card Designed for Casinos, The American Banker, Oct. 31, 1995, Section: Credit/Debit/ATMS, 1 pg.
WAP WTLS: Wireless Application Protocol Wireless Transport Layer Security Specification, Wireless Applications Forum, Limited, Feb. 18, 2000. [Retrieved on Jan. 19, 2009]. Retrieved from the Internet <Oct. 7, 2008>.
Fallon: "UK Retailers Loyal Customer 'Card Wars' Prove costly (Most major retailers in the UK have grown their sales over the past 2 years by lunching loyalty-card program"; Supermarket News, May 5, 1997; vol. 47, No. 18, p. 57.
Fickenscher, Lisa, "Merchant: American Express Seeks to Mine Its Data on Cardholder Spending Patters", The American Banker, Mar. 24, 1997, Credit/Debit/ATMS, 2 pp.
Fickenscher, Lisa, "Amex to Start Free Rewards Program with Discounts on Merchandise", The American Banker, Oct. 18, 1996, Section: Credit/Debit/ATMS, p. 10, 2 pp.
Fitzgerald, Kate, "Amex program moves loyalty to next level: Custom Extras finds a medium customers can't ignore: Billing Statements", Advertising Age, Nov. 4, 1996, Section: News, 2 pp.
Amato-McCoy, Deena, "Co-Branded Acme Credit Card Rewards Loyal Users" Supermarket News, Jun. 15, 1998, Section: p. 17, ISSN: 0039-5803, 2 pp. cited by DataCard Partners With CSI to Offer Card-Based Loyalty Solution to Merchants, Business Wire, Jul. 9, 1998, 1 pg.
Notice of Allowance; U.S. Appl. No. 13/441,365; Mailing Date Jun. 16, 2012.
Non Final Rejection dated May 4, 2012; U.S. Appl. No. 13/428,656; pp. 1-6.
Notice of Allowance; U.S. Appl. No. 13/428,656; Mailing Date May 15, 2012.
Turek, Norbert. "Online Portals Offer Bandwidth and Voice Services"; May 1, 2000. <http://www.informationweek.com/784/bandwidth.htm>.
Weiss, Scott. "Pan Am FF Program"; Business Wire. Oct. 15, 1996. <https://groups.google.com/forum/?hl=en#!msg/rec.travel.air/EzyB24GQzE4/H450aifuJSkJ>.
Yuh-Jzer Joung; On Personal data license design and negotiation; Jul. 26-28, 2005; Computer Software and Application Conference.
"U.S. Appl. No. 09/976,301 Response filed Oct. 24, 2006 to Final Office Action mailed Aug. 25, 2006, 6 pgs".
"U.S. Appl. No. 09/976,301 Response filed Dec. 19, 2006 to Advisory Action mailed Nov. 30, 2006, 16 pgs".
"U.S. Appl. No. 10/252,126, Final Office Action mailed Jun. 27, 2006, 11 pgs".
"U.S. Appl. No. 10/252,126, Non Final Office Action mailed Jan. 30, 2007, 9 pgs".
"U.S. Appl. No. 10/252,126, Non Final Office Action mailed Feb. 3, 2006, 8 pgs".
"U.S. Appl. No. 10/252,126, Non Final Office Action mailed Aug. 20, 2007, 8 pgs".
"U.S. Appl. No. 10/252,126, Response filed May 3, 2006 to Non Final Office Action mailed Feb. 3, 2006, 7 pgs".
"U.S. Appl. No. 10/252,126, Response filed Jun. 25, 2007 to Non Final Office Action mailed Jan. 30, 2007, 11 pgs".
"U.S. Appl. No. 10/252,127, Advisory Action mailed Jan. 10, 2007, 3 pgs".
"U.S. Appl. No. 10/252,127, Final Office Action mailed Oct. 6, 2006, 10 pgs".
"U.S. Appl. No. 10/252,127, Non Final Office Action mailed Mar. 21, 2006, 9 pgs".
"U.S. Appl. No. 10/252,127, Non Final Office Action mailed Jul. 11, 2007, 9 pgs".
"U.S. Appl. No. 10/252,127, Response filed Jun. 21, 2006 to Non Final Office Action mailed Mar. 21, 2006, 8 pgs".
"U.S. Appl. No. 10/252,127, Response filed Dec. 6, 2006 to Final Office Action mailed Oct. 6, 2006, 14 pgs".
"U.S. Appl. No. 10/252,129, Final Office Action mailed Dec. 27, 2006, 12 pgs".
"U.S. Appl. No. 10/252,129, Non Final Office Action mailed May 15, 2007, 10 pgs".
"U.S. Appl. No. 10/252,129, Non Final Office Action mailed Aug. 18, 2006, 10 pgs".
"U.S. Appl. No. 10/252,129, Response filed Aug. 13, 2007 to Non-Final Office Action mailed May 15, 2007, 16 pgs".
U.S. Appl. No. 10/252,129, Response filed Oct. 5, 2006 to Non Final Office Action mailed Aug. 18, 2006, 15 pgs.
"U.S. Appl. No. 10/252,129 Advisory Action mailed Mar. 13, 2007, 3 pgs".
U.S. Appl. No. 10/252,129 Response filed Feb. 22, 2007 to Final Office Action mailed Dec. 27, 2006, 14 pgs.
"U.S. Appl. No. 10/412,194, Non-Final Office Action mailed Mar. 13, 2008, 31 pgs."
"U.S. Appl. No. 10/412,194, Non-Final Office Action mailed Oct. 10, 2008, 8 pgs".
"U.S. Appl. No. 10/412,194 Response filed Jun. 13, 2008 to Non-Final Office Action mailed Mar. 13, 2008, 20 pgs."
"U.S. Appl. No. 10/607,587, Response filed Feb. 28, 2008 to Non-Final Office Action mailed Nov. 30, 2007, 15 pgs."
"U.S. Appl. No. 10/607,587, Response filed Oct. 16, 2008 to Final Office Action mailed Apr. 21, 2008, 15 pgs."
"U.S. Appl. No. 10/607,587 Response filed Jun. 19, 2008 to Final Office Action mailed Apr. 21, 2008, 17 pgs".
"U.S. Appl. No. 10/607,587, Non-Final Office Action mailed Nov. 30, 2007, 19 pgs".
"U.S. Appl. No. 10/607,587, Final Office Action mailed Apr. 21, 2008, 30 Pages".
"U.S. Appl. No. 10/608,525, Advisory Action mailed Jul. 29, 2008, 3 pgs."
"U.S. Appl. No. 10/608,525, Final Office Action mailed May 1, 2008, 8 pgs".
"U.S. Appl. No. 10/608,525, Pre-Appeal Brief mailed Jul. 31, 2008, 2 pgs."
"U.S. Appl. No. 10/608,525, Response filed Jan. 11, 2008 to Non-Final Office Action mailed Sep. 11, 2007, 15 pgs."
"U.S. Appl. No. 10/608,525, Response filed Oct. 16, 2008 to Final Office Action mailed May 1, 2008, 17 pgs."
"U.S. Appl. No. 10/608,525 Response filed Jul. 1, 2008 to Final Office Action mailed May 1, 2008, 15 pgs."
"U.S. Appl. No. 10/608,525, Non-Final Office Action mailed Sep. 11, 2007, 6 pgs".
Piccinelli, G., et al. "E-service Composition: Supporting Dynamic Definition of Process-Oriented Negotiation Parameters", 12th International Workshop on Database and Expert System Applications. <http://computer.org/csdl/proceedings/dexa/2001/1230/00/12300727-abs.html>.
Seminerio, Maria. "When You Gotta Take Stock"; Dec. 11, 2000. <http://www.eweek.com/c/a/Finance-IT/When-You-Gotta-Take-Stock>.
Strassmann, Paul A. "The Impact of B2B"; Computerworld. Oct. 2, 2000. <http://www.computerworld.com/s/article/51535/The_impact_of_B2B?pageNumber=1>.
Weiss, Scott. "Pan Am FF Program"; Business Wire. Oct. 15, 1996. <https://groups.google.com/forum?hl=en#!msg/rec.travel.air/EzyB24GQzE4/H450aifuJSkJ>.
Notice of Allowance; U.S. Appl. No. 13/681,479; Mailing Date Sep. 6, 2013.
Notice of Allowance; U.S. Appl. No. 13/681,493; Mailing Date Sep. 23, 2013.
Aadvantage Auction; Bid on VIP Experiences with Aadvantage Miles; aa.com; Aug. 14, 2012.

(56) References Cited

OTHER PUBLICATIONS

Abby, Ellin; Personal Business; Listening to an Earful for Savings; The New York Times; Jan. 24, 1999.
Albright, Mark; Grocery savings via Web coupons; St. Petersburg Times; Jul. 22, 1998.
American Eagle Outfitters, Inc; The clear choice for shopping this season is at American Eagle Outfitters, Warren, PA, Mar. 26; PR Newswire.
Bush, Michael; Emaginet Launches Personalized Web Coupons; Direct Marketing News; Nov. 18, 1998; p. 1-3.
Cathleen McCarthy; Turning miles directly into cash gains favor. Companies target shoppers with unredeemed rewards; CreditCards. com; Oct. 10, 2013.
Notice of Allowance; U.S. Appl. No. 13/359,104; Mailing Date Apr. 13, 2012.
Non Final Rejection dated Mar. 6, 2012; U.S. Appl. No. 13/359,080; pp. 1-11.
Notice of Allowance; U.S. Appl. No. 13/359,080; Mailing date Apr. 11, 2012.
Non Final Rejection dated Jan. 10, 2012; U.S. Appl. No. 12/759,506; pp. 1-10.
Notice of Allowance; U.S. Appl. No. 12/759,506; Mail date Mar. 5, 2012.
Non Final Rejection dated Dec. 15, 2012; U.S. Appl. No. 12/720,743; pp. 1-10.
Notice of Allowance; U.S. Appl. No. 12/720,743; Mailing date Jan. 24, 2012.
Non Final Rejection dated May 12, 2009; U.S. Appl. No. 11/420,255; pp. 1-7.
Notice of Allowance; U.S. Appl. No. 11/420,255; Mailing Date Dec. 16, 2009.
Non Final Rejection dated Sep. 24, 2012; U.S. Appl. No. 13/542,451; pp. 1-6.
Notice of Allowance; U.S. Appl. No. 13/542,451; Mailing Date Nov. 5, 2012.
Non Final Rejection dated Sep. 7, 2012; U.S. Appl. No. 13/532,342; pp. 1-6.
Notice of Allowance; U.S. Appl. No. 13/532,342; Mailing Date Sep. 24, 2012.
Non Final Rejection dated Sep. 6, 2012; U.S. Appl. No. 13/531,904; pp. 1-6.
Notice of Allowance; U.S. Appl. No. 13/531,904; Mailing Date Sep. 19, 2012.
Non Final Rejection dated Jul. 17, 2012; U.S. Appl. No. 13/479,417; pp. 1-11.
Notice of Allowance; U.S. Appl. No. 13/479,417; Mailing Date Jul. 30, 2012.
Notice of Allowance; U.S. Appl. No. 13/441,365; Mailing Date Jun. 18, 2012.
Joan Magretta—"Why Business Models Matter" Harvard Business Review—May 2002 pp. 1-8.
"Combinable Miles Are the Stuff of Frequent Flyers' Dreams" <http://www.frequentflier.com/news-analysis/features/combinable-miles-are-the-stuff-of-frequent-flyers-dreams> May 25, 1998.
Gordon Carey, "Multi-tier Copay", Pharmaceutical Executive (Feb. 2000).
David S. Evans "Some Empirical Aspects of Multi-sided Platform Industries"—NERA Economic Consulting; Review of network Economics; vol. 2 Issue 3—Sep. 2003; pp. 191-209.
Uncles et. al. "Do Customer Loyalty programs Really Work"; MIT Sloan Management Review; Jul. 15, 1997.
"@wards online," Canadian Airlines, http://www.web.archive.org/web/19970704234541/www.cdnair.ca/cpi.html, Copyrigght 1994-1997.
Louise O'Brien & Charles Jones—"Do Rewards Really Creat Loyalty"?—Harvard Business Review; May-Jun. 1995; pp. 73-83.
Frederick F. Reichheld & Phil Schefter—"E-Loyalty—Your secret Weapon on the Web"—Harvard Business Review; Jul.-Aug. 2000; pp. 105-113.

Molly Plozay & Julie Bohn—"How Merchant-Funded Rewards Give new Life to Customer Loyalty programs"—First Data; Oct. 2008; firstdata.com—pp. 1-10.
Rajiv Lal—"Harrah's Entertainment Inc."—Harvard Business School; 9-502-011; Rev. Jun. 14, 2004; pp. 1-27.
Avery Johnson—"Hotels Take 'Know Your Customer' to New Level"—The Wall Street Journal—Feb. 7, 2006; p. D1.
Anthony T.H.Chin—"Impact of Frequent Flyer Programs on the Demand for Air Travel"—Department of Economics; National University of Singapore; Journal of Air Transportation; vol. 7, No. 2—2002; pp. 53-86.
Frederick F. Reichheld—"Loyalty-Based Management"—Harvard Business Review; Mar.-Apr. 1993; pp. 63-74.
Peter Jin Hong, creative director at Tribal DDB in Vancouver—"Digital Eye".
Business Insider. "The American Airlines—US Airways Merger Will Unite 2 Companies With Tumultuous Pasts" Feb. 14, 2013. http://www.businessinsider.com/questions-about-the-american-us-airways-merger-2013-2.
Christina Binkley—"Taking Retailers' Cues, Harrah's Taps into Science of Gambling"—The Wall Street Journal; Nov. 22, 2004—p. A1.
Werner Reinartz and V. Kumar—"The Mismanagement of Customer Loyalty"—Harvard Business Review; Jul. 2002 pp. 2-12.
KN Llewellyn—Meet Negotiable Instruments; Columbia Law Review 1944.
US General Accounting Office—Report to Congressional Requesters: Aviation Competition—"Effects on Consumers From Domestic Airline Alliances Vary". Jan. 1999.
Baig, E. "Going Once. Going Twice. Cybersold!" Business week; Jul. 31, 1997.
American Express has added Virgin Atlantic and Hawaiian Airlines to its Flight Finder feature under its Membership Rewards program. ( Loyalty Programs ); Business Traveler, v 21, n 1, p. 26; Dec. 2007.
EDebitPay Rewards: BSP to provide custom rewards-mall for EDP; Business Wire, p NA; Jan. 7, 2008.
"New Evidence about Positive Three-Tier Co-pay Performance Presented at Express Scripts 2000 Outcomes Conference", PR Newswire Association, Inc. (Jun. 28, 2000).
"Shell Introduces Optional Credit Card", The Associated Press (Sep. 4, 1985).
http://www.marketingmagazine.co.uk/article/158930/beenz-founder-creates-voucher-loyalty-programme-mobiles; Marketing; Sep. 25, 2002.
Mediappraise Receives National Award for Web-based Technology That Enables Companies to Solve Thorny HR Problem; Dec. 15, 1998; Business Wire; http://www.thefreelibrary.com/_/print/PrintArticle.aspx?id=53400697.
Om et al.; Cash Machines offer a whole lotto money for withdrawl; an unfortunate juxtaposition; block that metaphor!; something street talk; fishy in springfield; State street Sears?; Champion as underdog; A 'Whole Language' graduate; Crain's Chicago Business; Jun. 17, 1995.
Piccinelli, G., et al. "E-service Composition: Supporting Dynamic Definition of Process-Oriented Negotiation Parameters", 12th International Workshop on Database and Expert System Applications. <http://computer.org/csdl/proceedings/dexa/2001/1230/00/12300727-abs.html>; Sep. 2007.
San Luis Obispo, CA; At Sports Superstore Online, Shoppers Get More for Their Money; 10,000 Reasons to Shop at Sports Superstore Online; Business Wire; Dec. 4, 1998.
"U.S. Appl. No. 09/734,044 Final Office Action maied Jan. 5, 2004, 7 pgs".
"U.S. Appl. No. 09/734,044 Final Office Action mailed Mar. 7, 2007, 15 pgs".
"U.S. Appl. No. 09/734,044 Final Office Action mailed Apr. 25, 2005, 11 pgs".
"U.S. Appl. No. 09/734,044 Non Final Office Action mailed Aug. 11, 2004, 13 pgs".
"U.S. Appl. No. 09/734,044 Non Final Office Action mailed Aug. 18, 2003, 7 pgs".
"U.S. Appl. No. 09/734,044 Non Final Office Action mailed Aug. 29, 2006, 15 pgs".

(56) References Cited

OTHER PUBLICATIONS

"U.S. Appl. No. 09/734,044 Response filed Oct. 9, 2003 to Non Final Office Action mailed Aug. 18, 2003, 11 pgs".
"U.S. Appl. No. 09/734,044 Response filed Nov. 29, 2006 to Non Final Office Action mailed Aug. 29, 2006, 9 pgs".
"U.S. Appl. No. 09/734,044 Response filed Dec. 13, 2004 to Non Final Office Action mailed Aug. 11, 2004, 13 pgs".
U.S. Appl. No. 09/905,525, Final Office Action mailed Jan. 10, 2008, 15 pgs.
"U.S. Appl. No. 09/905,525, Non-Final Office Action mailed Aug. 22, 2008, 17 pgs".
"U.S. Appl. No. 09/905,525, Response filed Mar. 27, 2008 to Final Office Action mailed Jan. 10, 2008, 17 pgs."
"U.S. Appl. No. 09/905,525, Response filed Jun. 10, 2008 to Final Office Action mailed Jan. 10, 2008, 20 pgs".
"U.S. Appl. No. 09/905,525, Response filed Sep. 25, 2007 to Non-Final Office Action mailed Jun. 25, 2007, 17 pgs."
"U.S. Appl. No. 09/905,525 Response filed Nov. 24, 2008 to Non-Final Office Action mailed Aug. 22, 2008, 17 pgs."
"U.S. Appl. No. 09/905,525, Advisory Action mailed May 2, 2008, 5 pgs".
"U.S. Appl. No. 09/905,525, Final Office Action mailed Jun. 29, 2006, 14 pgs".
"U.S. Appl. No. 09/905,525, Non Final Office Action mailed Jun. 25, 2007, 16 pgs".
"U.S. Appl. No. 09/905,525, Non Final Office Action mailed Dec. 12, 2005, 12 pgs".
"U.S. Appl. No. 09/905,525, Non Final Office Action mailed Dec. 18, 2006, 15 pgs".
"U.S. Appl. No. 09/905,525, Response filed Mar. 19, 2007 to Non Final Office Action mailed Dec. 18, 2006, 9 pgs".
"U.S. Appl. No. 09/905,525, Response filed Apr. 12, 2006 to Non Final Office Action mailed Dec. 12, 2005, 8 pgs".
"U.S. Appl. No. 09/905,525, Response filed Apr. 13, 2005 to Non Final Office Action mailed Dec. 14, 2004, 17 pgs".
"U.S. Appl. No. 09/905,525, Response filed Sep. 22, 2006 to Final Office Action mailed Jun. 29, 2006, 19 pgs".
"U.S. Appl. No. 09/905,525, Non Final Office Action mailed Dec. 14, 2004, 11 pgs".
"U.S. Appl. No. 09/969,449, Non-Final Office Action mailed Aug. 5, 2008, 8 pgs".
"U.S. Appl. No. 09/969,449 Final Office Action mailed Nov. 3, 2004, 10 pgs".
"U.S. Appl. No. 09/969,449 Final Office Action mailed Nov. 21, 2005, 16 pgs".
"U.S. Appl. No. 09/969,449 Final Office Action mailed Dec. 29, 2003, 9 pgs".
"U.S. Appl. No. 09/969,449 Non Final Office Action mailed Apr. 25, 2005, 9 pgs".
"U.S. Appl. No. 09/969,449 Non Final Office Action mailed May 11, 2004, 8 pgs".
"U.S. Appl. No. 09/969,449 Non Final Office Action mailed Jul. 9, 2003, 8 pgs".
"U.S. Appl. No. 09/969,449 Response filed Feb. 3, 2005 to Final Office Action mailed Nov. 3, 2004, 17 pgs".
"U.S. Appl. No. 09/969,449 Response filed Aug. 11, 2004 to Non Final Office Action mailed May 11, 2004, 12 pgs".
"U.S. Appl. No. 09/969,449 Response filed Aug. 25, 2005 to Non Final Office Action mailed Apr. 25, 2005, 12 pgs".
"U.S. Appl. No. 09/969,449 Response filed Oct. 9, 2003 to Non Final Office Action mailed Jul. 9, 2003, 12 pgs".
U.S. Appl. No. 09/976,301 Advisory Action mailed Sep. 30, 2005, 3 pgs.
U.S. Appl. No. 09/976,301 Advisory Action mailed Nov. 30, 2006, 3 pgs.
"U.S. Appl. No. 09/976,301 Final Office Action mailed Jul. 13, 2005, 11 pgs".
"U.S. Appl. No. 09/976,301 Final Office Action mailed Aug. 25, 2006, 14 pgs".
"U.S. Appl. No. 09/976,301 Non Final Office Action mailed Mar. 9, 2007, 13 pgs".
"U.S. Appl. No. 09/976,301 Non Final Office Action mailed Nov. 24, 2004, 31 pgs".
"U.S. Appl. No. 09/976,301 Non Final Office Action mailed Dec. 16, 2005, 17 pgs".
"U.S. Appl. No. 09/976,301 Response filed Apr. 6, 2005 to Non Final Office Action mailed Nov. 24, 2004, 15 pgs".
"U.S. Appl. No. 09/976,301 Response filed May 16, 2006 to Non Final Office Action mailed Dec. 16, 2005, 24 pgs".
"U.S. Appl. No. 09/976,301 Response filed Jun. 7, 2007 to Non Final Office Action mailed Mar. 9, 2007, 7 pgs".
"U.S. Appl. No. 09/976,301 Response filed Sep. 13, 2005 to Final Office Action mailed Jul. 13, 2005, 13 pgs".
"U.S. Appl. No. 09/976,301 Response filed Oct. 13, 2005 to Advisory Action mailed Jul. 13, 2005, 14 pgs".
Case No. 2:13-CV-655; *Loyalty Conversion Systems Corporation* V. *American Airlines, Inc.*; Memorandum Opinion and Order.
PTAB Trials Board: Case No. CBM2014-00095, Filed Mar. 17, 2014. Pat. No. 8313023; pending.
PTAB Trials Board: Case No. CBM2014-0095, Filed Mar. 17, 2014. Pat No. 8511550; pending.

CONVERSION OF NON-NEGOTIABLE CREDITS TO ENTITY INDEPENDENT FUNDS

CROSS-REFERENCE TO RELATED APPLICATIONS

This is a continuation application of U.S. application Ser. No. 13/969,936 (filed Aug. 19, 2013); U.S. application Ser. No. 13/969,896 (Filed Aug. 19, 2013); U.S. application Ser. No. 13/969,873 (Filed Aug. 19, 2013); U.S. application Ser. No. 14/034,492 (Filed Sep. 23, 2013); U.S. application Ser. No. 14/024,921 (Filed Sep. 12, 2013); and U.S. application Ser. No. 14/024,936 (Filed Sep. 12, 2013).

The above applications claim the benefit of U.S. Pat. No. 7,703,673 (Filed May 25, 2006); U.S. Pat. No. 8,123,127 (Filed Mar. 10, 2010); U.S. Pat. No. 8,162,209 (Filed Apr. 13, 2010); U.S. Pat. No. 8,181,863 (Filed Jan. 26, 2012); U.S. Pat. No. 8,181,864 (Filed Jan. 26, 2012); U.S. Pat. No. 8,186,583 (Filed Jan. 26, 2012); U.S. Pat. No. 8,201,734 (Filed Mar. 23, 2012); U.S. Pat. No. 8,245,925 (Filed Apr. 6, 2012); U.S. Pat. No. 8,267,315 (Filed May 24, 2012); U.S. Pat. No. 8,297,502 (Filed Jun. 25, 2012); U.S. Pat. No. 8,313,023 (Filed Jun. 25, 2012); U.S. Pat. No. 8,342,399 (Filed Jul. 5, 2012); U.S. Pat. No. 8,376,224 (Filed Jun. 24, 2011); 8,511,550 (Filed Apr. 16, 2013); U.S. Pat. No. 8,523,063 (Filed Apr. 16, 2013); U.S. Pat. No. 8,523,064 (Filed May 21, 2013); U.S. Pat. No. 8,540,152 (Filed May 23, 2013); U.S. Pat. No. 8,668,146 (Filed Nov. 20, 2012); and U.S. Pat. No. 8,684,265 (Filed Nov. 20, 2012), which claim benefit to Provisional Application 61/358,650 (Filed Jun. 25, 2010); Provisional Application 61/595,263 (Filed Feb. 6, 2012); Provisional Application 61/595,351 (Filed Feb. 6, 2012); and Provisional Application 61/595,429 (Filed Feb. 6, 2012).

The entire contents of each and every one of the above utility and provisional applications and patents are incorporated by reference herein in their entirety.

BACKGROUND

The present invention relates to the field of commerce and, more particularly, to the conversion of non-negotiable credits with redemption restrictions to entity independent funds without the redemption restrictions.

Entities often reward consumers for utilizing their services with non-negotiable credits, such as frequent flier miles, consumer loyalty points, and entertainment credits. These non-negotiable credits can be applied towards products and/or services provided by a granting entity or its affiliates. For example, consumers can apply frequent flyer credits towards the purchase of airline tickets or airline upgrades. In another example, a consumer can utilize purchase points from a credit card company to receive percentage discounts on goods provided by affiliates. In still another example, entertainment credits can be redeemed for prizes offered in a winnings storefront of an entertainment site.

Many problems are inherent to the current techniques for the redemption of entity provided credits. One such problem is the restriction on usage to goods and/or services of the entity. That is, a consumer may have no need for the products or services listed by the entity for which the non-negotiable credits can be redeemed. Further, additional restrictions and limitations can be placed upon the non-negotiable credits that lessen the usefulness of non-negotiable credits from the consumer's perspective. For instance, airlines often limit the choice of travel dates, known as black-out dates, to which frequent flyer credits can be applied.

Another problem encountered by consumers when redeeming non-negotiable credits is time. Once a consumer submits a request to redeem their non-negotiable credits, the consumer must wait for the entity to perform one or more actions required to fulfill their request. These steps often require days or weeks to complete. For instance, consumers participating in online entertainment sites often are required to wait a minimum of three days for their entertainment credits to be redeemed. Redemption delay can be particularly aggravating to e-commerce consumers, who by nature of an e-commerce marketplace expect rapid responses and immediate consumer gratification.

Time can also be a factor for redeeming credits having an associated expiration date. A consumer's non-negotiable credits may expire before a sufficient quantity is acquired for a desired purchase. Lesser purchases requiring fewer credits may not have a significant appeal for the consumer. Hence, credit expiration dates can further decrease the consumer value of non-negotiable credits.

Yet another problem with conventional implementation of non-negotiable credits is that consumers often belong to multiple credit-earning programs that provide the consumers with multiple incompatible forms of non-negotiable credit. Each of these multiple programs can span a single industry or can span multiple industries. For example, a consumer can acquire a moderate number of frequent flyer miles with multiple airlines, where each airline specific account contains insufficient credits to have any meaningful consumer value. Consumers can also have many different types of non-negotiable credits, such as multiple merchant specific credit, credit card credits, and frequent flier miles, each having different redemption values and program redemption rules. These different programs, values, and rules can understandably confuse and frustrate consumers, who due to their confusion, often elect to avoid participating in an entity sponsored credit program.

DETAILED DESCRIPTION

Figure 1:
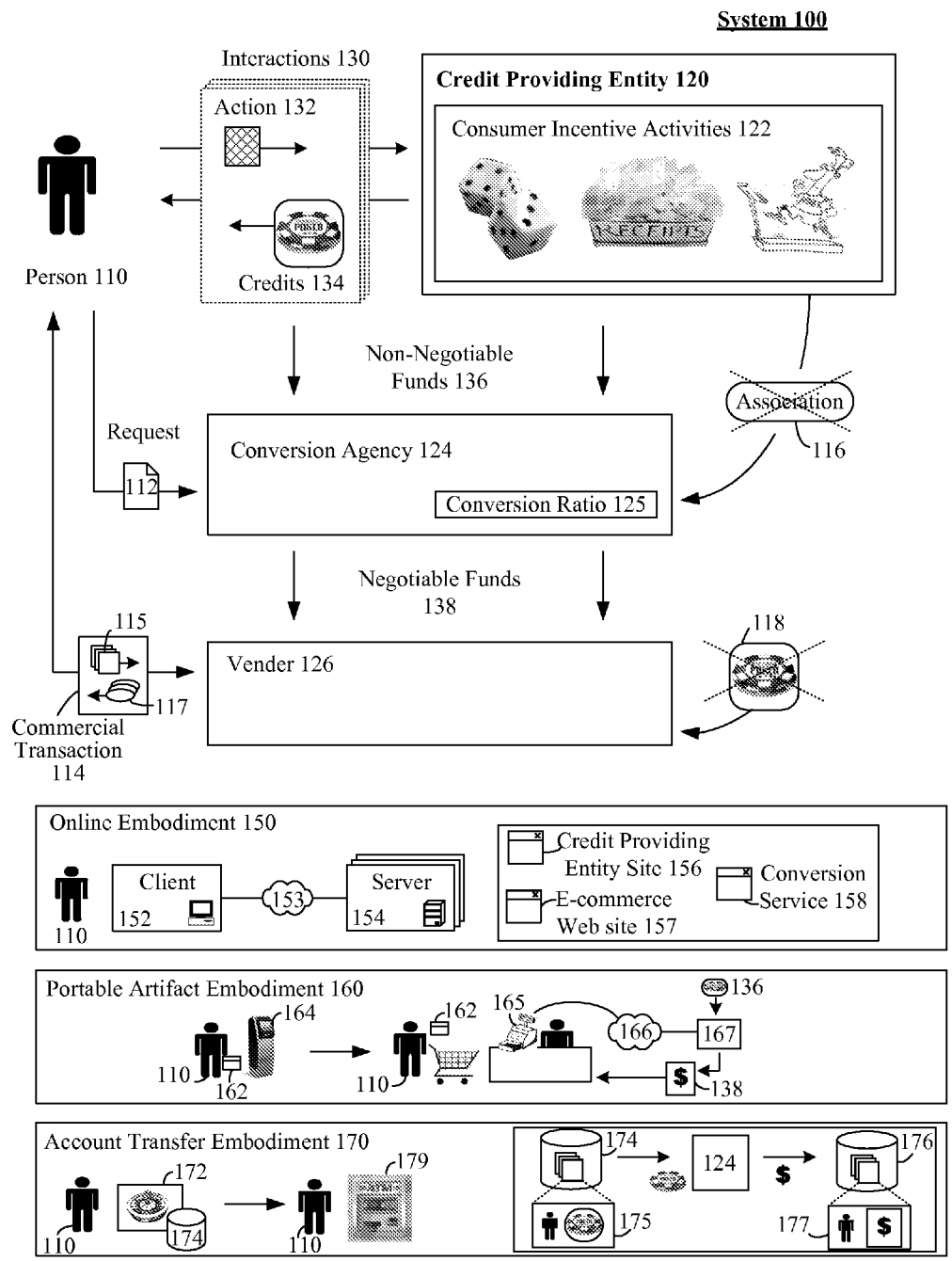
FIG. 1 is a diagram of a system in which non-negotiable funds earned through a variety of actions or anticipated future actions are converted into negotiable funds in accordance with an embodiment of the inventive arrangements disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a diagram of a system 100 in which non-negotiable funds 136 earned from consumer incentive activities 122 are converted into negotiable funds and/or entity independent funds 138 in accordance with an embodiment of the inventive arrangements disclosed herein. In one embodiment, multiple interactions 130 can occur between a person 110 and a credit providing entity 120, in which the person 110 participates in consumer incentive activities 122. During each interaction 130, an action or behavior 132 can be taken. With each successful completion of the consumer incentive activity 122, person 110 can receive credits 134 in the form of non-negotiable funds 136. In one interaction 130, action 132 can be a wager of a game of chance. In this instance, with each non-successful outcome of the game of chance, the person 110 can lose their wager 132.

Other actions 132 for earning credits 134 through interactions 130 with a credit providing entity 120 are contemplated. Such actions can, for example, result in the person 110 earning participation credits, achievement credits, sponsored initiative credits, social networking credits, or even advanced credits in a loan. All of these credits can be earned for a targeted purpose or goal set by the user him or herself or another entity such as a government or corporate entity (e.g., as a sponsored initiative such as a green initiative or a market promotion).

As mentioned, the types of credits 134 are non-negotiable funds 136. These funds 136 (e.g., credits 134) may not be redeemable on an open market. For example, vender 126 will not accept 118 the credits 134 for commercial transactions 114. A conversion agency 124, which is not directly associated 116 with the credit providing entity 120 can convert the non-negotiable funds 136 (which can be a quantity of credits 134) into negotiable funds and/or entity independent funds 138. This conversion can occur in response to a request 112 by person 110.

Person 110 can conduct a commercial transaction 114 with vender 126. During the transaction 114, the person 110 can specify a user-selected set of requests 115 for goods and/or services 117 of the vender 126. The goods and/or services 117 can cost a quantity of negotiable funds and/or entity independent funds 138, which are provided to the vender 126. In one embodiment, the negotiable funds and/or entity independent funds 138 can be provided directly to the vender 126 by the conversion agency 124. In another, the negotiable funds and/or entity independent funds 138 can be provided by the conversion agency 124 to person 110, who provides these funds 138 to the vender 126.

Numerous embodiments exist for conducting the conversions as described herein, a few of which are shown as embodiments 150, 160, and 170. Embodiment 150 shows an online embodiment, where a person 110 can interact (130) with a credit providing entity site 156 to participate in a consumer incentive activity 122. The commercial transactions 114 can be conducted via an e-commerce Web site 157. Additionally, the conversion agency 124 can implement a software based conversion service 158, which performs the conversion of the non-negotiable funds 136 into the negotiable funds and/or entity independent funds 138. The Web sites 156, 157 and service 158 can run within one or more servers 154. These servers 154 can be connected to a client 152 via a network 153, where the client 152 is a computing device that user 110 interacts (130 and/or 114) with.

In one configuration of embodiment 150, the conversion service 158 can be linked to a payment option present in the E-commerce Web site 157, which operates in a manner similar to PAYPAL, GOOGLE CHECKOUT, and the like. That is, a payment option can be presented that permits goods/services of vender 126 to be purchased using (at least in part) funds 138 converted from credits 134, which were earned from the consumer incentive activities 122.

Embodiment 160 shows a portable artifact embodiment, where a person 110 stores entertainment credits 134 from the game of chance 122 upon a portable artifact 162, which can be a physical card with a magnetic strip, a RFID storage device, a flash memory card, or other tangible artifact able to store digitally encoded (or even analog encoded) data. Machines 164 upon which consumer incentive activities 122 are performed or recorded can include a reader/writer able to alter content stored on the portable artifact 162. Thus, actions 132 outcomes in credits 134 value can be recorded on the artifact 162. The person 110 can thereafter shop at a storefront of vender 126 and present a cashier 164 with the artifact 162. A cash register 165 used by the cashier 164 can be connected to a network 166. The conversion agency 124 can have a network element 168 connected to the network 166, which converts non-negotiable funds 136 on the artifact 162 into a quantity of negotiable funds and/or entity independent funds 138 needed to complete the commercial transaction 114 conducted via the register 165 and cashier 164. From the perspective of the vender 126, the transaction 114 conducted via the register 165 is a "standard" transaction that results in the vender 126 receiving suitable negotiable funds and/or entity independent funds 138 for providing the goods/services 117 to person 110.

Embodiment 170 shows an account transfer embodiment 170, where a person 110 participates in a consumer incentive activity 122 (e.g., in this instance a game of chance 172). Earnings (134, 136) from the consumer incentive activity 122 are recorded within a tangible data store 174 associated with the credit providing entity 120. This data store 174 can include an account 175 for the person 110, which tracks an amount of credits 134, which are non-negotiable funds 136, of the person 110. Conversion agency 124 can directly access the account 175 of data store 174 and can convert a quantity of credits 134 into negotiable funds and/or entity independent funds 138, which are recorded in a tangible data store 176 that is not directly associated with entity 120. The data store 176 can include an account 177 for the person 110, which contains an amount of negotiable funds and/or entity independent funds 138, of the person 110. A person 110 can conduct commercial transactions 114 via a machine 179, such as a kiosk, an ATM machine, etc., which involve funds of account 177 changing. In one embodiment, the goods/services 117 received from person 110 in embodiment 170 can include cash (such as from an ATM machine). This cash can be an amount of cash-back received during transaction 114, can be the transaction 114 itself and may involve a transaction fee, which is extracted from account 177 by machine 179.

The embodiments 150-170 are for illustrative purposes only and are not intended to be (or to be construed as being) exhaustive or comprehensive. For example, any combinations of the embodiments 150, 160, 170 are to be considered within scope of the disclosure. Thus, a consumer incentive activity 122 can be conducted via a Web site 156 (per embodiment 150), where a commercial transaction 114 using the converted entertainment credits 134 per agency 124 can be conducted at a storefront, where a cashier 164 interacts (130)

with person 110. In another contemplated configuration, the consumer incentive activity 122 can be conducted with a machine 172 that places credits 134 in account 175 (per embodiment 170), which are converted and used to buy goods/services 117 via an e-commerce Web site 157 (per embodiment 150). In another contemplated configuration, credits can be earned via machine 164 and placed on artifact 162 (per embodiment 160), which can be placed in a machine 179, such as an ATM (per embodiment 170) to extract funds 138, which are converted (by agency 124) from the credits 134 stored on artifact 162.

In one embodiment, the conversion agency 124 can be compensated (e.g., charge a processing fee) for converting the non-negotiable funds 136 to negotiable funds and/or entity independent funds 138. This fee can be paid to conversion agency 124 by the game providing entity 120, the person 110, and/or by the vender 126.

As used herein, consumer incentive activities 122 can be in the form of games, contests, or can occur based on certain consumer behavior, actions or purchases. A game can be structured playing, usually undertaken for enjoyment and sometimes used as an educational tool. A contest can be an event in which at least two teams or individuals compete. There may be an award to a winner or awards for multiple top performers, but a contest may be imposed for training. A contest may occur naturally, or be planned by the participants, rather than organized by another party.

Games are distinct from work, which is usually carried out for remuneration, and from art, which is more often an expression of aesthetic or ideological elements. However, the distinction is not clear-cut, and many games are also considered to be work (such as professional players of spectator sports/games) or art (such as jigsaw puzzles or games involving an artistic layout such as Mahjong, solitaire, or some video games). Key components of games can be goals, rules, challenge, and interaction. Games can generally involve mental or physical stimulation, and often both. Many games help develop practical skills, serve as a form of exercise, or otherwise perform an educational, simulational, or psychological role.

Credit providing entities 120 include any entity providing a consumer with credits based on user behavior, actions, achievements, and the like. Credit providing entities 120 can include corporations such as airlines, hotels, credit card companies, casinos, cruise ships, States (for lottery, scratch off games, etc.), churches, race tracks, online gambling site providers, e-commerce sites, slot-machine houses, carnivals, gambling parlors, companies (for promotional sweepstakes), High Schools (for raffles), and the like.

The action 132 can, in one embodiment, risk money, previously earned credits 134 or something of material value on an event with an uncertain outcome with intent on winning additional money, credits 134, and/or material goods/services. An amount of credits 134 earned from an interaction 130 with a credit providing entity 120 can vary in direct proportion to the user action, behavior, achievement, or the like.

Credits 134 are non-negotiable funds 136 that generally have no value outside of an environment (building, Web site, etc.) of the credit providing entity 120. For example, casinos (one embodiment of entity 120) generally utilize casino tokens, chips, or plaques to represent a quantity of entertainment credits 134. Online gambling sites 156 (and electronic gambling devices) often provide an account to a person 110, where entertainment credits 134 are managed within this account in a computer readable storage medium. In another example, hotel and car rental entities oftentimes afford customers loyalty points that can be redeemed only in future transactions with the hotel or car rental entity itself for certain upgrades or discounts (a form of credits 134). In yet another example, a grocery store may offer consumers a store card to receive special group member discounts to be applied at checkout and additional points for purchases made at the store; for instance, every dollar spent can earn the consumer a point and once the consumer achieves 100 credits in a month timeframe the credits can translate into a 10 cent discount per gallon of gas purchased at a participating gas station.

Use of credits 134, such as casino tokens, rewards points or discounts, can be more convenient than use of negotiable funds and/or entity independent funds 138 for many reasons. For example, use of entertainment credits 134 makes theft and counterfeiting more difficult. Entertainment credits (which when having a physical representation are often a uniform size and weight) can be relatively easy to stack, count, etc. Additionally, studies have proven people (110) engage in consumption more freely (e.g., play games of chance with larger wagers and with greater frequency, or more readily purchase goods and services), when credits 134 are used or applied to the purchase, behavior, or activity, rather cash or other negotiable funds and/or entity independent funds.

Additionally, use of credits 134, can have legal benefits that can permit entities 120 to conduct games of chance 122, which would be prohibited if negotiable funds and/or entity independent funds 138 were utilized instead of entertainment credits 134. That is, numerous legal statutes and regulations exist that are more restrictive when consumer incentive activity earnings are in a form of negotiable funds and/or entity independent funds 138. For example, in the instance that consumer incentive activity 122 is gambling, the Unlawful Internet Gambling Enforcement Act (UIGEA) of 2006 prohibits many online gambling activities with negotiable funds and/or entity independent funds 138, which are permitted with certain forms of non-negotiable funds 136. For example, electronic fund transfers via credit cards or debit cards related to gambling winnings are generally prohibited by US banks. Similarly, wire transfers of negotiable funds and/or entity independent funds 138 earned through gambling are legally prohibited in many instances. Many of these acts explicitly prohibit the transfer of negotiable funds from gambling earnings across state lines Non-negotiable funds 136 can include any of a variety of financial instruments that are not legal currency and not governed under article 3 of the Uniform Commercial Code (UCC). For example, non-negotiable funds 136 can include IOUs issued by the credit providing entity 120. In one embodiment, non-negotiable funds 136 can include secured transactions, which take a security interest on collateral owned by the credit providing entity's 120 assets, which are subject to Article 9 of the UCC. In one embodiment, the non-negotiable funds 136 can include letters of credit, issued by the credit providing entity 120.

Negotiable funds 138 comprise a set of negotiable instruments, which are a specialized type of "contract" for the payment of money that is unconditional and capable of transfer by negotiation. As payment of money is promised later, the instrument itself can be used by the holder in due course frequently as money. Common examples include checks, banknotes (paper money), and commercial paper. Thus, negotiable funds 138 include currency, and instruments covered by Article 3 and 4 of the Uniform Commercial Code. For a writing to be a negotiable instrument under Article 3,[1] the following requirements must be met: 1) The promise or order to pay must be unconditional; 2) The payment must be a specific sum of money, although interest may be added to the sum; 3) The payment must be made on demand or at a definite time; 4) The instrument must not require the person promising payment to perform any act other than paying the money specified; 5) The instrument must be payable to bearer or to order. Additionally, negotiable funds include commercial paper, letters of credit (governed by Article 5 of the UCC), Bills of lading (governed by Article 7 of the UCC), securities (governed under Article 8 of the UCC), and deeds and other documents. One important consideration for many negotiable instruments (funds 138) is that they are payable to a bearer on demand.

Entity independent funds 138 can include any funds that are independent of an entity providing the non-negotiable funds 136. For example, the entity independent funds 138 can represent reward points from a company A, where the non-negotiable funds 136 are reward points from a different company B. Additionally, the entity independent funds 138 can represent an in-game or in-marketplace currency (where the non-negotiable funds 136 are not able to be used for direct purchases in-game or in-marketplace).

The commercial transaction 114 can be one in which wherein the quantity of negotiable funds and/or entity independent funds 138 are applied to user (110) specified (via request 115, for example) purchase of a good or service 117. Stated differently, a commercial transaction can be an economic transaction where person 110 receives a good or a service from vender 126 for value. Commercial transactions 114 can include a sale goods (117) from a storefront, a Web site, a catalog (mail order), over the phone, and the like. Transaction 114 can also include a payment for a service requested by person 110. Payment of the negotiable funds and/or entity independent funds 138 during the commercial transaction 114 can occur before, after, or concurrent with the receipt (or shipping) of the goods or service 117. A contract (including specifics established by the parties (110 and 126) as well as legal defaults provided by the UCC or applicable common law/state law) between the vender 126 and person 110 established as part of the commercial transaction 114 can determine when payment (funds 138) for the goods/services 117 is due. In one embodiment, commercial transaction 114 can include transaction where currency is provided to person 110 by a vender 126 (a bank as part of an ATM transaction, for example) for a fee. This currency can be provided as a loan or as a withdrawal from an account of person 110, where the account includes the negotiable funds and/or entity independent funds 138.

The conversion agency 124 can be a legal entity that converts non-negotiable funds 136 (including credits 134) into negotiable funds and/or entity independent funds 138. The conversion agency 124 can lack a direct association 116 with the credit providing entity 120. In one embodiment, no legal relationship of enablement of corporate identity (no parent, subsidiary, etc.) relationship can exist between the conversion agency 124 and entity 120. No fiduciary duties under corporate law can exist between agency 124 and game providing entity 120. In one embodiment, agency 124 can be geographically located outside property owned or leased by the game providing entity 120. In another, it can lease space and provide its services from entity 120 owned/leased land. In one embodiment, the conversion agency 124 can support multiple different credit providing entities 120, which can be competitors of each other.

In one embodiment, the conversion agency 124 is not a bank or similar financial institution (and may therefore be outside the guidelines established by UIGEA and other statues and regulations, which impose restrictions on banks). In one embodiment, the conversion agency 124 may be located in the same jurisdiction as the credit providing entity (possibly to avoid legal entanglements/restrictions with operating in multiple or across jurisdictional boundaries) or may be located in a jurisdiction with favorable rules for performing the fund conversions.

In one embodiment, the conversion agency can be tasked with establishing and maintaining a conversion ratio 125. In another embodiment, it should be noted that the credit providing entity 120 can also predetermine a conversion ratio 125 for credits 134 that will govern the conversion of non-negotiable credits 136 to negotiable funds and/or entity independent funds 138. In either embodiment, the conversion agency 124 will utilize conversion rate 125 in calculations associated with converting non-negotiable funds 136 to negotiable funds and/or entity independent funds 138. The conversion ratio 125 can, in one embodiment act like a conventional exchange rate in that it defines the rate at which one currency (the credits 134) will be exchanged for another (negotiable funds and/or entity independent funds 138). It can also be regarded as the value of one market's currency (credit market) in terms of another currency (real-world negotiable funds market).

In the retail currency exchange market, a different buying rate and selling rate can usually be quoted by money dealers. As referred to herein, the buying rate is the rate at which conversion agencies accept non-negotiable funds 136 for conversion to negotiable funds, and the selling rate can be the rate at which conversion agency 124 or other such entity as well as credit providing entities 120 can advance credits to person 110 for future actions 132. The quoted rates can incorporate an allowance for a conversion agency's margin (or profit) in trading, or else the margin may be recovered in the form of a "commission" or in some other way.

It should be noted that different rates 125 may also be quoted for different types of non-negotiable funds (e.g., casino chips, loyalty rewards point, and the like). In one embodiment, conversion ratio 125 can be a market based exchange rate and thus can change whenever the values of either of the two component currencies change. The market for non-negotiable funds 136 to negotiable funds and/or entity independent funds 138 exchange can be influenced by times of year and special occasions (such as Christmas, the New Year celebrations, Valentine's Day, high travel season, and the like) to affect conversions of certain types of credits 134 based non-negotiable funds 136 to negotiable funds and/or entity independent funds 138. In another embodiment, the conversion ratio 125 can be a fixed exchange rate, also known as a pegged exchange rate, which is a type of exchange rate regime wherein a currency's value is matched to the value of another single currency. The conversion ratio 125 in this instance does not fluctuate but is consistent and steady.

Figure 2:
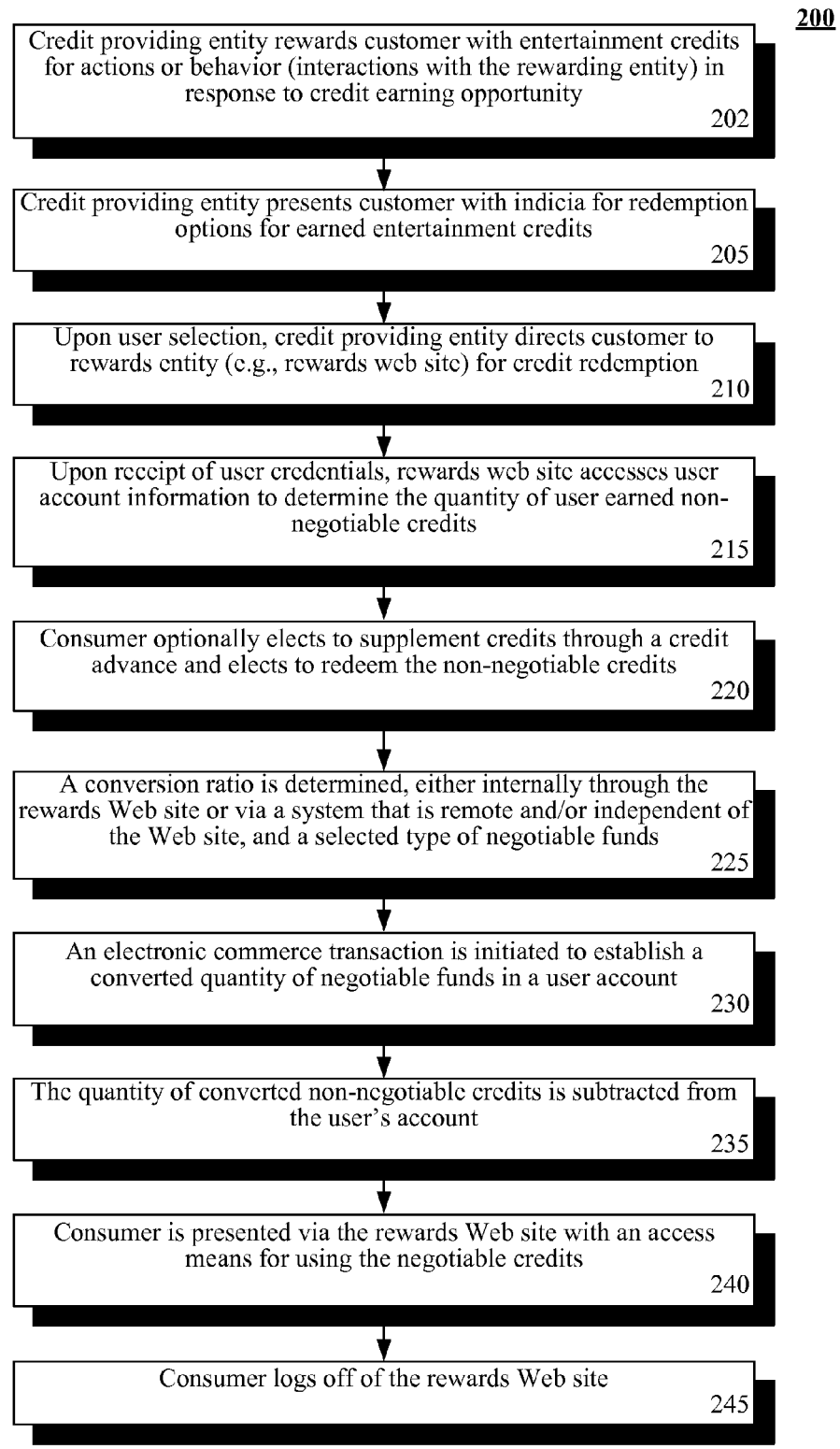
FIG. 2 is a flow chart of a method for the Web based granting and conversion of non-negotiable credits to negotiable funds in accordance with an embodiment of the inventive arrangements disclosed herein.

FIG. 2 is a flow chart of a method 200 for the Web based granting and conversion of non-negotiable credits to negotiable funds and/or entity independent funds in accordance with an embodiment of the inventive arrangements disclosed herein. Method 200 can in one embodiment comprise steps 202 to 245. However, the following description of one embodiment of method 200 is not intended to be construed as limiting as other or additional steps for an entity granting a consumer entertainment credits and presenting indicia leading to credit redemption are contemplated.

Method 200 can begin in step 202, where the credit providing entity can reward a customer with entertainment credits for actions or behavior (or promised future actions or behavior) undertaken by the customer in response to a credit earning opportunity. In step 205, the credit providing entity can present a customer with indicia for redemption options for the customer earned entertainment credits. Indicia can be in the form of banners, radio buttons, pop-up windows, embedded links, audio and or video notification, QR or bar codes, flyers, and the like.

Upon user selection of the indicia advertised redemption option(s), the credit providing entity can in step 210 direct the customer to one or more rewards entities (e.g., a rewards web site) for credit redemption. In step 215, the rewards Web site utilizes user credentials provided by, for example, the credit providing entity of the customer or the customer him or herself to access the consumer's account information and determine the amount of non-negotiable credits in the consumer's account. The consumer optionally selects to supplement his or her available credits by engaging in a credit advance and elects to redeem some quantity of non-negotiable credits in step 220. If supported by the rewards Web site, the consumer can additionally select the form of negotiable funds and/or entity independent funds to convert the non-negotiable credits.

In step 225, a ratio is determined for the conversion of the non-negotiable credits to the selected type of negotiable funds and/or entity independent funds. This ratio can be determined by any of a variety of means including, but not limited to, an algorithm internal to the rewards Web site, an algorithm contained in a system that is remote and/or independent of the rewards Web site, and the like. An electronic commerce transaction is initiated in step 230 to establish the converted amount of negotiable funds and/or entity independent funds in a user account. The quantity of converted non-negotiable credits is subtracted from the user's account in step 235. In step 240, the rewards Web site presents the consumer with an access means for the negotiable funds and/or entity independent funds. Lastly, the consumer terminates the session by logging off the rewards Web site in step 245.

Figure 3:
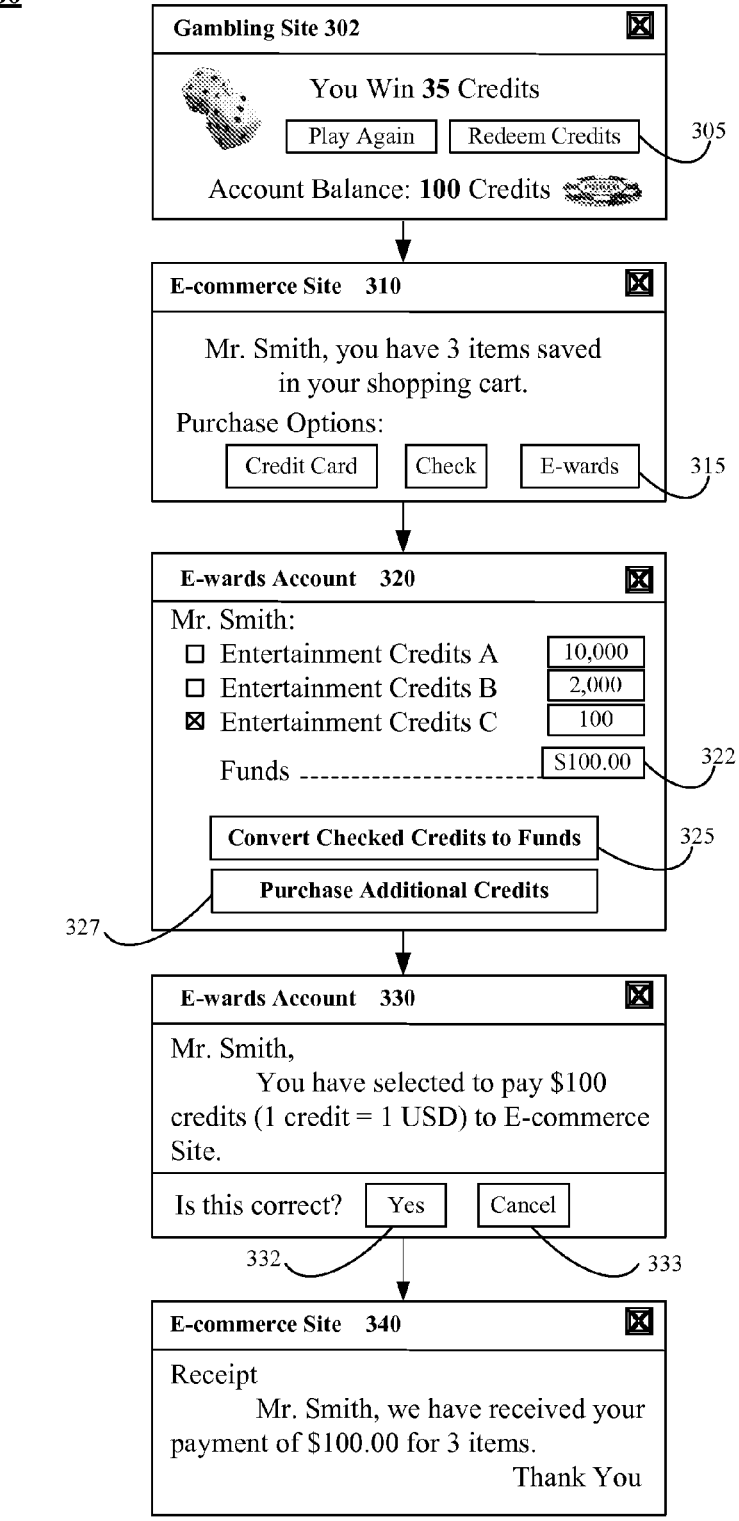
FIG. 3 is a depiction of successive GUIs that illustrate a web based credit granting event with credit redemption indicia and subsequent conversion of non-negotiable funds into negotiable funds in accordance with an embodiment of the inventive arrangements disclosed herein.

FIG. 3 is a depiction 300 of successive GUIs that illustrate a web based credit granting event with credit redemption indicia and subsequent conversion of non-negotiable funds into negotiable funds and/or entity independent funds in accordance with an embodiment of the inventive arrangements disclosed herein.

GUI 302 shows an interface from a gambling Web site. A quantity of entertainment credits are earned on this site, which can be later converted by a conversion agency for use in buying/selling items from a vender, who does not accept the entertainment credits. The gambling Web site or credit providing entity website can include options to "play again" (i.e., repeat the credit earning behavior to potentially earn additional non-negotiable entertainment credits) and an indicia 305 for credit redemption opportunities. The indicia can be presented to a customer via a variety of means including but not limited to banners, radio buttons, pop-up windows, embedded links, audio and or video notification, QR or bar codes, flyers, and the like.

GUI 310 can be a checkout window from an e-commerce site. GUI 310 includes payment button 315, which represents a payment option that includes the conversion of non-negotiable credits to purchase the items in the shopping cart. Selection of payment button 315 by a user can produce GUI 320.

GUI 320 can be a display window from a conversion agency. GUI 320 includes display box 322 and buttons 325, 327. GUI 320 can be rendered by any of a variety of means including, but not limited to, a Web browser, a JAVA applet, a PERL script, and the like. In one embodiment, GUI 320 can be contained within the e-commerce site. GUI 320 can display the balance of non-negotiable, entertainment credits earned from one or more game providing entities. GUI 320 contains a means by which the user selects the type of non-negotiable credits to convert including, but not limited to, a set of radio buttons, a set of checkboxes, a highlighting mechanism, and the like. Display box 322 can display the monetary value of the selected non-negotiable credits. The value displayed in display box 322 can be based on preset conversion factors.

Button 325 can represent the initiation of the process by which the selected non-negotiable credits are converted to negotiable funds and/or entity independent funds. Button 327 can allow a user to purchase additional entertainment credits at predetermined exchange rates or engage in a credit advance when the option is available to the customer. For example, a credit account holder may wish to engage in a loan policy for credits in exchange for a guarantee of future acts or behavior that would earn him or her non-negotiable credits. The credit loan is a policy that can take advantage of a credit account holder's lack of impulse control in regards to purchasing behavior by allowing a user to immediately purchase a desired good or purchase but delay payment until a later time. In another embodiment, the credit advance or loan can be an immediate purchase of non-negotiable credits with negotiable funds to supplement earned entertainment credits. Selection of button 325 by a user can produce GUI 330.

GUI 330 can be a display window from a conversion agency. GUI 330 includes yes button 332 and cancel button 333. GUI 330 can be rendered by any of a variety of means including, but not limited to, a Web browser, a JAVA applet, a PERL script, and the like. In one embodiment, GUI 330 can be contained within the e-commerce site. GUI 330 can display a summary message of the transaction initiated by GUI 320. GUI 330 can include a means to continue the transaction, yes button 332, and a means to cancel the transaction, cancel button 333. Selection of cancel button 333 by a user cancels the transaction and can return the user to GUI 320. Selection of yes button 332 by a user completes the transaction initiated in GUI 320 and can produce GUI 340.

GUI 340 can be a display window from the same said e-commerce site. GUI 340 can contain a message acknowledging the successful conversion of the user's non-negotiable credits into negotiable funds and/or entity independent funds for the purchase of the items in the shopping cart.

Figure 4:
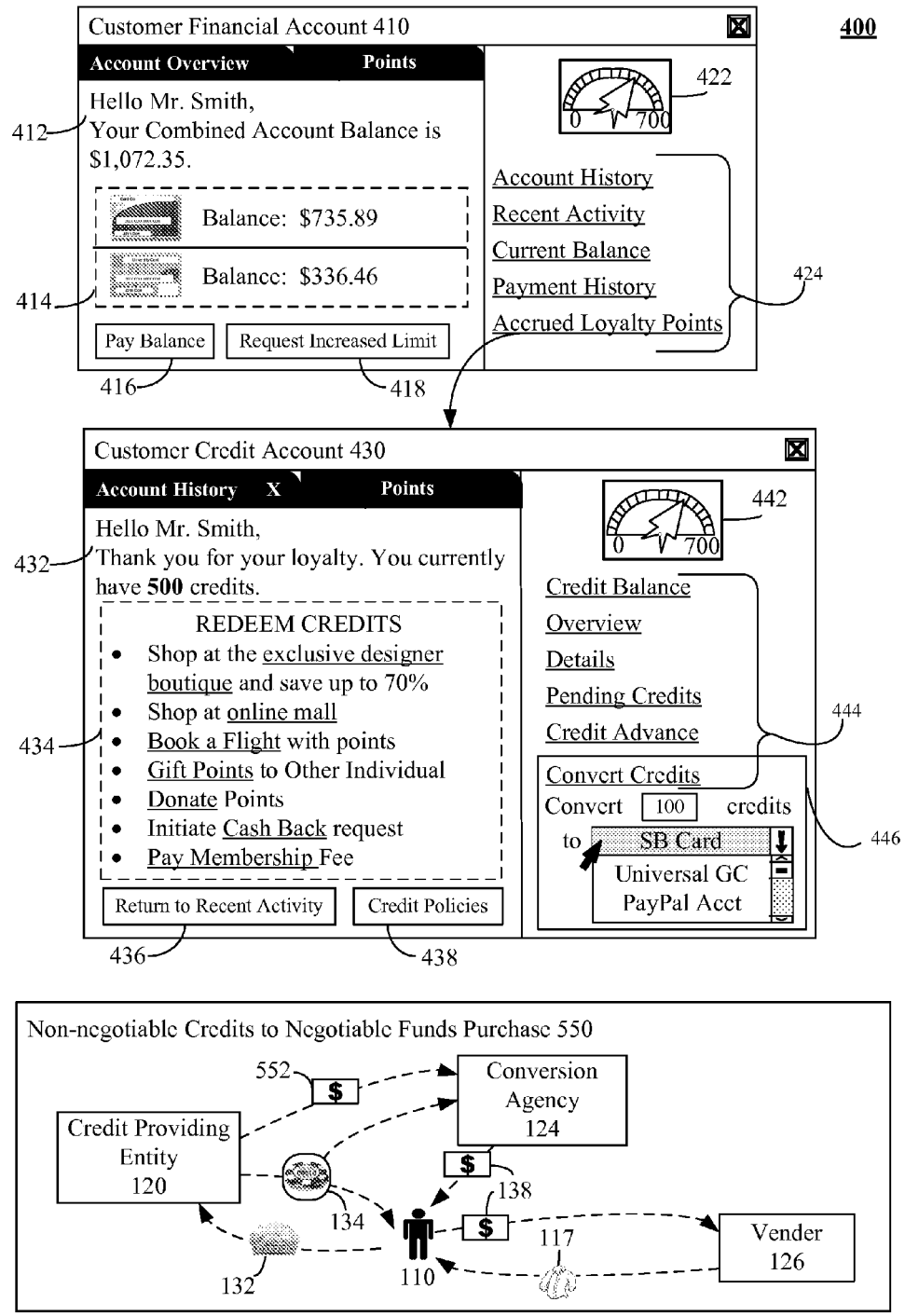
FIG. 4 is a depiction of a scenario and a set of GUIs for granting entertainment credits and presenting indicia for conversion opportunities of the non-negotiable funds earned by a consumer through interactions with the credit granting entity into negotiable funds in accordance with an embodiment of the inventive arrangements disclosed herein.

FIG. 4 is a depiction 400 of a scenario 450 and a set of GUIs 410, 430 for granting entertainment credits and presenting indicia for conversion opportunities of the non-negotiable funds earned by a consumer through interactions with the credit granting entity into negotiable funds and/or entity independent funds in accordance with an embodiment of the inventive arrangements disclosed herein.

Customer financial account 410 can include a user prompt 412 that can present the customer with his or her summary information, a user account overview 414, buttons for typical options such as pay balance 416 and request increased limit 418, credit indicator 422, and account navigation options 424. User account overview 414 can present the customer with one or more financial account types for the customer. Each account can be eligible for loyalty point accrual through a variety of options.

For example, user account type one could be eligible for a fixed 5 points per transaction credit reward and card two could allow varying levels of point accrual for different types of transactions (e.g., five point per dollar spent for automotive expenses, 3 points per dollar spent for travel and restaurants, and 1 point per dollar for all other purchases). Credit indicator 422 can provide the customer with a visual display of the number of loyalty points he or she has accrued to date and selecting the point specific account navigation option 424 can launch customer credit account GUI 430.

Customer credit account 430 GUI can include summary 432, redemption options 434, buttons for navigation such as a button to return to recent activity 436 (for example, GUI 410), and credit account specific navigation options 444, including an option to convert credits 446 to other payment artifacts (for example, transferring converted funds to a customer's PAY-PAL account, or an entity specific gift card). Summary 432 can present the customer with an overview of the total balance of points earned to date (which can be visually seen via indicator 422.

Redemption option indicator 434 can present the customer with a selection of or all available options for spending his or her accrued loyalty points. Such options can include, but are not limited to, shopping at an exclusive discount designer boutique, an online mall, booking a flight with points, gifting points to another individual or donating points to an organization or cause, initiating a cash-back request based on a specified conversion ratio, paying a membership or subscription fee with points, and the like. It should be understood that each of these redemption options can be subject to a differing conversion rate set by either the conversion agency 124 or credit granting entity 120.

Scenario 550 depicts one viable scenario for a non-negotiable credits to negotiable funds and/or entity independent funds purchase which can include interactions between a user 110, credit providing entity 120, conversion agency 124 and vender 126. It should be noted that the separate entities are not affiliated with one another and can be separate legal entities. User 110 can engage in a consumer incentive activity 132 provided by credit providing entity 120 which in turn provides user 110 with credits 134 as a reward for engaging in the sponsored activity. The non-negotiable credits 134 can be passed onto the conversion agency 124 upon a user request or a user initiation of a purchase with credits.

In one embodiment conversion agency 124 can be compensated for their services by the credit providing entity through compensation payment 552. In another embodiment, conversion agency 124 can build in compensation for their services through a processing or handling fee passed onto the user 110. Conversion agency 124 can then provide the user with access to negotiable funds 138 to be utilized in the user initiated transaction with vender 126. Vender 126, upon receipt of payment 138, can provide the user 110 with his or her desired good or service purchased.

Figure 5:
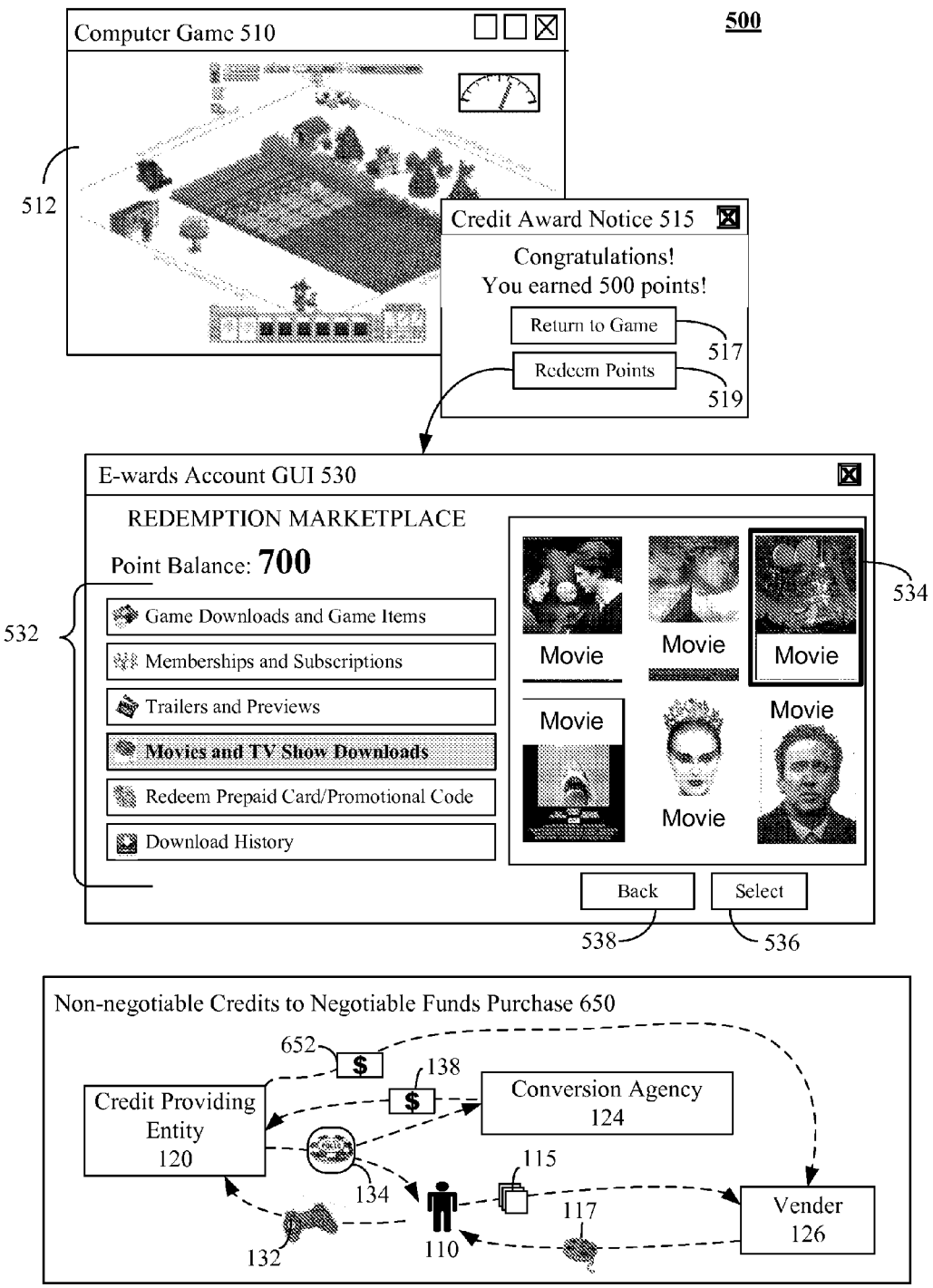
FIG. 5 is a depiction of a scenario and a set of GUIs for granting entertainment credits and directing a consumer to conversion opportunities of the non-negotiable funds earned by the consumer through a game of chance with the credit granting entity into negotiable funds in accordance with an embodiment of the inventive arrangements disclosed herein.

FIG. 5 is a depiction 500 of a scenario 550 and a set of GUIs 510, 530 for granting entertainment credits and directing a consumer to conversion opportunities of the non-negotiable funds earned by the consumer through a game of chance with the credit granting entity into negotiable funds and/or entity independent funds in accordance with an embodiment of the inventive arrangements disclosed herein.

Computer game 510 (accessed, for example, through a social networking site, online multiplayer games, etc.) can allow a user to accrue points or non-negotiable credits through a variety of options such as reaching certain levels, obtaining certain statuses, succeeding in a variety of user collaboration scenarios, and the like. When a user is awarded points a credit award notice 515 can inform the user that he or she has successfully completed a challenge or milestone and has been rewarded a number of entertainment credits. Credit award notice can include buttons for returning to the game 517 and continue accruing points and redeeming points 519. Should a user elect to redeem his or her points immediately, e-wards account GUI 530 can be launched.

E-wards account GUI 530 (e.g., redemption marketplace) can indicate a total user point balance, redemption options 532, and a browsing interface for selection 534, as well as include buttons to select 536 an option, and a back 538 button. Redemption options 532 can include, but are not limited to, game downloads and game items, memberships and subscriptions, trailers and previews, movies and TV show downloads, redeeming prepaid cards or promotional codes and viewing a user download or redemption history. Game downloads and game items can include a new game, special levels opening up upon a user reaching a certain level or completing a certain action in a game, an option to purchase upgrades to user equipment or game achievements, and the like. Memberships and subscriptions can include gym memberships, magazine or newspaper subscriptions, and the like. Other options and components for credit redemption are contemplated.

Non-negotiable credits to negotiable funds and/or entity independent funds purchase scenario 650 can include interactions between a user 110, credit providing entity 120, conversion agency 124, and vender 126. User 110 can engage in game of chance 132 with credit providing entity 120 in exchange for non-negotiable credits 134. Non-negotiable credits 134 can then be passed on to conversion agency 124 for conversion to negotiable funds and/or entity independent funds when requested by user 110 and can be returned to credit providing entity 120 for holding in a user account to be utilized on behalf of user 110 when requested.

Upon user 110 initiating a purchase with vender 126 through a request 115, credit providing entity 120 can provide vender 126 with negotiable funds and/or entity independent funds 652 prompting vender 126 to provide user 110 with goods or services 117 (for example, a video download or streaming rental). In this instance, vender 126 does not accept non-negotiable credits 134 as payment and negotiable funds and/or entity independent funds 652 are provided seamlessly so vender 126 is not aware of user 110 having paid in earned non-negotiable credits 134.

Figure 6:
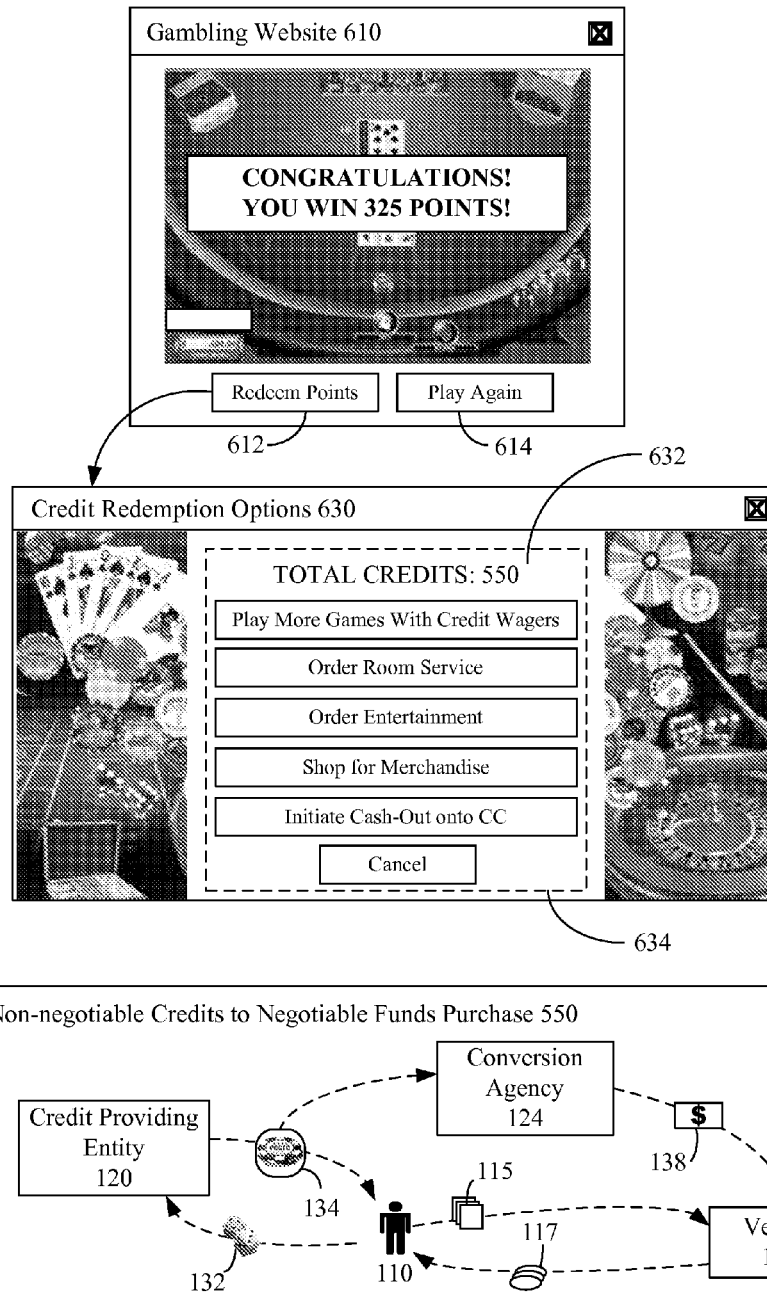
FIG. 6 is a depiction of a scenario and a set of GUIs for granting entertainment credits and directing conversion opportunities of the non-negotiable funds earned by a consumer through a gambling activity with the credit granting entity into negotiable funds in accordance with an embodiment of the inventive arrangements disclosed herein.

FIG. 6 is a depiction 600 of a scenario 650 and a set of GUIs 610, 630 for granting entertainment credits and directing conversion opportunities of the non-negotiable funds earned by a consumer through a gambling activity with the credit granting entity into negotiable funds and/or entity independent funds in accordance with an embodiment of the inventive arrangements disclosed herein.

Gambling website 610 can provide an online gambling opportunity 612 for customers where customers can earn points or non-negotiable credits in exchange for wining a gambling game. The number of credits earned can depend on the specific wager or odds or be fixed to a set amount per play. Upon successful completion (i.e., a win) of gambling game 612, gambling website 610 can present the customer with notice 614 informing the customer of the number of credits he or she has won. In addition, gambling website 610 can present the user with an indicia button 616 to redeem points or an option to play again 618.

User selection of the redeem points button 616 can launch credit redemption options 630 GUI. Credit redemption GUI 630 can present a customer with his or her total credit balance 632 as well as credit redemption options 634. Redemption options 634 in this instance can include options to play more games with credit wagers, order room service in a casino hotel room when available, order in room entertainment such as movies or TV shows or even purchasing tickets to events, shopping for merchandise or initiating cash-out to a credit card or other payment artifact. An option to cancel and return to the game is also included.

Non-negotiable credits to negotiable funds and/or entity independent funds purchase scenario 550 can include interactions between user 110, credit providing entity 120, conversion agency 124 and vender 126. In this embodiment's scenario, user 110 can play a gambling game 132 hosted by credit providing entity 120, which in turn can reward user 110 with non-negotiable credits 134 for participating in the gambling game. Non-negotiable credits 134 can be passed on to conversion agency 124 for conversion to non-negotiable funds 138 upon user initiation 115 of a transaction with vender 126. The conversion agency 124 can then upon conversion of non-negotiable credits 134 to negotiable funds and/or entity independent funds 138 pass on the negotiable funds and/or entity independent funds 138 to vender 126 as payment for the user requested goods/services 117. The vender can be unaware the funds are being transferred through the conversion agency 124 and thus from the vender's perspective the transaction is a regular transaction.

Figure 7:
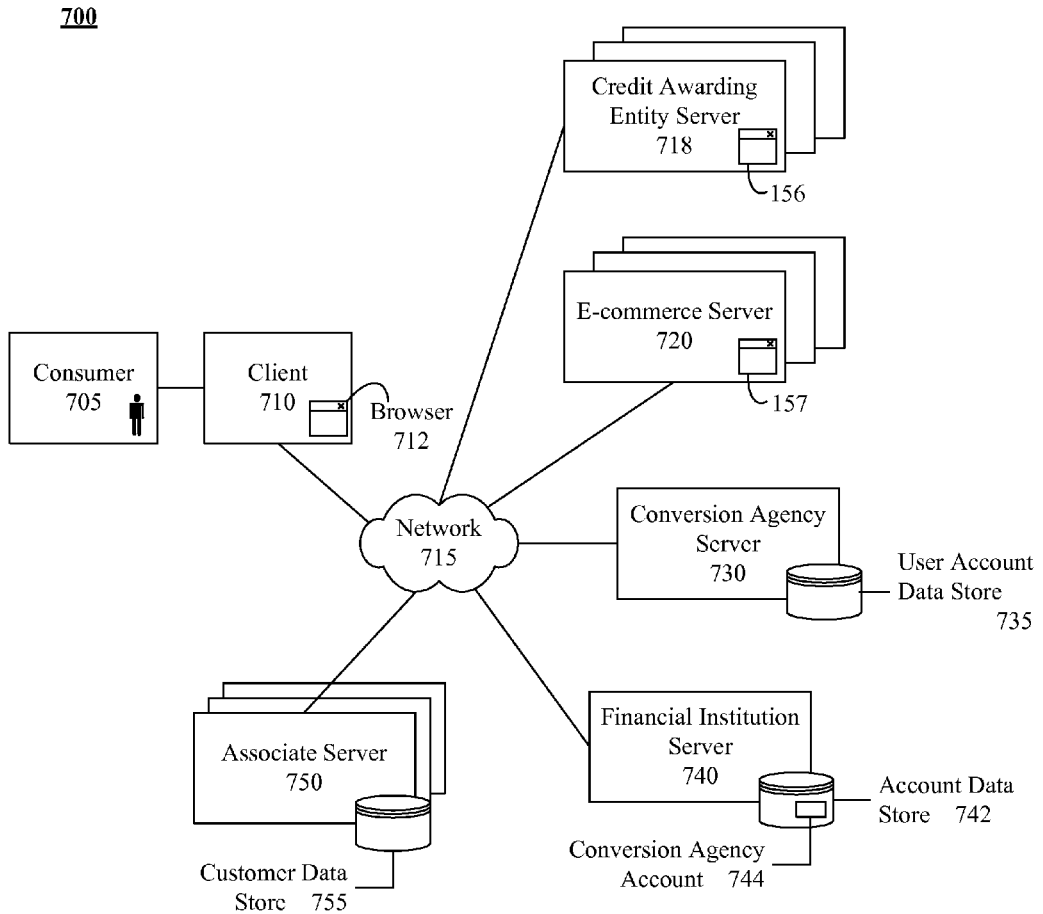
FIG. 7 is a schematic diagram of system for converting non-negotiable credits associated with a game providing entity to negotiable funds in accordance with an embodiment of the inventive arrangements disclosed herein.

FIG. 7 is a schematic diagram of system 700 for converting non-negotiable credits associated with a credit providing entity to negotiable funds and/or entity independent funds in accordance with an embodiment of the inventive arrangements disclosed herein. System 700 can represent a specific embodiment of system 100.

In system 700, consumer 705 can interact with a game of chance server 718, such as through a Web site 156 that server 718 provides. Interactions can occur via a browser 712, rich internet interface, or other software executing upon client 710. Consumer 705 can purchase goods/services from an e-commerce Web site 157 provided by e-commerce server 720. These goods/services can be purchased using negotiable funds and/or entity independent funds that a conversion agency server 730 provides. The conversion agency server 730 can convert entertainment credits resulting from earnings of a game of chance (non-negotiable funds) into the negotiable funds and/or entity independent funds.

Client 710 can be any of a variety of devices including, but not limited to, a personal computer, a kiosk, a telephone, a personal data assistant (PDA), a mobile phone, and the like. Client 710 can include hardware, such as a processor, a memory, and a bus connecting them (as can server 718, 720, 730, 740, and/or 750). The hardware can execute computer program products (software/firmware) that is stored in a non-transitory storage medium. In one embodiment, client 710 can operate in a stand-alone fashion. Alternatively, client 710 can be a device that cooperatively participates in a network of distributed computing devices. Network 715 can facilitate data exchanges over wireless as well as line-based communication pathways and protocols.

In one embodiment, consumer 705 and conversion agency server 730 can interact with associate server 750, e-commerce server 720, and/or financial institution server 740 via network 715. Conversion agency server 730 includes user account data store 735 in which consumer 705 is a member. Associate server 750 includes customer data store 755 in which consumer 705 is a member. Financial institution server 740 includes account data store 742. Account data store 742 includes conversion agency account 744 corresponding to conversion agency 730.

Consumer 705 can earn non-negotiable credits from games provided by server 718. These earnings (non-negotiable credits) can be managed by associate server 750. The quantity of these non-negotiable credits can be saved in customer data store 755. Consumer 705 can use conversion agency server 730 to convert the non-negotiable credits from associate server 750 into negotiable funds and/or entity independent funds provided to the e-commerce server 720 or financial institution 740. In one embodiment, conversion agency 730 can maintain multiple accounts for the consumer 705. These different accounts can be associated with different game providing entities, and with different types of non-negotiable credits.

For example, consumer 705 can earn 500 credits from participating in an online game hosted by server 718. Consumer 705 can choose to use conversion agency 730 to convert any or all of these credits to a monetary equivalent. Conversion agency 730 withdraws the necessary amount from conversion agency account 744 contained within the account data store 742 of financial institution 740 and transfers it to an account specified by consumer 705. In another example, consumer 705 uses conversion agency 730 to complete a purchase at e-commerce server 720. Again, conversion agency 730 withdraws the necessary amount from conversion agency account 744 contained within the account data store 742 of financial institution 740 and transfers it to the account of e-commerce server 720.

E-commerce server 720 can provide a Web site that supports online purchases of goods or services. In one embodiment, e-commerce server 720 can include a distinct payment option for conversion agency 730. This distinct payment option could process the conversion of credits through their Web site. Alternatively, the distinct payment option could launch an application to process the conversion of credit that is separate from their Web site. In another embodiment, associate server 750 can act as e-commerce server 720. In one embodiment, e-commerce server 720 can provide a software service (or can execute a software module) that permits the sale of goods or services, without necessarily providing a Web site. Further, e-commerce server 720 can be directly replaced with back-end system of a storefront server, serving the same relative functions as described in system 700 of facilitating the sales of goods/services.

Financial institution server 740 can be any of a variety of entities including, but not limited to, a bank, a credit card company, an investment firm, and the like. In one embodiment, financial institution server 740 can reside in the same country as consumer 705 associate server 750, and/or game of chance server 718. In another embodiment, financial institution server 740 can reside in a country other than that of consumer 705 and/or associate server 750.

As shown herein, data stores 755, 735, 742, 176, 174, and the like can be physically implemented within any type of hardware including, but not limited to, a magnetic disk, an optical disk, a semiconductor memory, a digitally encoded plastic memory, a holographic memory, or any other recording medium. Each of the data stores 755, 735, 742, 176, 174 can be stand-alone storage units as well as a storage unit formed from a plurality of physical devices, which may be remotely located from one another. Additionally, information can be stored within each data store 755, 735, 742, 176, 174 in a variety of manners. For example, information can be stored within a database structure or can be stored within one or more files of a file storage system, where each file may or may not be indexed for information searching purposes.

The network 715 can include any hardware/software/firmware necessary to convey digital content encoded within carrier waves. Content can be contained within analog or digital signals and conveyed through data or voice channels and can be conveyed over a personal area network (PAN), a local area network (LAN), or a wide area network (WAN). The network 715 can include local components and data pathways necessary for communications to be exchanged among computing device components and between integrated device components and peripheral devices. The network 715 can also include network equipment, such as routers, data lines, hubs, and intermediary servers which together form a packet-based network, such as the Internet or an intranet. The network 715 can further include circuit-based communication components and mobile communication components, such as telephony switches, modems, cellular communication towers, and the like. The network 715 can include line based and/or wireless communication pathways.

Figure 8:
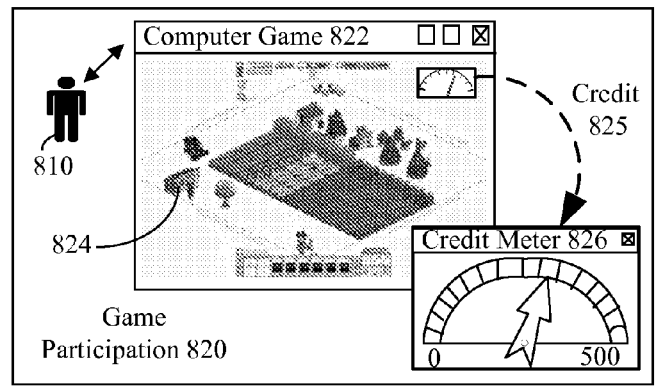
FIG. 8 is a depiction of a scenario and a set of GUIs for converting non-negotiable funds earned through participation awards into negotiable funds in accordance with an embodiment of the inventive arrangements disclosed herein.
Figure 8:
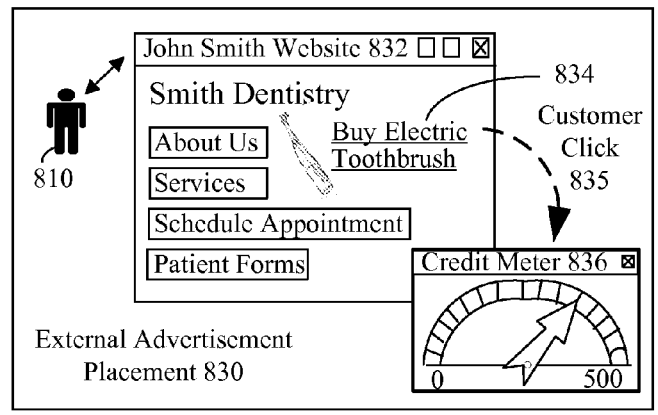
Figure 8:
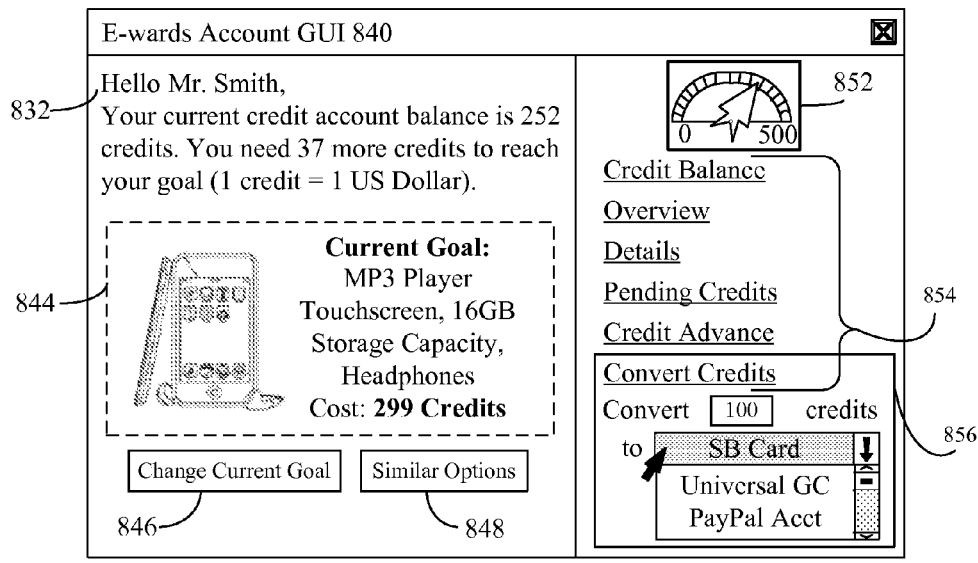

One Embodiment of Disclosure Depicting Participation Credits for Targeted Goal FIG. 8 is a depiction 800 of scenarios and a set of GUIs for converting non-negotiable credits earned through participation awards into negotiable and/or entity-independent funds in accordance with an embodiment of the inventive arrangements disclosed herein. It should be understood that embodiments illustrated in FIG. 8 are not intended to be limiting and other embodiment for a user 810 to obtain participation credits are contemplated. The embodiment discussed in FIG. 8 are for illustrative purposes to convey the act of earning credits through a participatory consumer incentive activity as made available by a credit providing entity.

In game participation embodiment 820, user 810 can play a designated computer or video game 822 such as Farmville, World of Warcraft, Eve, Civilization, and the like and perform actions 824 in the game 822 that can earn user 810 credits that are reflected in a credit meter 826. Actions 824 that can warrant credits 825, can be predetermined by a computer game provider (i.e., credit providing entity). It should be noted that these computer game 822 earned credits 825 are for virtual world actions and interactions. As such, a user 810 is not limited to real world actions for earning credits. A virtual world is an online community that can take the form of a computer-based simulated environment through which users can interact with one another and use and create objects. Virtual worlds are not limited to games but, depending on the degree of immediacy presented, can encompass computer conferencing and text based chatrooms.

It should be appreciated that in one embodiment, when a user is participating in an RPGA game, and as a result of his or her virtual actions in the game environment receives virtual "gold" for an "IOU", this transaction can also be considered to be a conversion from non-negotiable (the IOU) to negotiable and/or entity-independent funds (gold). Similarly, a sale of a magic sword (to be considered a credit or non-negotiable fund) that is conducted with a payment of (and as such is "converted to" virtual gold can be considered a conversion transaction resulting in negotiable and/or entity-independent funds. As such, neither the credit (subsequent non-negotiable fund) nor the negotiable fund need be real world items. A conversion from a non-negotiable fund to a negotiable fund can occur fully in a virtual world environment.

Actions 824 that can warrant credits 825 can include actions that lead to specific level achievements, high scores, interacting with or collaborating with other users in a certain manner should the game be a multiplayer game, and the like. Actions 824 that warrant credits 825 can, in one embodiment, be unknown to a user 810 prior to achieving the credit 825 award, encouraging users to continue participation in the game for a possible future credit 825 award to increase their credit balance as tracked by credit meter 826. In another embodiment, actions 824 can be known and provider user 810 with a roadmap to follow to earn certain credits to reach his or her own goal of accrued credits 825. In one embodiment, credit meter 826 can also include a notification of the current or effective conversion ratio applying to the earned credits 825.

In external advertisement placement 830, user 810 can host his or her own website 832. Part of this site 832 can be an advertisement 834 for external content or products. The advertisement can be for adjacent market goods to allow an adjacent market entity to take advantage of adoption order as well as commonality of requirements or relationships due to the fact that adjacent market segments share common characteristics in application requirements and ecosystem, or community, relationships.

For example, the electric toothbrush market (part of the oral hygiene market), can be adjacent to the market for dental services. As such, John Smith's Dentistry website 832 can include an external advertisement for an electric toothbrush 834 or an airline website can enable visitors to also view external advertisement offers from car rental companies or destination city hotels. It should be noted that an external advertisement need not be for an adjacent market good or service. Upon each consumer click 835 of the external ad posted to John Smith's site 832, John Smith can receive credits as shown on his credit meter 836. The credit meter 836 can be a personal credit mater for John Smith or a credit meter for the Smith Dentistry business entity.

The credits per click 835 can be collected from the entity whose goods and/or services are being advertised on John Smith's website 832. However, the credits can, in one embodiment, also be awarded to person 810 by a third party non-affiliated entity that is engaged in business with the entity whose goods and services are being advertised. Such a third party entity can be situated in the marketplace to provide credit payment services (in effect a type of conversion payment entity that can optionally charge advertising entity a selling exchange rate for the conversion or a type of "commission" as mentioned previously).

E-wards Account GUI 840 illustrates one embodiment of a credit account management GUI. The GUI or control element of one's credit account can be accessible from a dedicated site or be accessible from a plug in or linkage within a game or e-commerce site, and the like. In one embodiment, an e-wards GUI 840 can present the account holder with summary information 842 that can be linked to a user selected goal 844 purchase (users can thus be reminded of their end reward for participating in credit earning activities. Options to change a current goal 846, view similar options 848 to goal 844, and the like, can be interactive options for e-wards account GUI 840.

Additionally, the GUI 840 can include a visual representation of a user's current credit meter 852 totaling a user's accrued credits from various actions and behaviors (for example, credits accrued from game participation 820 or external advertisement placement program 830. In another embodiment, the visual representation 852 can be incorporated into an e-commerce website letting a user know how many more credits he or she would have to accrue to purchase certain selected items. Account management options 854 can include a plethora of options, such as credit balance check, an overview, detailed history, pending credits (both to be received in the account as well as credits to be converted), an option for a credit advance (further expounded upon in FIG. 6), and an option to convert credits.

In one embodiment, a conversion from non-negotiable credits to negotiable and/or entity-independent funds can include selecting to apply discounts and promotions such as rewards earned through loyal customer appreciation (e.g., free shipping from an e-commerce entity, a coupon for 80% off a future purchase, and the like). In another embodiment, the option 854 to convert credits can include a quick conversion form 856, wherein a user can designate an amount of credits to be converted and placed on a user or account owner selected (pre-registered) gift card, store member card, payment account (such as PAYPAL), and the like. It should be noted that credit conversion can be designated to be transferred into a financial account (credit account, bank account, or other payment account) or negotiable and/or entity-independent funds instrument (such as a credit card, bank card, store card, or gift card) owned by another person. As such, non-negotiable credits can be transferred from one person to another in the form of negotiable and/or entity-independent funds.

Figure 9:
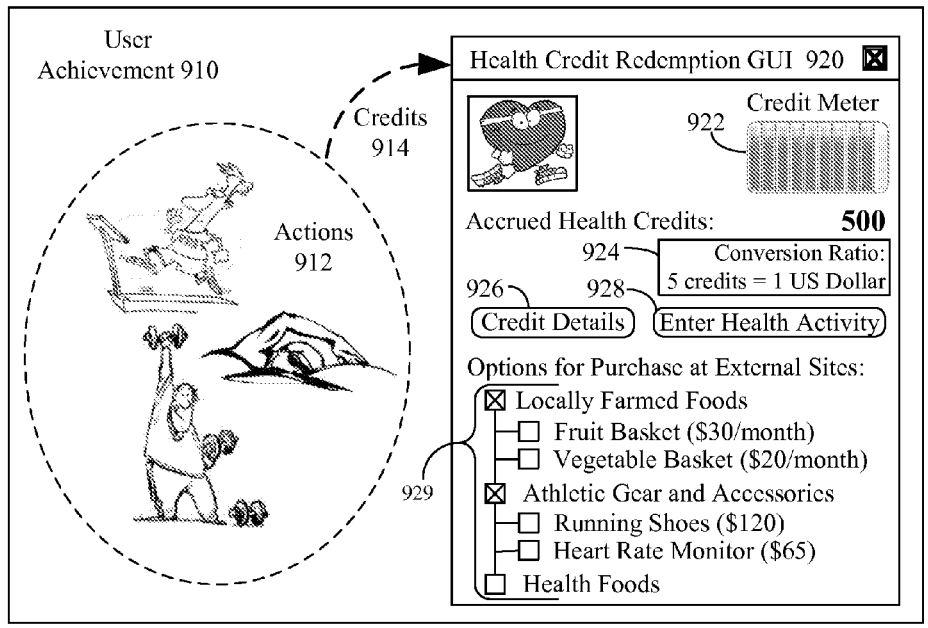
FIG. 9 is a depiction of a scenario and a set of GUIs for converting non-negotiable funds earned through personal achievements into negotiable funds in accordance with an embodiment of the inventive arrangements disclosed herein.
Figure 9:
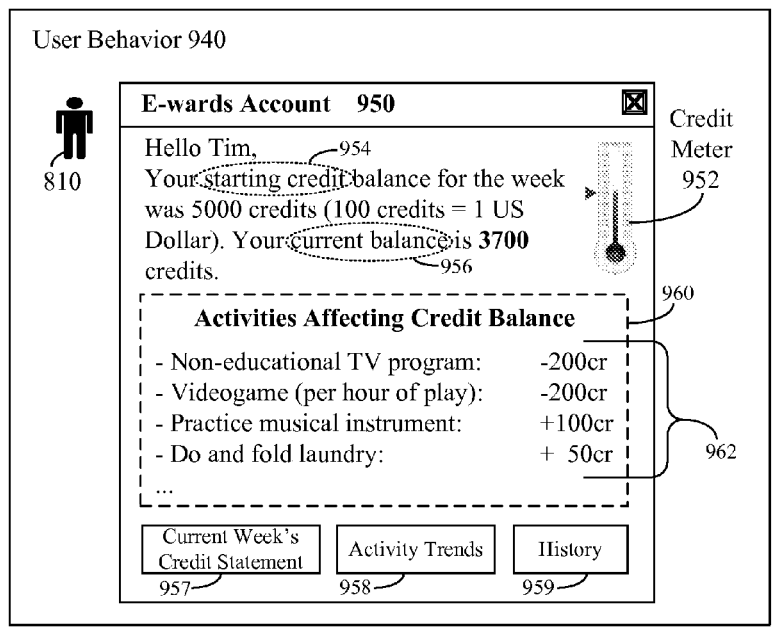

One Embodiment of Disclosure Depicting
Achievement Credits for a Targeted Purpose FIG. 9 is a depiction of a scenario and a set of GUIs for converting non-negotiable credits earned through personal achievements into negotiable and/or entity-independent funds in accordance with an embodiment of the inventive arrangements disclosed herein. It should be understood that embodiments illustrated in FIG. 9 are not intended to be limiting and other embodiments for obtain achievement credits are contemplated. The embodiment discussed in FIG. 9 are for illustrative purposes to convey the act of earning credits through an achievement focused consumer incentive activity as made available by a credit providing entity.

In this instance, the concept of giving (and removing) credits is based on an incentive structure present in human behavior (remunerative or financial incentive in this instance). As used herein, an incentive is any factor (financial or non-financial) that enables or motivates a particular course of action, or counts as a reason for preferring one choice to the alternatives. More specifically, it is an expectation that encourages people to behave in a certain way.

User achievement embodiment 910 can be an example of one such incentive utilizing embodiment for achieving credits to be converted to negotiable and/or entity-independent funds. In this specific embodiment, an incentive can be health targeted rewarding a user for his or her health related achievements and can be sponsored by a specific entity (such as, for example, weight watchers and the like). It should be understood that other embodiments are contemplated. In this specific user achievement 910 embodiment, user actions 912 (such as swimming a certain number of laps, running a given amount of time or burning a specific number of calories from running, etc.) can garner a user credits 914 in the form of non-negotiable credits.

Credits 914 can be tracked and available for use in purchases through health credit redemption GUI 920. Health credit redemption GUI 920 can in one embodiment be maintained by the achievement credit sponsoring entity and credit conversion to negotiable and/or entity-independent funds can be limited to purchase of health related goods. In another embodiment, GUI 920 as well as a user's credit balance can be maintained by another entity and credits can be converted to negotiable and/or entity-independent funds without limitations on purchases. GUI 920 can include a credit meter 922, and a specific conversion ratio 924 notice. Additionally, GUI 920 can include a button to call upon credit details 926, and a button for a user to enter his or her recent health activity 928 to be converted to credits 914.

In one embodiment, entering health activity for credits can be restricted to a user's personal trainer or health representative to prevent abuse of credit garnering behavior by a user. In another embodiment, a record keeping device (such as an athletic watch or heart rate monitor, a lap counter, or a combination of such devices) can be utilized to download data into GUI 920 to maintain accurate records of health activities and assign a correct number of credits 914 to a user's health credit redemption GUI 920 account and credit meter 922. Other methods of entering health activity for credit conversion are contemplated.

It should also be noted that other types of achievement credit embodiments are contemplated. Other embodiments need not be behavior based as they can, for example, be based on a financial threshold. To illustrate, in one embodiment, a user can buy or rent a certain number of DVDs and when he or she has reached a threshold for the number he or she has spent negotiable and/or entity-independent funds on, be awarded with a non-negotiable credit for a movie ticket at a theatre. That credit can then be converted to a negotiable fund upon purchasing a movie ticket or reselling the voucher or credit to another person in exchange for negotiable and/or entity-independent funds.

GUI 920 can also include purchase options 929 at external sites (unaffiliated with the credit providing entity), as well as a list of types of options 932 (which can in one embodiment include direct links). Purchase options 929 can in one embodiment be based on a user's purchase history regarding achievement type which can also include purchases acquired without credit conversion (such as a complete AMAZON account purchase history analysis, and the like).

Other achievement based embodiments 910 are contemplated. For example, another embodiment 910 can include programs set up through children's schools or parents or a combination of the two, wherein certain grades, points, or extra credits can earn children for example a new Nintendo cartridge linked to academic programs and educational content. Additional points gained from playing these educational games can lead to additional credits to be converted to negotiable and/or entity-independent funds to be used to purchase goods or services.

A reverse system to the one described in user achievement embodiment 910, can be a user behavior embodiment 940. In this embodiment, a user 905 can engage in the reverse of accruing credits. That means a user 905 can lose credits based on bad behavior, which can function as negative feedback in an effort to influence a user 905 behavior. The user 905 can, in one embodiment, have options for making up for losing bad credits but can be limited to a ceiling of credits earned within a given timeframe.

For example, as e-wards account 950 GUI demonstrates, a user can have a starting balance 954 (in this instance for a weekly "allowance" of credits, which can also be for a monthly balance, etc.), as well as a current credit balance 956 (which can reflect a user's credit balance based on behavioral credit deductions and additions) as reflected by credit meter 952. GUI 950 can also include a credit balance activities 960 guide that can demonstrate a list of activities (positive as well as negative) 962 to allow user 905 to properly gage his or her behavior and adjust it according to his credit meter 952 balance and desired outcome of the weekly credit balance to be available for conversion to negotiable and/or entity-independent funds at the end of the determined time period for the credit allowance. List 962 can be can be modified as needed by a sponsoring entity that provides credits to user 905 based on his or her behavior.

One Embodiment of Disclosure Depicting
Sponsored Initiative Credits

Figure 10:
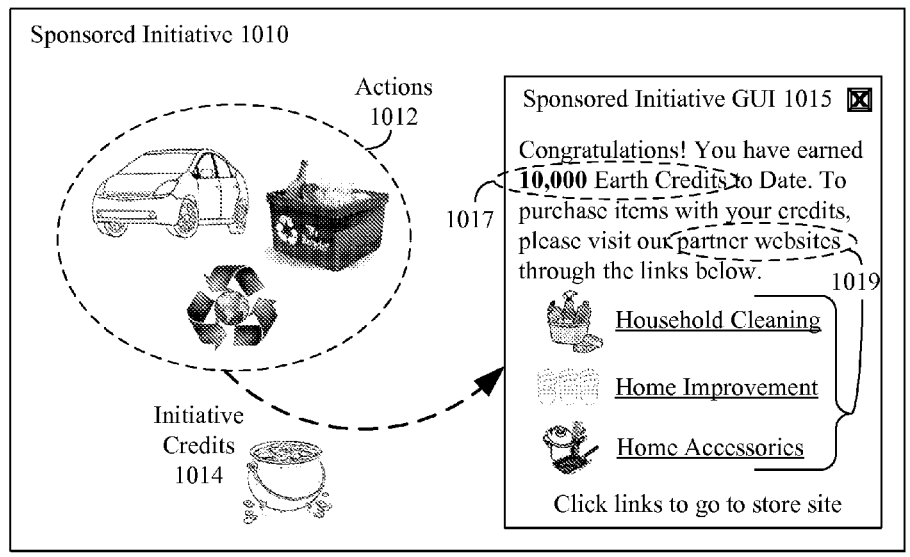
FIG. 10 is a depiction of a scenario and a set of GUIs for converting non-negotiable funds earned through sponsored initiatives or subsidies into negotiable funds in accordance with an embodiment of the inventive arrangements disclosed herein.
Figure 10:
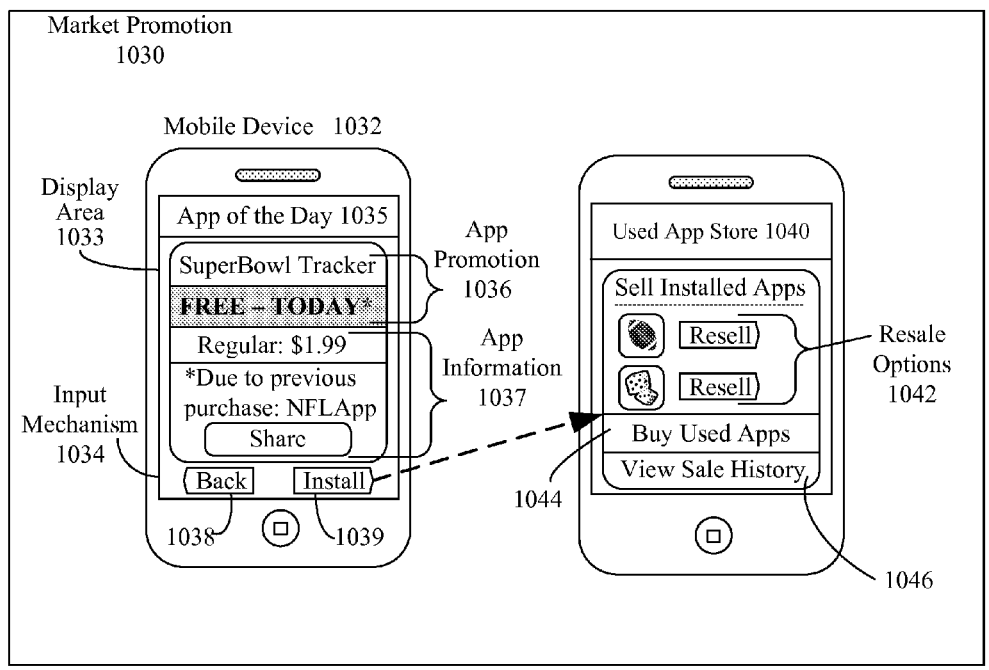

FIG. 10 is a depiction of a scenario and a set of GUIs for converting non-negotiable credits earned through sponsored initiatives or subsidies into negotiable and/or entity-independent funds in accordance with an embodiment of the inventive arrangements disclosed herein. The additional incentives depicted in the following description are broader and economy or market based than the incentive structure discussed in FIG. 9.

Unlike a private good (such as an individual's own health), in this case credits can be earned from enhancing a public good or service. As used herein, a public good is a good that is non-rival and non-excludable. Non-rivalry means that consumption of the good by one individual does not reduce availability of the good for consumption by others; and non-excludability means that no one can be effectively excluded from using the good. Non-excludability may cause problems for the production of such goods. Uncoordinated markets driven by self-interested parties may be unable to provide these goods in optimal quantities, if at all. As such, subsidies can be used as incentives for individuals to contribute to or produce a public good.

A subsidy can be an assistance paid to a business or economic sector through a variety of ways (either directly to the business or industry or indirectly through subsidizing the business or industry's consumers' purchases). Most subsidies are made by the government, but can also be an assistance granted by others such as individuals or non-governmental institutions, to producers or distributed as subventions in an industry to prevent the decline of that industry (e.g., as a result of continuous unprofitable operations) or an increase in the prices of its products or simply to ensure it remains competitive.

The type of subsidy applied in the sponsored initiative embodiment 1010 and the market promotion embodiment 1030 is generally referred to as a direct subsidy or consumption subsidy meaning that an entity provides economic incentives (credit subsidies to be converted to "cash" or negotiable and/or entity-independent funds) to a purchaser or user of a good or service. For example, sponsored initiative embodiment 1010 shows a subsidy project, in this instance a green initiative, where individuals can receive non-negotiable credits 1014 from engaging in green actions and behavior 1012 such as carpooling, recycling, buying electric cars, and the like.

To further enhance the economic sector of the green initiative and maintain its competitiveness the non-negotiable credits 1014 can be converted to negotiable and/or entity-independent funds to be utilized in the purchase of further green products and services tracked in sponsored initiative GUI 1015. Sponsored initiative GUI 1015 can track and maintain a credit balance 1017 to be redeemed for products 1019 offered by sponsored and approved green initiative venders that are not affiliated with the original credit providing entity. Other types of subsidy credits are contemplated and the above example is not intended to be limiting.

An additional type of subsidy credit can be a market promotion embodiment 1030. It should be noted that while the following description centers on a mobile application, the disclosure should not be construed as limited to a mobile application. Market promotion embodiment 1030 can include a mobile device 1002, for example an iPHONE or ANDROID smartphone, which can provide access to a credit earning and conversion application. The mobile device 1032 can include a display area 1034 and an input mechanism 1036, which, in this example, are one-and-the-same. That is, the display area 1034 of a mobile device 1032 can also be used as the input mechanism 1036, for example, with a touch screen.

Mobile device 1032 display 1034 can present the user with an app of the day 1035 marketplace. The app of the day marketplace 1035 can include app promotion 1036 summary as well as more detailed app (of the day) information 1037. For example, an NFL Superbowl Tracker application can be offered as a free app of the day. This free app can, in one embodiment, be due to a previous qualifying app purchase as noted in the app information 1037 section. In another embodiment, the app promotion can be freely available to all users regardless of prior app purchases. App of the day 1035 display can also include a back button 1038 to return the user to a prior screen or an install button 1039 to download and install the promoted app of the day 1036 to his or her mobile device 1032. In such a manner a user engaged in a conversion of non-negotiable to negotiable and/or entity-independent funds. The marketplace will offer the app of the day for free to its purchasers (as a non-negotiable credit that to the marketplace is a negative one, expended for marketing, good will, or another intangible benefit) but still reimburse the app provider with the usual amount of payment for the app or the app provider receives a tax write-off, or the like.

In another embodiment, upon successful installation of the app promotion 1036, the user may access a used app store 1040 via mobile device 1032. The Used app store 1040 can present the user with resale options 1042 of installed applications of the mobile device 1032. Additionally, the used app store 1040 can include a button for buying used apps 1044 as well as a button to view sale history 1046. A user selling an application in a secondary marketplace is a type of non-negotiable fund to negotiable fund (money or otherwise) exchange. The sale can be for credits that can be converted to cash or cash itself. The currency for this transaction can, in one embodiment, be tracked and maintained within an e-wallet application or rewards account, and the like.

Other types of promotions for credits are contemplated. For example, airlines allow sales for a limited time period for certain flights or destinations earning a consumer double or triple the loyalty points. Loyalty points can be converted to negotiable and/or entity-independent funds or can be transferred or gifted to another member in a transaction (which can be viewed as the reverse of a non-negotiable to negotiable and/or entity-independent funds exchange from the viewpoint of the account holder).

One Embodiment of Disclosure Depicting Social Networking Credits

Figure 11:
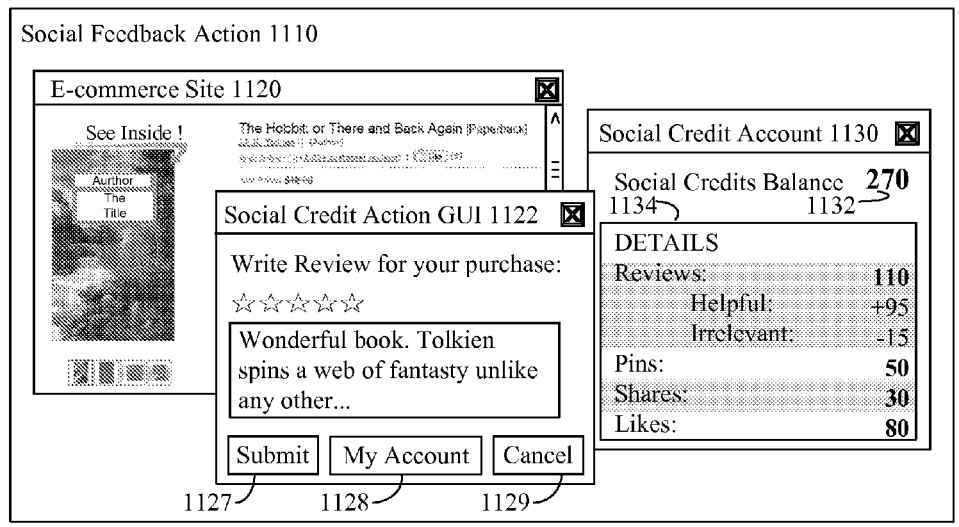
FIG. 11 is a depiction of scenarios and GUIs for converting non-negotiable funds earned through social networking activities into negotiable funds in accordance with an embodiment of the inventive arrangements disclosed herein.
Figure 11:
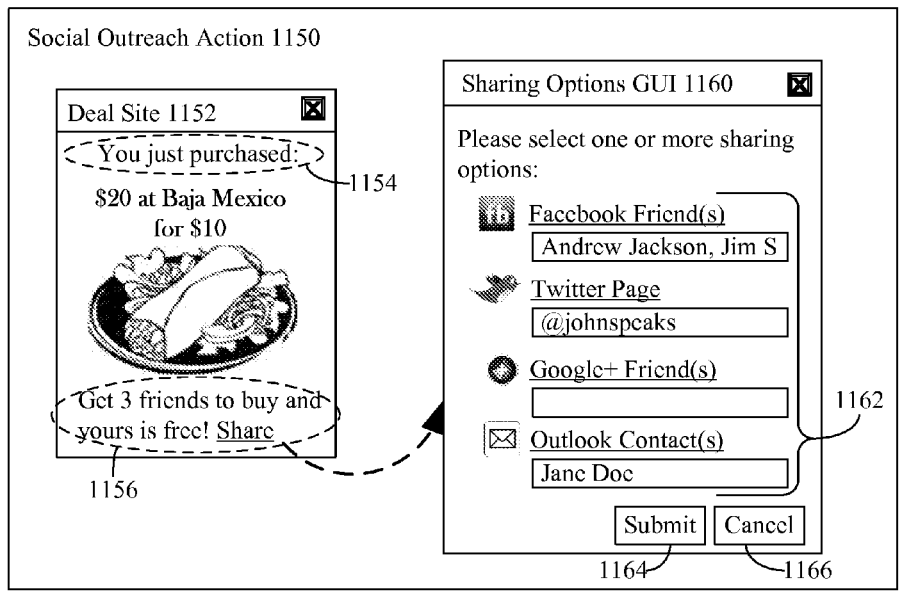

FIG. 11 is a depiction of scenarios and GUIs for converting non-negotiable credits earned through social networking activities into negotiable and/or entity-independent funds in accordance with an embodiment of the inventive arrangements disclosed herein. Many types of social or community enhancing activities are contemplated for the purpose of earning credits to be converted to negotiable and/or entity-independent funds. The following embodiments are for exemplary purposes only and other social networking credit embodiments are contemplated.

Social networking, as used herein, refers to platforms that focus on the building and reflecting of social networks or social relations among people, who, for example, share interests and/or activities. As such they can be individual or group-centered. Social networking services allow users to share ideas, activities, events, and interests within their individual or group networks. Generally, a social network service consists of a representation of each user (often a profile), his/her social links, and a variety of additional services.

It should be noted that most social network services are web-based and provide means for users to interact over the Internet, such as e-mail and instant messaging. As such, social networking credit services can be integrated into e-commerce sites to allow for social feedback actions 1110, social outreach actions 1150, and the like.

Social feedback actions embodiment 1110 can illustrate how a consumer may earn credits from providing reviews or other services that allows other members of his or her social network to act in a more informed manner. Decision making of other members of the social network are improved the more information (or certainty) is added to a specific situation or choice. It should be noted that more informed individuals will be able to make more rational choices in the economic sense, which subsequently facilitates the prediction of market behavior for economic entities. As such, both consumers as well as suppliers benefit from the proliferation of social feedback options for credit.

E-commerce site 1120 can sell products and services and allow purchasers to perform socially serving activities in exchange for providing them with credits in the form of loyalty points, discounts, or other non-negotiable credits. Social credit action GUI 1122 shows one example of such a socially serving activity. In this embodiment, the credit garnering activity can be leaving a review for a previously purchased good such as writing a book review on AMAZON.

Options associated with the social credit action GUI 1122 can include a visual ranking (starts) 1124 option as well as a descriptive text rating 1126. The form can also include a submit button 1127 that can publish the user created review to e-commerce site 1120, and a cancel button 1129 that can return the user to e-commerce site 1120 without publishing a social credit action or review. An optional account button 1128 can provide a means for a credit user to reach his or her awards credit account (such as social credit account GUI 1130) directly from an e-commerce site 1120.

User selection of the account button 1128 can launch the social credit account GUI 1130. The credit account GUI 1130 can include a listing for overall account balance 1132 as well as a details pane 1134. Details pane 1134 can list the user's past credit garnering actions and a breakdown of the amount of credits gained from various types of social feedback actions. For example, a user can have earned credits from writing reviews, sharing a review, liking another individual's review (or marking it as useful or helpful) or receiving a helpful status of one of his or her own reviews.

It should be noted that in one embodiment, receiving a "helpful" status on a written review by another credit account holder can garner a user additional credits to the original writing of the review to encourage honesty and more perfect information to enter the market. Similarly, a user may receive a dock in credits (negative credits) when one of his or her social feedback actions is deemed as irrelevant or untrue. Other options for creating an effective incentive structure for social actions are contemplated. GUI 1130 can also include a button 1136 to encourage use of credits for a purchase.

Social outreach action embodiment 1150 depicts another type of social proliferation of information within the marketplace. In this instance, a deal site 1152 (for example, an e-commerce site providing goods and services as well as daily deals on purchases to customers) can present a consumer with a summary page 1152 of a recently purchased deal for a good or service. The summary page 1154 can include purchase information 1156, as well as a social outreach option 1158 coupled to the recently purchased good or service that can garner a purchaser credits in the form of non-negotiable and/or entity-independent funds.

It should be noted that deal site 1152 can be any site for an entity that can function as a retailer or "front" for other venders (e.g., Amazon, eBay stores, Newegg marketplace, etc.) where any credits, loyalty points, discounts, membership benefits (e.g., even free shipping on AMAZON PRIME) that can be considered an "earning" someone is paying for, involve a conversion of non-negotiable credits to negotiable and/or entity-independent funds from one entity to another. In effect the retailer or front party supplements the vender that it is a storefront for, for the non-negotiable credits extended to the deal site 1152's members or credit recipients.

In one embodiment, there can be a requirement associated with the credits. For example, a requirement can be set that a user's social outreach actions lead to three of his or her social network contacts purchasing the same item before a user will be given credits. In this instance, the credits can be that the original purchaser's transaction is free. This is in effect a set of non-negotiable and/or entity-independent funds extended to the purchaser by the deal site 1152 to be utilized in purchasing (with negotiable and/or entity-independent funds) a deal for goods or services from another entity at a discount.

Selection of the social outreach option 1158 can launch a sharing options GUI 1160 to be presented to the purchaser. Sharing options GUI 1160 can include quicklinks or address fields for social network contact options 1162 (for example, a credit account holder's FACEBOOK friends, TWITTER followers, GOOGLE+ contacts, or OUTLOOK contacts). In this manner, sharing options GUI 1160 can provide convenient and quick dissemination of the site 1152's information to a user's social network. In this embodiment, sharing options GUI 1160 can be coupled to an individual's social networking contact lists. A submit button 1164 can be included to launch messages sharing the deal purchase as well as a cancel button 1166 that can return the user to the deal site 1152.

A further example of vender transactions discussed above can include a phone service company extending a discount on a new mobile phone to a customer for signing an additional contract. The discount the customer receives is a form of non-negotiable fund that the phone service company can convert into negotiable and/or entity-independent funds (as they will be paying the supplier of the new mobile phone the full price for the item). Additional scenarios where an entity supplements another entity downstream for a credit given to a purchaser are contemplated.

One Embodiment of Disclosure Depicting Credit Advance for Future Credits Earned

Figure 12:
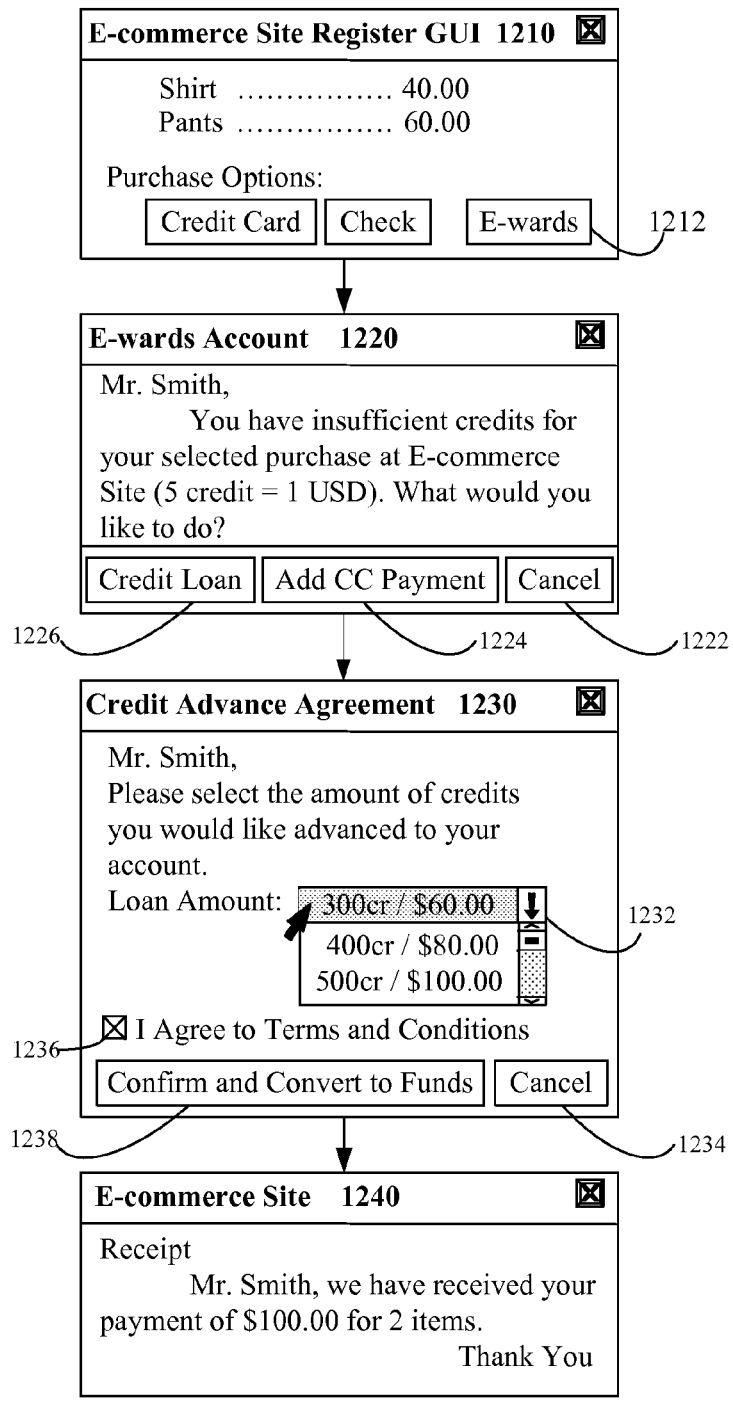
FIG. 12 is a depiction of successive GUIs that illustrate a web based credit advance and subsequent conversion of non-negotiable funds into negotiable funds in accordance with an embodiment of the inventive arrangements disclosed herein.

FIG. 12 is a depiction of successive GUIs that illustrate a web based credit advance and subsequent conversion of non-negotiable credits into negotiable and/or entity-independent funds in accordance with an embodiment of the inventive arrangements disclosed herein. Most of the time, a user will have earned credits from engaging in previous interactions with a credit providing entity. However, it should be appreciated that at times consumers may wish to purchase additional credits or request a credit advance to complete a purchase with non-negotiable and/or entity-independent funds converted to negotiable and/or entity-independent funds.

In this manner, a credit account holder may wish to engage in a loan policy for credits in exchange for a guarantee of future acts or behavior that would earn him or her non-negotiable credits. The credit loan is a policy that can take advantage of a credit account holder's lack of impulse control in regards to purchasing behavior by allowing a user to immediately purchase a desired good or purchase but delay payment until a later time.

As used herein, a loan is a type of debt. Like all debt instruments, a loan entails the redistribution of financial assets over time, between the lender and the borrower. In a loan, the borrower initially receives or borrows an amount of money (or in this instance credits), called the principal, from the lender, and is obligated to pay back or repay an equal amount of credits to the lender at a later time. The credits can be paid back in regular installments, or partial repayments; in an annuity, each installment is the same amount. It should be noted that the loan (or credit advance) can generally be provided at a cost, referred to as interest on the debt, which provides an incentive for the lender to engage in the loan or credit advance.

Conventionally, an advance service for funds can allow credit account holders to withdraw credits, either through an ATM or over the counter at a bank or other financial agency, up to a certain limit. Such advances can generally incur a fee (to replace the interchange fee normally charged to the merchant on a card transaction), although this can be waived if the account is in credit. It should be noted that credit advances can be, but are not required to be administered in a conventional advance service manner. That is, in one embodiment, higher conversion ratios for credit advances can be required for purchases making a credit advance fee dependent upon the amount of credits requested, while in another embodiment a credit advance can include a one-time fixed credit fee associated with the credit loan or advance. It should be understood that other arrangements for the loan of credits to be utilized for conversion to non-negotiable and/or entity-independent funds are contemplated.

E-commerce site register GUI 1210 can be a checkout window from an e-commerce site. GUI 310 includes payment button 1212, which represents a payment option that includes the conversion of non-negotiable credits to purchase the items in the shopping cart. Selection of payment button 1212 by a user can produce GUI 1220.

E-wards account GUI 1220 can be a display window from a conversion agency. GUI 1220 can include a message communicating a user's credit account balance of non-negotiable, entertainment credits earned from one or more game providing entities, or the status of the account in relation to the requested purchase amount from GUI 1210. It should be noted that when a user has enough credits to complete the purchase, he or she can be presented with a credit account GUI to choose the type of credits to apply to his or her requested purchase as summarized in GUI 1210.

In this instance, however, a message notifying the user that there are insufficient funds in place can provide a user with three button options (cancel purchase 1222, add other form of payment 1224, or request credit loan 1226). GUI 320 can be rendered by any of a variety of means including, but not limited to, a Web browser, a JAVA applet, a PERL script, and the like. In one embodiment, GUI 320 can be contained within the e-commerce site.

Selection of cancel button 1222 by a user cancels the transaction and can return the user to GUI 1210. Selection of the add other form of payment button 1224 can result in a conventional credit card or PayPal payment GUI being presented to the user to supplement or replace the credit based payment. Selection of the credit loan button 1226 can produce credit advance agreement GUI 1230.

GUI 1230 can be rendered by any of a variety of means including, but not limited to, a Web browser, a JAVA applet, a PERL script, and the like. In one embodiment, GUI 1230 can be contained within the e-commerce site. GUI 1230 contains a means by which the user selects the amount or even type of non-negotiable credits to advance including, but not limited to, a set of radio buttons, a set of checkboxes, a highlighting mechanism, and the like. Display box 1232 can display the monetary value of the selected non-negotiable credits as well as the amount of credits to be advanced for conversion and purchase completion at the e-commerce site. The value displayed in display box 1232 can be based on preset conversion factors.

Selection of cancel button 1234 by a user cancels the credit advance process and can return the user to GUI 1210. Button 1238 can represent the initiation of the process by which the selected non-negotiable credits are advanced and subsequently converted to negotiable and/or entity-independent funds. Selection of button 1238 by a user can be dependent upon a user actively acknowledging terms and conditions 1236 of the requested credit advance and can produce GUI 1240. As such, selection of button 1238 by a user completes the transaction initiated in GUI 1210 and can produce GUI 1240.

E-commerce site 1240 GUI can be a display window from the same said e-commerce site. GUI 1240 can contain a message acknowledging the successful conversion of the user's non-negotiable credits into negotiable and/or entity-independent funds for the purchase of the items in the shopping cart.

Figure 13:
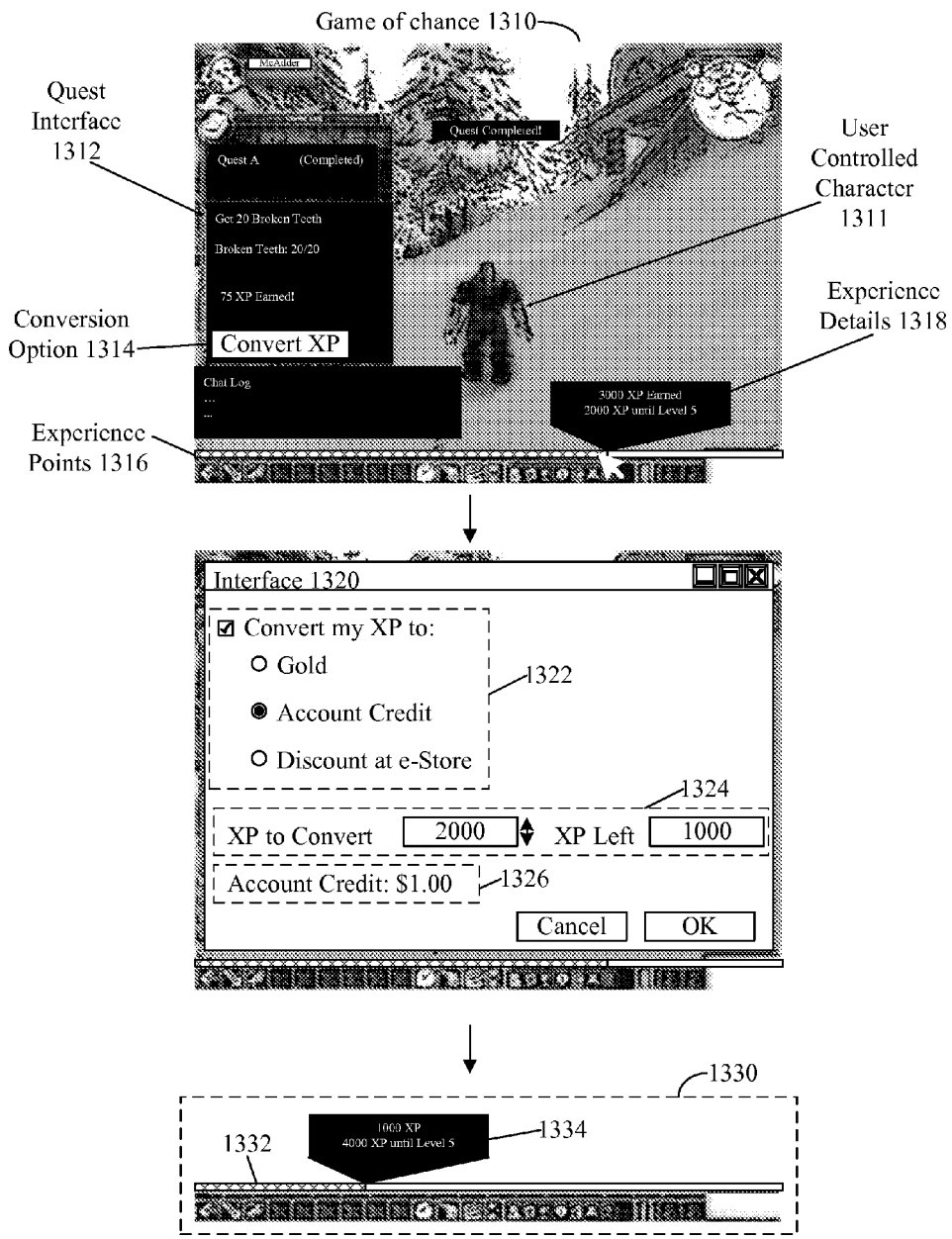
FIG. 13 is a schematic diagram illustrating a set of interfaces within a game of chance for the conversion of non-negotiable credits to negotiable funds in accordance with an embodiment of the inventive arrangements disclosed herein.

FIG. 13 is a schematic diagram illustrating a set of interfaces 1300 within a game of chance for the conversion of non-negotiable credits to negotiable and/or entity-independent funds in accordance with an embodiment of the inventive arrangements disclosed herein. In interfaces 1300, a user controlled character 1311 within a game of chance 1310 can be utilized to earn entertainment credits (e.g., experience points 1316) by interacting with a virtual world of the game of chance 1310. Experience points 1316 can be automatically converted within game 1310 using interface 1320. The result of the conversion can produce negotiable credits (e.g., a user account credit 1326) which can be used by the user in one or more traditional ways. For example, the conversion can be used by the user to supplement a payment of an online subscription to game 1310. In one instance, game 1310 can be a massively multiplayer online role-playing game (MMORPG). For example, the game of chance 1310 can be an MMORPG game.

Experience points 1316 can be earned by interacting with entities within the game of chance 1310 where interactions are governed in part by a randomization component. For example, character 1311 can perform combat with a computer controlled opponent which can respond to user controlled character actions by the use of a random action algorithm to perform appropriate reactions. In one embodiment, game 1310 can encompass one or more randomization elements which can include, but is not limited to, combat interaction, loot generation, non-playable character (NPC) interactions, and the like. It should be appreciated that game 1310 can be highly dynamic and randomized environment which can support single-player mode and/or multiplayer mode.

In game of chance 1310, a character 1311 can be utilized by a user to complete an objective (e.g., Quest A). In one instance, objective completion can be presented quest interface 1312 permitting visual confirmation of the objective. In the instance, interface 1312 can include a conversion option 1314 which can permit the conversion of experience points 1316 to a user selectable option. For example, conversion option 1314 can be a user interactive button which can trigger the presentation of interface 1320. Experience details 1318 can be utilized to present information about total experience points earned during character's existence. Details 1318 can provide pertinent experience point information when a cursor is placed over experience point 1316 presentation (e.g., XP bar). For example, experience points 1316 can be presented as a horizontal bar within game 1310 interface. In one instance, experience details 1318 can be customized to present conversion information about a user defined goal. In the instance, a user can specify negotiable fund goals (e.g., monetary sums), entertainment credit goals (e.g., gold pieces), and the like. For example, details 1318 can present the amount of experience points required to reach a ten dollar conversion.

Upon selection of conversion option 1314, interface 1320 can be presented within game 1310. Interface 1320 can include conversion options 1322, configuration options 1324, and conversion information 1326. Conversion options 1322 can include, but is not limited to, conversion of experience points 1316 into virtual currency, account credit, discounts at e-commerce sites, dragon kill points (DKP), and the like. In configuration options 1324, a user specified quantity of experience points can be converted to selection option 1322. For example, a user can choose to convert two thousand experience points to an account credit. In conversion information 1326, information about conversion outcome for experience points can be presented. In one instance, information can present a quantity of negotiable and/or entity-independent funds to be received, conversion rate details, and the like. It should be appreciated that conversion rates can be dynamic and or constant. In one embodiment, conversion rates can be tied to game 1310 economy permitting economic state to dictate conversion rates.

In one embodiment, conversion of experience points can negatively affect character development. In the embodiment, a quantity of experience points can be deducted from the character based on the configuration options 1324 specified by user. For example, if a user selects to convert two thousand experience points into a one dollar account credit the character 1311 can be reduced to one thousand experience points from three thousand experience points. It should be appreciated that experience points can be continually gained and lost through game 1310 interaction and conversion options 1314.

In section 1330, a portion of game 1310 interface can be presented displaying the outcome of the conversion. In section 1330, experience details can be presented in a tooltip 1334 which can indicate the current experience points of the character 1311 resulting from the conversion. For example, experience points 1322 can be a shortened horizontal bar indicating the portion of the level which the character 1311 has achieved.

Drawings presented herein are for illustrative purposes only and should not be construed to limit the invention in any regard. It should be appreciated that the disclosure is not limited to the conversion of experience points within game 1310. It should be appreciated that options 1322 can be mutually exclusive, combinatorial and the like. For example, a user can convert experience points into a sum of gold pieces and an ecommerce store credit. It should be understood that the functionality described within interfaces 1300 can be performed by a plug-in, Web-enabled service, 13rd-party tools, and the like. For example, interface 1320 can be a screen of an add-on software. It should be appreciated that conversion functionality can be performed by a conversion agency intermediary independent of game 1310 provider.

Figure 14:
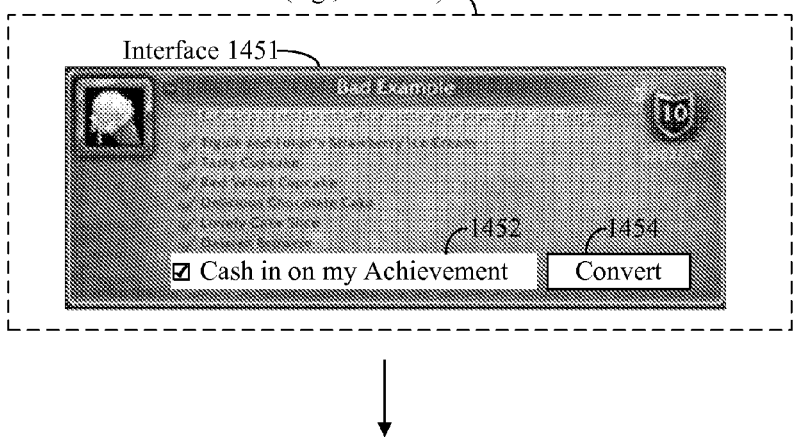
FIG. 14 is a schematic diagram illustrating a set of interfaces within a game of chance for the conversion of non-negotiable credits to negotiable funds in accordance with an embodiment of the inventive arrangements disclosed herein
Figure 14:
Figure 14:
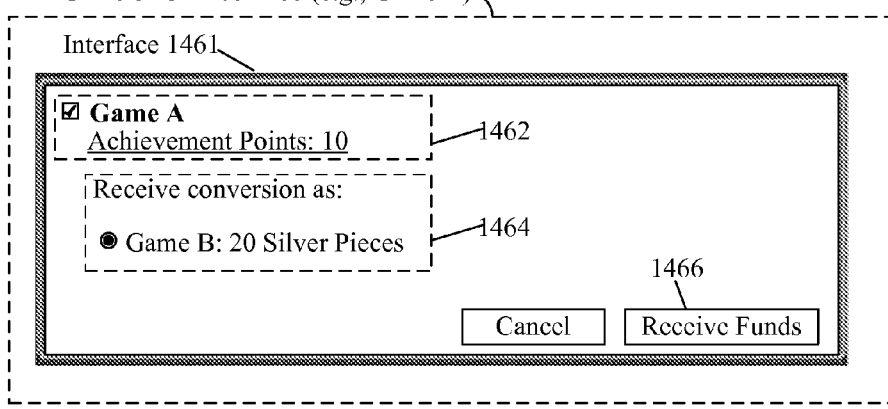

FIG. 14 is a schematic diagram illustrating a set of interfaces 1400 within a game of chance for the conversion of non-negotiable credits to negotiable and/or entity-independent funds in accordance with an embodiment of the inventive arrangements disclosed herein. In interfaces 1400, entertainment credits obtained from one or more achievements within a game of chance 1450 can be converted to negotiable and/or entity-independent funds which can be utilized in game of chance 1460. For example, an achievement completed in Game A can be converted to gold pieces (e.g., in-game currency) of a Game B. In one embodiment, conversion can be a two step process similar to an import/export procedure. In the embodiment, a user can select to convert achievement points within a Game A to Game B currency. In the embodiment, the conversion can be initiated within interface 1451 of game 1450 and completed within interface 1461 of game 1460. It should be appreciated that the disclosure is not limited in this regard and can include a one stage process.

In game 1450, an interface 1451 can be presented indicating an achievement accomplishment. Interface 1451 can include achievement information, conversion option 1452, conversion element 1454, and the like. Conversion option 1452 can be a user selectable option which can permit conversion of entertainment credits (e.g., achievement points) to be utilized as negotiable credits (e.g., silver pieces) within one or more different games (e.g., Game B, Game C). It should be understood that the conversion can include one or more conversion rates which can be associated with one or more games. For example, if a game has three types of virtual currency, each type can be presented as an option for conversion. It should be appreciated that games can include games from one or more different vendors.

In game of chance 1460, an interface 1461 can present conversion details for receiving negotiable and/or entity-independent funds from entertainment credits. Interface 1461 can include, but is not limited to, game selection 1462, conversion preferences 1464, and the like. For example, pending conversions (e.g., Game A achievement) can be presented within game selection 1462. In conversion preferences 1464, user selectable preferences for receiving funds can be specified. For example, ten achievement points can be converted to a quantity of twenty silver pieces within Game B. In one instance, conversions within FIG. 14B can be performed from a centralized user interface (e.g., conversion interface) which can permit immediate conversion of entertainment credits to negotiable and/or entity-independent funds. Upon selection of element 1466, a user profile associated with Game B can be accredited with funds.

Drawings presented herein are for illustrative purposes only and should not be construed to limit the invention in any regard. It should be appreciated that achievements can include, individual achievements, group based achievements, and the like. For example, achievements can include successful completion of a raid encounter (e.g., killing a boss opponent) or a group quest.

Figure 15:
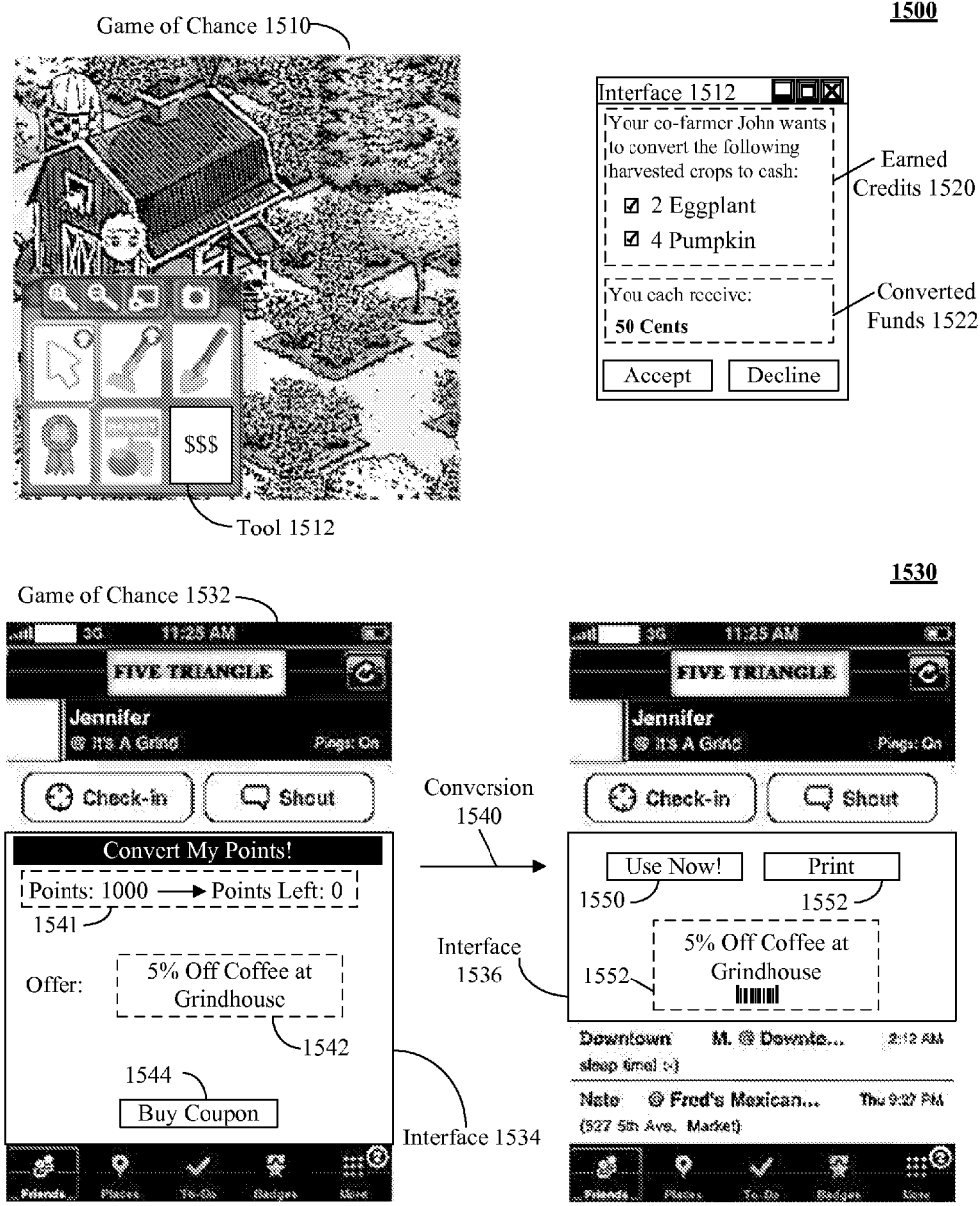
FIG. 15 is a flowchart illustrating a set of embodiments within a game of chance for the conversion of non-negotiable entertainment credits to negotiable funds in accordance with an embodiment of the inventive arrangements disclosed herein.

FIG. 15 is a flowchart illustrating a set of embodiments 1500, 1530 within a game of chance for the conversion of non-negotiable entertainment credits to negotiable and/or entity-independent funds in accordance with an embodiment of the inventive arrangements disclosed herein. In embodiment 1500, tool 1512 within game of chance 1510 can permit conversion of entertainment credits (e.g., harvested crops) to negotiable and/or entity-independent funds (e.g., micropayment). In embodiment 1530, interface 1534, 1536 can allow game of chance 1532 earned credits to be converted into vendor specific vouchers.

In game of chance 1510, a tool 1512 can be utilized to convert user generated earnings to negotiable and/or entity-independent funds. In one instance, game 1510 can be a simulation based game permitting earnings to be accrued which can determine user success within the game. For example, game 1510 can be a farming simulation which allows the planting, harvesting, and selling of crops (e.g., at a virtual market in game 1510) to advance the gameplay. It should be appreciated that earnings can include, but is not limited to, virtual currency (e.g., farm coins), experience points, crops, animals, and the like.

In one instance, tool 1512 can trigger the presentation of interface 1512. In the instance, interface 1512 can include, but is not limited to, earned credits 1520 information, converted funds 1522 details, and the like. In one embodiment, game of chance 1510 can be a multiplayer game (e.g., co-operative gameplay) associated with an online social network framework. For example, game 1510 can be a social networking game. It should be appreciated that game 1510 outcome can be affected by one or more random variables including, multiplayer interaction, virtual economy state, and the like. In interface 1512, user selectable credits 1520 can be chosen to be converted into funds 1522. In one instance, interface 1512 can be an interface able to support co-operative gameplay. In the instance, interface 1512 can be presented in response to a co-operative user action within a second user interface of game 1510. For example, a second user (e.g., John) can initiate a conversion action which can convert harvested crops into fifty cents upon approval by the first user. That is, interface 1512 can be a mechanism for co-operative gameplay with conversion capabilities. It should be appreciated that interface 1512 can include capabilities which support other co-operative gameplay including, but not limited to, trading, group-based objectives, and the like.

In game of chance 1532, points earned from presence registration at a venue associated with a location based service can be converted into a negotiable voucher. Game of chance 1532 can include, but is not limited to, online social network game, location based game, and the like. For example, game of chance 1532 can include geocaching games which can reward points for locating cached objects. In one instance, game 1532 can be associated with a location based social networking Web site. For example, game 1532 can be a mobile application for earning status advancement (e.g., points, badges, titles, etc.) by presence registration (e.g., "check-in") at a venue. It should be appreciated that earnings can be affected by one or more random variables including, user-to-user interactions, venue promotions, and the like.

In interface 1534, conversion of earned points (e.g., from "check-ins") can be performed utilizing conversion artifact 1544. Interface 1534 can include, but is not limited to, earnings information 1541, conversion option 1542, conversion artifact 1544, and the like. For example, interface 1534 can present the points earned by a user (e.g., 1000 points), a conversion option (e.g., coupon information), and a mechanism for initiating conversion (e.g., "Buy Coupon" button). In one instance, interface 1534 can be presented when a quantity of earning is reached. For example, when a user reaches one thousand points, the interface 1534 can be automatically presented upon check-in. In another instance, interface 1534 can be manually selected from a set of conversion options associated with the game of chance 1532. In one embodiment, conversion option 1542 can be a voucher for a venue associated with a previous presence registration. For example, a discount (e.g., option 1542) can be selected based on one or more places the user has visited in the past thirty days.

Upon conversion initiation via conversion artifact 1544, conversion 1540 can be performed. Interface 1536 can be presented responsive to the conversion 1540. In interface 1536, a coupon 1552 can be presented which can be utilized by a user as a negotiable entity. In one instance, coupon 1552 can be automatically and/or manually utilized. For example, coupon 1552 can be automatically added to a user account associated with a venue at which the coupon is redeemable. In one embodiment, interface 1536 can present electronic and non-electronic options for coupon redemption. In the embodiment, an electronic redemption button 1550 can permit the presentation of coupon 1552 which can be communicated to proximate electronic devices. For example, "Use Now!" button 1550 can present coupon 1552 with barcode (e.g., linear, QR) which can be scanned at a register to provide a discount at checkout (e.g. upon item purchase). In the embodiment, interface 1552 can permit a hardcopy of the coupon 1552 to be created which can be utilized as a traditional coupon.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
a computer, comprising hardware and software that is stored upon the hardware and that is able to be executed by the hardware, establishing a loyalty account for non-negotiable credits provided by an entity to an account holder, wherein the entity is a unit that has a legal and separately identifiable existence, wherein the entity is a financial institution, and wherein the non-negotiable credits are loyalty points of a loyalty program provided by the financial institution, wherein the account holder earns quantities of the loyalty points from the financial institution for usages by the account holder of financial services provided by the financial institution, wherein the non-negotiable credits have redemption restrictions imposed by the entity, wherein the entity restricts transfers of granted ones of the non-negotiable credits, wherein the transfer restrictions by the entity prevent the account holder from transferring granted ones of the non-negotiable credits in that user's possession to others without permission from the entity;

the computer detecting interactions involving the account holder earning a quantity of non-negotiable credits by utilizing financial services provided by the financial institution, wherein the quantity of non-negotiable credits from the interactions are added to the loyalty account, wherein in absence of a conversion operation that converts the non-negotiable credits to entity independent funds, a commerce partner does not accept the non-negotiable credits for goods or services that the commerce partner provides, wherein the commerce partner does accept the entity independent funds for goods or services that the commerce partner provides, wherein the commerce partner is a unit that has a legal and separately identifiable existence, wherein the commerce partner is not the entity, wherein the commerce partner is associated with the entity in some commercial activity, wherein the conversion operation is explicitly permitted by terms of an agreement established between the entity and the commerce partner, wherein the entity independent funds not stored in the loyalty account, wherein the entity independent funds are independent of the redemption restrictions that were imposed upon the non-negotiable credits, wherein the entity independent funds are possessed by the account holder; and the computer subtracting a quantity of the non-negotiable credits from the loyalty account, the subtracted quantity of non-negotiable credits corresponding to a quantity of entity independent funds resulting from the conversion operation that converts the non-negotiable credits to a quantity of the entity independent funds in accordance with terms of the agreement mutually established by the commerce partner and the entity, wherein the commerce partner is compensated by the entity for granting the entity independent funds to the account holder in exchange for non-negotiable credits.

2. The method of claim 1, wherein the entity independent funds are different loyalty points of a different loyalty program of the commerce partner, wherein the account holder is a member of the loyalty program of the entity and is a member of the different loyalty program of the commerce partner, wherein the account holder by virtue of the agreement between the entity and the commerce partner is a beneficiary of the agreement permitted, by the agreement, to transform the entity independent funds of a first account, which is controlled by the entity as part of the loyalty program into the quantity of entity independent funds of a second account, which is controlled by the commerce partner as part of the different loyalty program, wherein the transformation further changes a physical medium utilized to store respective value from that used for the first user account to that used for the second user account, wherein the transformation further changes the state of the thing being transformed as transformation necessarily triggers accounting and tax events for both the entity and the commerce partner as values in the first user account and in the second user account are altered, wherein before the transformation, an inherent property of the non-negotiable credits did not permit the account holder to purchase the goods or services that the commerce partner provides by expending non-negotiable credits of the first user account, wherein after the transformation the quantity of entity independent funds of the second user account has an inherent property permitting the account holder to purchase the goods or the services that the commerce partner provides by expending entity independent funds of the second user account, wherein after the transformation, the quantity of entity independent funds of the second user account are independent of the entity and are not subject to the program redemption rules of the loyalty program, but are instead subject to the program redemption rules of the different loyalty program controlled by the commerce partner.

3. The method of claim 1, wherein the commerce partner owns or controls a retail marketplace through which the commerce partner goods or services are available for purchase by the account holder in exchange for the entity independent funds resulting from the conversion operation, wherein the conversion operation is performed for the account holder by a payment device provided for consumer use in the retail marketplace.

4. The method of claim 1, wherein the commerce partner owns or controls an e-commerce marketplace through which the goods or services provided by the commerce partner are available for purchase by the account holder in exchange for the entity independent funds resulting from the conversion operation, wherein the conversion operation is performed for the account holder by the e-commerce marketplace.

5. The method of claim 1, wherein the entity compensates the commerce partner in negotiable funds for redeeming the subtracted quantity of non-negotiable credits by converting the quantity of non-negotiable credits into the entity independent funds, wherein the compensation amount is specified by the mutual agreement established between the entity and the commerce partner.

6. The method of claim 1, wherein the computer is a specialized computer including hardware and software to function as a loyalty program server for the loyalty program provided by the financial institution.

7. The method of claim 1, wherein the conversion operation converts the quantity non-negotiable credits to the quantity of entity independent funds in accordance with a conversion ratio of credits-to-funds, wherein the conversion ratio is mutually established by the terms of the agreement between the entity and the commerce partner.

8. A method comprising:
a computer, comprising hardware and software that is stored upon the hardware and that is able to be executed by the hardware, establishing a loyalty account for non-negotiable credits provided by an entity to an account holder, wherein the entity is a unit that has a legal and separately identifiable existence, wherein the non-negotiable credits are loyalty points of a loyalty program provided by the entity, wherein the account holder earns quantities of the loyalty points from the entity for usages by the account holder of a credit or debit card specifically identified with the loyalty program, which was issued to the account holder conditioned on the account holder being a member of the loyalty program of the entity, wherein the non-negotiable credits have redemption restrictions imposed by the entity, wherein the entity restricts transfers of granted ones of the non-negotiable credits, wherein the transfer restrictions by the entity prevent the account holder from transferring granted ones of the non-negotiable credits in that user's possession to others without permission from the entity;

the computer detecting interactions involving the account holder earning a quantity of non-negotiable credits by utilizing the credit or debit card specifically identified with the loyalty program, wherein the quantity of non-negotiable credits from the interactions are added to the loyalty account, wherein in absence of a conversion operation that converts the non-negotiable credits to entity independent funds, a commerce partner does not accept the non-negotiable credits for goods or services that the commerce partner provides, wherein the commerce partner does accept the entity independent funds for goods or services that the commerce partner provides, wherein the commerce partner is a unit that has a legal and separately identifiable existence, wherein the commerce partner is not the entity, wherein the commerce partner is associated with the entity in some commercial activity, wherein the conversion operation is explicitly permitted by terms of an agreement established between the entity and the commerce partner, wherein the entity independent funds not stored in the loyalty account, wherein the entity independent funds are independent of the redemption restrictions that were imposed upon the non-negotiable credits, wherein the entity independent funds are possessed by the account holder; and the computer subtracting a quantity of the non-negotiable credits from the loyalty account, the subtracted quantity of non-negotiable credits corresponding to a quantity of entity independent funds resulting from the conversion operation that converts the non-negotiable credits to a quantity of the entity independent funds in accordance with terms of the agreement mutually established by the commerce partner and the entity, wherein the commerce partner is compensated by the entity for granting the entity independent funds to the account holder in exchange for non-negotiable credits.

9. The method of claim 8, wherein the entity independent funds are different loyalty points of a different loyalty program of the commerce partner wherein the account holder is a member of the loyalty program of the entity and is a member of the different loyalty program of the commerce partner, wherein the account holder by virtue of the agreement between the entity and the commerce partner is a beneficiary of the agreement permitted, by the agreement, to transform the entity independent funds of a first account, which is controlled by the entity as part of the loyalty program into the quantity of entity independent funds of a second account, which is controlled by the commerce partner as part of the different loyalty program, wherein the transformation further changes a physical medium utilized to store respective value from that used for the first user account to that used for the second user account, wherein the transformation further changes the state of the thing being transformed as transformation necessarily triggers accounting and tax events for both the entity and the commerce partner as values in the first user account and in the second user account are altered, wherein before the transformation, an inherent property of the non-negotiable credits did not permit the account holder to purchase the goods or services that the commerce partner provides by expending non-negotiable credits of the first user account, wherein after the transformation the quantity of entity independent funds of the second user account has an inherent property permitting the account holder to purchase the goods or the services that the commerce partner provides by expending entity independent funds of the second user account, wherein after the transformation, the quantity of entity independent funds of the second user account are independent of the entity and are not subject to the program redemption rules of the loyalty program, but are instead subject to the program redemption rules of the different loyalty program controlled by the commerce partner.

10. The method of claim 8, wherein the commerce partner owns or controls a retail marketplace through which the commerce partner goods or services are available for purchase by the account holder in exchange for the entity independent funds resulting from the conversion operation, wherein the conversion operation is performed for the account holder by a payment device provided for consumer use in the retail marketplace.

11. The method of claim 8, wherein the commerce partner owns or controls an e-commerce marketplace through which the goods or services provided by the commerce partner are available for purchase by the account holder in exchange for the entity independent funds resulting from the conversion operation, wherein the conversion operation is performed for the account holder by the e-commerce marketplace.

12. The method of claim 8, wherein the entity compensates the commerce partner in negotiable funds for redeeming the subtracted quantity of non-negotiable credits by converting the quantity of non-negotiable credits into the entity independent funds, wherein the compensation amount is specified by the mutual agreement established between the entity and the commerce partner.

13. The method of claim 8, wherein the computer is a specialized computer including hardware and software to function as a loyalty program server for the loyalty program of the entity.

14. The method of claim 8, wherein the conversion operation converts the quantity non-negotiable credits to the quantity of entity independent funds in accordance with a conversion ratio of credits-to-funds, wherein the conversion ratio is mutually established by the terms of the agreement between the entity and the commerce partner.

15. A method comprising:
a computer, comprising hardware and software that is stored upon the hardware and that is able to be executed by the hardware, establishing an account for gambling credits provided by an entity to an account holder, wherein the entity is a unit that has a legal and separately identifiable existence, wherein the gambling credits are non-negotiable credits, wherein the non-negotiable credits have redemption restrictions imposed by the entity, wherein the entity restricts transfers of granted ones of the non-negotiable credits, wherein the transfer restrictions by the entity prevent the account holder from transferring granted ones of the non-negotiable credits in that user's possession to others without permission from the entity;

the computer detecting gambling interactions involving the account holder earning a quantity of the gambling credits, wherein the quantity of the gambling credits from the interactions are added to the account, wherein in absence of a conversion operation that converts the gambling credits to entity independent funds, a commerce partner does not accept the gambling credits for goods or services that the commerce partner provides, wherein the commerce partner does accept the entity independent funds for goods or services that the commerce partner provides, wherein the commerce partner is a unit that has a legal and separately identifiable existence, wherein the commerce partner is not the entity, wherein the commerce partner is associated with the entity in some commercial activity, wherein the conversion operation is explicitly permitted by terms of an agreement established between the entity and the commerce partner, wherein the entity independent funds not stored in the account, wherein the entity independent funds are independent of the redemption restrictions that were imposed upon the gambling credits, wherein the entity independent funds are possessed by the account holder; and the computer subtracting a quantity of the gambling credits from the account, the subtracted quantity of non-negotiable credits corresponding to a quantity of entity independent funds resulting from the conversion operation that converts the gambling credits to a quantity of the entity independent funds in accordance with terms of the agreement mutually established by the commerce partner and the entity, wherein the commerce partner is compensated by the entity for granting the entity independent funds to the account holder in exchange for gambling credits.

16. The method of claim 15, wherein the entity compensates the commerce partner in negotiable funds for redeeming the subtracted quantity of gambling credits by converting the quantity of gambling credits into the entity independent funds, wherein the compensation amount is specified by the mutual agreement established between the entity and the commerce partner.

17. The method of claim 15, wherein the computer is a specialized computer possessing hardware and software components to function as a loyalty program server for the loyalty program provided by the entity.

18. The method of claim 15, wherein the conversion operation converts the quantity non-negotiable credits to the quantity of entity independent funds in accordance with a conversion ratio of credits-to-funds, wherein the conversion ratio is mutually established by the terms of the agreement between the entity and the commerce partner.

19. The method of claim 15, wherein the commerce partner owns or controls a retail marketplace through which the commerce partner goods or services are available for purchase by the account holder in exchange for the entity independent funds resulting from the conversion operation, wherein the conversion operation is performed for the account holder by a payment device provided for consumer use in the retail marketplace.

20. The method of claim 15, wherein the commerce partner owns or controls an e-commerce marketplace through which the goods or services provided by the commerce partner are available for purchase by the account holder in exchange for the entity independent funds resulting from the conversion operation, wherein the conversion operation is performed for the account holder by the e-commerce marketplace.

* * * * *